United States Patent [19]
Yagi et al.

[11] Patent Number: 5,754,513
[45] Date of Patent: May 19, 1998

[54] INFORMATION PICK-UP APPARATUS AND OPTICAL DISK APPARATUS

[75] Inventors: Katsuya Yagi; Hiroyuki Yamazaki; Masaya Kobayashi, all of Hachioji, Japan

[73] Assignee: Konica Corporation, Tokyo, Japan

[21] Appl. No.: 637,210

[22] Filed: Apr. 24, 1996

[30] Foreign Application Priority Data

| Apr. 28, 1995 | [JP] | Japan | 7-105463 |
| Jul. 28, 1995 | [JP] | Japan | 7-211259 |
| Aug. 10, 1995 | [JP] | Japan | 7-204496 |
| Aug. 17, 1995 | [JP] | Japan | 7-230683 |
| Sep. 8, 1995 | [JP] | Japan | 7-255723 |

[51] Int. Cl.$^6$ ........................................... G11B 7/00
[52] U.S. Cl. ............................... 369/112; 369/58
[58] Field of Search ........................... 369/100, 109, 369/110, 112, 116, 117, 118, 124, 93, 94, 44.24, 54, 58

[56] References Cited

U.S. PATENT DOCUMENTS

| 5,097,464 | 3/1992 | Nishiuchi et al. | 369/112 |
| 5,235,581 | 8/1993 | Miyagawa et al. | 369/112 |
| 5,499,231 | 3/1996 | Fennema et al. | 369/124 |

*Primary Examiner*—Paul W. Huber
*Attorney, Agent, or Firm*—Finnegan, Henderson, Farabow, Garrett & Dunner, L.L.P.

[57] ABSTRACT

The present invention relates to an optical pick-up apparatus having a laser beam source and an objective lens to converge the luminous flux from the laser beam source onto the information recording surface of an optical information recording medium through a transparent substrate of the optical information recording medium such as CDs or DVDs, and specifically relates to a technology to move a divergence degree changing means such as a collimator lens or the like, in the direction of the optical axis, and/or to a technology to move the laser beam source in the direction of the optical axis, corresponding to the thickness of the transparent substrate of the optical information recording medium, in order to read information from plural types of optical information recording mediums having different transparent substrate thickness.

34 Claims, 79 Drawing Sheets

HIGH DENSITY
DISK

LOW DENSITY
DISK

INFORMATION PICK-UP APPARATUS AND OPTICAL DISK APPARATUS

BACKGROUND OF THE INVENTION

The present invention relates to an optical pick-up apparatus and an optical disk apparatus by which optical information is reproduced by irradiation of optical beams such as laser beams onto an optical information recording medium such as optical disk, or the like.

Conventional technologies related to the present invention will be described below.

In FIG. 16, luminous flux emitted from a laser beam source 1 passes through a beam splitter 2, enters into a collimator lens 3, and is emitted as parallel luminous flux. This luminous flux is limited to a predetermined luminous flux by a diaphragm, and enters into an objective lens 6. When parallel luminous flux enters into the objective lens 6, the objective lens 6 forms an optical spot image, having no aberration, onto a information recording surface through a substrate 7 having a predetermined thickness (herein, t=0.6 mm).

The luminous flux, which is modulated by information pits and reflected on this information recording surface 8, returns to the beam splitter 2 through the objective lens 6 and the collimator lens 3, is separated from the optical path of the laser beam source 1, and enters into a receiving means 9. This receiving means 9 is composed of PIN photo-diodes which are divided into a plurality of elements, and a current which is proportional to the strength of the entered luminous flux, is outputted from each element. This current is sent to a detection circuit system, not shown in the drawing, and an information signal, a focus error signal and a track error signal are generated in this detection circuit system. The objective lens 6 is controlled by a two-dimensional actuator, not shown in the drawing, composed of a magnetic circuit, a coil, or the like, according to the focus error signal and the track error signal, so that the optical spot position is always focused on the information track.

A large numerical aperture (for example, NA 0.6) is used in such an optical pick-up apparatus so that the diameter of an optical spot, collected by the objective lens 6, is reduced. Accordingly, when the thickness of the substrate 7, which is placed in the converging luminous flux, deviates from a predetermined thickness, large spherical aberrations are generated.

Referring to FIG. 17, this aberration will be explained. When the thickness of the substrate is changed in the objective lens, which is optimized under the condition that NA is 0.6, the wavelength of the laser beam emitted from the laser beam source is 635 nm, the thickness of the substrate is 0.6 mm, and the refractive index is 1.58, then, the aberration is increased by 0.01 λrms per 0.01 mm deviation. When the thickness of the substrate deviates by ±0.07 mm, the aberration is increased by 0.07 λrms, and reaches the Marechal criterion which is a value within which reading and writing operations can normally be performed.

Accordingly, when a information recording medium, made of a 1.2 mm thickness substrate, is used for reproduction instead of a information recording medium which is made of a 0.6 mm thickness substrate, an objective lens 36 and a diaphragm 35 corresponding to the 1.2 mm thickness substrate are provided in addition to the objective lens 6 corresponding to a 0.6 mm thickness substrate in the two-dimensional actuator portion, and the objective lens and the diaphragm are switched to the objective lens 36 and the diaphragm 35 for reproduction.

Alternatively, the following is also considered. Two optical pick-up apparatus respectively used for an information recording medium made of a 0.6 mm thickness substrate and for an information recording medium made of a 1.2 mm thickness substrate, are provided in a single optical disk apparatus.

Further, the following is also considered. A hologram is provided in the optical pick-up apparatus, and a 0-order light and a 1st-order light which transmit the hologram, are respectively used as optical spots corresponding to the 0.6 mm thickness substrate and the 1.2 mm thickness substrate, and these optical spots are converged on the information recording surface.

As described above, in an apparatus in which two objective lenses respectively corresponding to 0.6 mm and 1.2 mm thickness substrates are provided, or two optical pick-up apparatus for the 0.6 mm and for 1.2 mm thickness substrates are used, in order to reproduce an information recording medium having different thickness substrates in one optical disk apparatus, it is impossible to produce a compact optical pick-up apparatus and an optical disk apparatus low in cost.

Further, even when the thickness of the substrate is the same, in cases of information recording mediums (for example, CDs, DVDs) in which difference of the image recording density is large, the size of the spot to be read is inappropriate for the information pit size, resulting in a decrease of reproduction performance.

In the method in which a hologram is provided in the optical pick-up apparatus, and a 0-order light and a 1st-order light which transmit the hologram, are respectively used as optical spots corresponding to the 0.6 mm thickness substrate and the 1.2 mm thickness substrate, and these optical spots are converged onto the information recording surface, since two luminous flux are always sent to the information recording surface of the information recording medium, one luminous flux is not necessary for information reading out when information reading out is carried out by the optical spot of another luminous flux, resulting in increase of noise. Further, since the laser beam strength is used under divided condition, the S/N ratio is decreased by a corresponding decrease of the amount of light, or the life of the laser beam is decreased as the amount of light is increased. Further, in the method in which recording is carried out, since a loss of light emission is increased, a higher output laser apparatus is required, resulting in a further increase of cost.

Further, in cases where track errors are detected by a 3-beam method, when the number of types of azimuth of 3 beams is one with respect to information tracks on the optical disk, track error signals can not be detected effectively with respect to both optical disks having different track pitches (for example, 0.84 μm and 1.6 μm), and thus the tracking performance is reduced.

SUMMARY OF THE INVENTION

The first object of the present invention is to provide a simple structure and compact optical pick-up apparatus and optical disk apparatus, which can reproduce information from information recording mediums having different substrate thickness, by a single optical pick-up apparatus, and which are interchangeable with each other.

The second object of the present invention is to provide an optical disk apparatus in which a driving method for the optical pick-up correction means, including therein a correction means, is simplified and optimized to satisfactorily adapt to information recording mediums having different substrate thickness to the system, and further, an information recording medium apparatus which is compact and inexpensive, and by which information recording mediums having different substrate thickness, can be reproduced or be recorded on with a single apparatus.

The first embodiment to attain the first object of the present invention is an optical pick-up apparatus by which information from a plurality of optical information recording mediums having different transparent substrate thickness is read, and which comprises:

a laser beam source;

an objective lens to converge a luminous flux from the laser beam source onto the information recording surface of the optical information recording medium through a transparent substrate of the optical information recording medium; and a moving means for moving a divergence degree changing means in the direction of the optical axis of a luminous flux from the laser beam source corresponding to the thickness of the transparent substrate of the optical information recording medium, wherein the divergence degree changing means changes the divergence degree of the luminous flux from the laser beam source, which enters into the objective lens, by movement by the moving means.

The second embodiment to attain the object of the present invention is an information recording medium apparatus by which information from a plurality of optical information recording mediums having different transparent substrate thickness is read, and which comprises:

a laser beam source;

a beam splitter;

an objective lens to converge a luminous flux from the laser beam source onto the information recording surface of the optical information recording medium through a transparent substrate of the optical information recording medium;

a light receiving means for receiving the luminous flux which has been reflected by the surface of the optical information recording medium and passed through the objective lens and the beam splitter;

a discrimination means for discriminating the thickness of the transparent substrate of the optical information recording medium; and a moving means for moving a divergence degree changing means in the direction of the optical axis of a luminous flux from the laser beam source corresponding to the result of discrimination by the discriminations means, wherein the divergence degree changing means changes the divergence degree of the luminous flux from the laser beam source, which enters into the objective lens, by movement by the moving means.

The third embodiment to attain the object of the present invention is an optical pick-up apparatus by which information from a plurality of optical information recording mediums having different transparent substrate thickness is read, and which comprises:

a laser beam source;

an objective lens to converge a luminous flux from the laser beam source onto the information recording surface of the optical information recording medium through a transparent substrate of the optical information recording medium; and a moving means for moving a laser light source in the direction of the optical axis corresponding to the thickness of the transparent substrate of the optical information recording medium.

The fourth embodiment to attain the object of the present invention is an information recording medium apparatus by which information from a plurality of optical information recording mediums having different transparent substrate thickness is read, and which comprises:

a laser beam source;

a beam splitter;

an objective lens to converge a luminous flux from the laser beam source onto the information recording surface of the optical information recording medium through a transparent substrate of the optical information recording medium;

a light receiving means for receiving the luminous flux which has been reflected by the surface of the optical information recording medium and passed through the objective lens and the beam splitter; a discrimination means for discriminating the thickness of the transparent substrate of the optical information recording medium; and a moving means for moving the laser beam source in the direction of the optical axis corresponding to the result of, discrimination by the discriminationg means.

In the first and second embodiments, the divergence degree changing means can move between the first position on the objective lens side and the second position on the laser beam source side on the optical axis between the objective lens and the laser beam source by the moving means.

The moving means moves the divergence degree changing means to the first position when the transparent substrate of the optical information recording medium has the first thickness, and moves the divergence degree changing means to the second position when the transparent substrate of the optical information recording medium has the second thickness which is thicker than the first thickness.

In the third and fourth embodiments, the laser beam source can move between the first position and the second position, which is closer to the objective lens than the first position.

The moving means moves the laser beam source to the first position when the transparent substrate of the optical information recording medium has the first thickness, and moves the laser beam source to the second position when the transparent substrate of the optical information recording medium has the second thickness, which is thicker than the first thickness.

As described above, when the divergence degree changing means or the laser beam source is moved, the divergence degree of the luminous flux entering into the objective lens is changed, and the spherical aberration due to the difference of thickness of the transparent substrates of the optical information recording medium is corrected, resulting in excellent reading performance.

Further, in the first to fourth embodiments, the dapparatus includes a control means for changing the numerial aperture by controlling a means for determining the numerial aperture of the luminous flux entering into the optical information recording medium, and a means for determining the numeral aperture corresponding to pitches of the information track of the optical information recording medium, and the reading characteristics due to the difference of the track pitches are optimized in addition to correction of the difference of the thickness of the substrate.

A diffraction lattice is arranged between the objective lens and the laser beam source, and an angle adjusting means for adjusting the rotation angle of the diffraction lattice corresponding to pitches of the information track of the optical information recording medium is provided, so that an optimum track error signal is detected by the three-beam method, and stable tracking performance can be attained.

The second and fourth embodiments are information recording medium apparatus using the optical pick-up in the first and third embodiments.

The discrimination means descriminates the thickness of the transparent substrate based on the input from operation buttons of the reading apparatus, or signals from the light receiving means, by frequency component of the signals and the rotation speed of the optical information recording medium. The divergence degree changing means or the laser beam source is moved by the control means for controlling the movement of the moving means, and the optimum reading performance is attained with respect to the thickness of the transparent substrates.

Further, when the movement of the moving means is controlled so as to compensate for changes of aberration of the beam spot, focused on the optical information recording medium, due to temperature variations, the optimum information reading performance or the optimum writing performance can be attained.

According to the present invention, information from the information recording mediums having different substrate thickness can be reproduced by changing the divergence degree of the luminous flux from the laser beam source, which enters into the objective lens, corresponding to the thickness of the transparent substrates of the optical information recording mediums.

FIG. 1 is a view of an optical path in cases where the luminous flux enters into an objective lens 6 in which the aberration compensation is optimized when a parallel luminous flux of the wavelength of 635 nm enters into the lens under the conditions that NA is 0.60, the thickness of the substrate is 0.60 mm, and the refractive index is 1.58. The luminous flux from the point at infinity is converged onto a position (the rear surface of a substrate 7) corresponding to a information recording surface 8 through a diaphragm 5, an objective lens 6, and a substrate 7. Relating such the objective lens 6, the objective lens of the wavefront aberration of 0.000 λrms, can be attained when an aspherical surface is utilized for the lens.

FIG. 2 shows the relationship between the thickness of the substrate and the divergence degree when this objective lens 6 is used. The horizontal axis shows the thickness of the substrate, and the vertical axis shows the magnification ratio (the magnification ratio between the laser beam source and the optical spot to be converged, which are viewed by the objective lens) of the objective lens in its working condition, which is a function of the divergence degree of the luminous flux entering into the objective lens. The luminous flux passing through the objective lens to the substrate is always converged, and the sign when the converged light enters into the objective lens, is denoted by +, and the sign, when the divergence light enters into the objective lens, is denoted by −. When the magnification ratio is 0, parallel light beams enter into the objective lens.

The curve shown in the drawing, is obtained by connecting the magnification ratios, in which the wavefront aberration is minimum, with respect to the thickness of the substrates. In substrates of 0.60 mm thickness, which is the reference, when the thickness of the substrate is increased in cases where parallel light beams enter into the objective lens, the aberration is reduced when minus light beams, that is, the diverged light, enter into the objective lens. In cases where the thickness of the substrate is decreased, the aberration is reduced when plus light beams, that is, the converged light, enter into the objective lens.

FIG. 3 shows a case in which the diverging light is caused to enter into the objective lens 6 when the thickness of the substrate is increased. When the thickness of the substrate is increased, the spherical aberration becomes overcorrected due to the increased amount of the thickness. However, it is canceled by generating undercorrected spherical aberration by the objective lens when the diverging light is caused to enter into the objective lens.

When the magnification ratio between the laser beam source and the optical spot formed on the information recording surface is −0.089, in cases where the same objective lens as described above is used and NA is 0.60, the thickness of the substrate is 1.61 mm, then, the wavefront aberration is 0.03 μrms, and is corrected so as to be sufficient for the information reproduction.

FIG. 4 shows a case in which the converged light is caused to enter into the objective lens 6 when the thickness of the substrate is reduced. An undercorrected spherical aberration generated by an amount of the reduction of the thickness of the substrate, is canceled by generating an overcorrected spherical aberration by entering the converged light into the objective lens. When the magnification ratio between the laser beam source and the optical spot on the information recording surface is +0.112, in cases where NA is 0.60 and the thickness of the substrate is 0.10 mm, then, the wavefront aberration is 0.03 μrms. In this connection, the diaphragm 5 is placed at a frontal focus point of the objective lens 6 commonly in FIGS. 1, 3 and 4, and the diaphragm 5 has the same diameter in all cases.

An optical system of an optical pick-up apparatus of the present invention, comprises: a laser beam source; a lens to reduce the divergent angle of the light beam diverged from the laser beam source; and an objective lens having a positive refractive power by which the outgoing beam from the lens is converged onto the information recording surface through a transparent substrate of the optical information recording medium, and the optical system of an optical pick-up apparatus is characterized in that the divergence degree changing lens is moved in the direction of the optical axis corresponding to the thickness of the transparent substrate, and satisfies the following condition.

$d_1 > d_2$

Where, $d_1$, $d_2$: the distance from the laser beam source to a point at which the surface of the divergent degree changing lens, which is the closest to the light beam source, crosses with the optical axis, when the thickness of the transparent substrates is respectively $t_1$ and $t_2$, and $t_1 < t_2$.

The above-described objective lens is a positive single lens in which the convex surface of the lens is opposite to the light beam source, and both surface respectively opposite to the light beam source side and the information recording surface side are aspherical surface, and the lens is made of glass or a plastic material.

Further, this optical system is preferably structured such that the luminous flux outgoing from the divergence degree changing lens and entering into the objective lens is almost parallel with each other when the divergence degree changing lens is located at $D_1$.

FIG. 18 shows the amount of spherical aberration generated when the divergence degree changing lens moves along the optical axis, in the optical system in which the aberration correction is optimized with respect to a 0.6 mm thick substrate in Example 8. When the divergence degree changing lens is moved along the optical axis from a predetermined angle to the light beam source (when the parallel light beams go out), an angle of emergence of the luminous flux outgoing from the divergence degree changing lens is larger than the angle of emergence before the movement, and the luminous flux having a divergent degree larger than the optimum condition, enters into the objective lens, resulting in an undercorrected spherical aberration. When the divergence degree changing lens is moved along the optical axis from a predetermined position to the objective lens, the angle of emergence of the luminous flux outgoing from the divergence degree changing lens is smaller than the angle of emergence before the movement, and luminous flux having a divergent degree smaller than the optimum condition enters into the objective lens, resulting in an overcorrected spherical aberration.

As described above, in the optical system which is optimized with respect to a predetermined substrate thickness, the more the thickness of the substrate is increased, and the further, is the distance of the divergence degree changing lens from the light beam source, the more the spherical aberration is overcorrected. Reversely, the more the thickness of the substrate is decreased, and the shorter is the distance of the divergence degree changing lens from the light beam source, the more the spherical aberration is undercorrected. Accordingly, the overcorrected spherical aberration generated in cases where the thickness of the substrate is increased, can be canceled by generating an undercorrected spherical aberration when the divergence degree changing lens is closer to the light beam source. Reversely, the undercorrected spherical aberration, generated in cases where the thickness of the substrate is decreased, can be canceled by generating an overcorrected spherical aberration when the divergence degree changing lens is located farther from the light beam source.

When the surface on the side of the light beam source of the objective lens is convex, and further if an aspherical surface is used for the objective lens, the objective lens used in the present invention can be realized as a single lens, resulting in decreased cost. In this case, although glass or resin is suitable as the material for the objective lens, resin is preferable because of reduction of cost.

Further, the optical system preferably satisfies the following conditional expressions.

$$0.5 < \frac{\Delta d}{\left(\frac{n^2-1}{n^3}\right)\Delta t} \times \sqrt{\frac{f_0}{fT}} \times \left(\frac{f_0}{f_c}\right)^2 < 0.8$$

where, $\Delta d = d_1 - d_2$ $\Delta t = t_2 - t_1$ $d_1$: the distance (DVD) from the laser beam source to the first position (mm)

$d_2$: the distance (CD) from the laser beam source to the second position (mm)

$t_1$: the first thickness of the transparent substrate of the optical information recording medium (mm)

$t_2$: the second thickness of the transparent substrate of the optical information recording medium (mm)

n: the refractive index of the transparent substrate of the optical information medium at the wavelength of the light beam source $f_0$: the focal length of the objective lens (mm)

$f_c$: the focal length of the divergent degree changing lens (mm)

fT: the focal length of the entire optical system at the thickness of the transparent substrate of $t_1$. (mm)

The spherical aberration generated by variations Δt of the thickness of the substrate, is sufficiently corrected in the entire optical system by generating the reverse spherical aberration, when the divergence degree changing lens having a focal length of $f_c$ is moved along the optical axis. At this time, the larger the expression $\{(n^2-1)/n^3\}\Delta t$ is, the larger the movement amount Δd of the divergence degree changing lens is, and this relationship is proportional. An amount of the spherical aberration which can be corrected by the movement of the divergence degree changing lens, is inversely proportional to $\sqrt{(f_0/fT)}$ and $(f_0/f_c)^2$.

From the foregoing, regarding the amount of the movement of the divergence degree changing lens which is moved to correct the spherical aberration generated by a change of the thickness of the transparent substrate of the optical information recording medium, it is preferable that a value normalized by the above-described expressions, $\{(n^2-1)/n^3\}\Delta t$, $\sqrt{(f_0/fT)}$ and $(f_0/f_c)^2$, is within the range of Equation (1).

When this lens is moved beyond the upper limit, the spherical aberration becomes undercorrected, and exceeds the Marechal criterion which is a criterion for the limit of diffraction. Conversely, when the lens is moved reversely below the lower limit, the overcorrected spherical aberration generated at Δt is not sufficiently corrected, and also exceeds the Marechal criterion. Therefore, the diameter of the spot can not satisfactorily reduced.

The optical system of the optical pick-up apparatus, relating to the third or fourth embodiment to attain the first object of the present invention, is structured as follows. The optical system of the optical pick-up apparatus comprises: at least a laser beam source; and a finite conjugate type objective lens having the positive refractive power to converge the luminous flux emitted from the light beam source onto the information recording surface through a transparent substrate of the optical information recording medium, and the recording and reproducing optical system is characterized in that the laser beam source is moved along the optical axis corresponding to the thickness of the transparent substrate, and the optical system satisfies the following relationship, $$mt1 > mt2 \tag{1}$$

where, mti: the lateral magnification of the entire system from the laser beam source to the information recording surface of the optical information recording medium, and the thickness ti, of the transparent substrate, has the following relationship, t1 < t2.

In the objective lens which converges the luminous flux onto the information recording surface, both surfaces on the side of the light beam source and on the side of the information recording surface, are aspherical, and the surface on the side of the light beam source is a convex surface. The objective lens is characterized in satisfying the following relationship, $$-2.1 \leq G \leq -0.5 \tag{2}$$

herein, $G = \Delta t \cdot (f_0 - m1 \cdot \Delta d)/(m1^2 \Delta d \cdot f_0) \cdot (n^2-1)/n^3$ where, $$\Delta d = d2 - d1$$

$$\Delta t = t2 - t1$$

d1: the interval between the laser beam source located at the first position and the objective lens (mm)
d2: the interval between the laser beam source located at the second position and the objective lens (mm)
$t_1$: the first thickness of the transparent substrate of the optical information recording medium $t_2$: the second thickness of the transparent substrate of the optical information recording medium
n: the refractive index of the transparent substrate of the optical information recording medium at the wavelength of the laser beam source
$f_0$: the focal length of the objective lens
m1: the lateral magnification of the objective lens corresponding to the first piosition When the numerical aperture on the side of the information recording surface of the objective lens is denoted as NA1 at the first thickness of the transparent substrate, and NA2 at the second thickness, which is thicker than the first thickness, the numerical aperture is characterized in satisfying the following relationship, $$NA2 < NA1 \quad (3)$$

$$0.30 \leq NA1 \leq 0.65 \quad (4)$$

$$0.30 \leq NA2 \leq 0.65 \quad (5)$$

Further, $$\text{when } 0.50 \leq NA2 \leq 0.65 \quad (5')$$

$$\text{then, } -1.5 \leq G \leq -0.80 \quad (2')$$

The above-described objective lens is characterized in satisfying the following relationships, $$0.035 \leq |NA1 \cdot m1| \leq 0.15 \quad (6)$$

$$0.035 \leq |NA2 \cdot m2| \leq 0.15 \quad (7)$$

$$m1 < 0, m2 < 0 \quad (8)$$

Where,
NA1: the numerical aperture on the side of the information recording surface at the thickness of t1 (<t2) of the transparent substrate
NA2: the numerical aperture on the side of the information recording surface at the thickness of t2 of the transparent substrate
m1: the lateral magnification of the objective lens at the thickness of t1 of the transparent substrate
m2: the lateral magnification of the objective lens at the thickness of t2 of the transparent substrate The above-described objective lens is characterized by satisfying the following relationship, $$|m1 \cdot f_0 \cdot NA1^4| \leq 0.061 \quad (9)$$

$$|m2 \cdot f_0 \cdot NA2^4| \leq 0.061 \quad (10)$$

Further, the above-described objective lens preferably satisfies the following relationship, $$|m1| \cdot f_0 \cdot NA1^4 \leq 0.045 \quad (9')$$

$$|m2| \cdot f_0 \cdot NA2^4 \leq 0.045 \quad (10')$$

An object of the optical system of the optical pick-up apparatus of the present invention is to satisfactorily correct the spherical aberration generated by the change of $\Delta t$ of the thickness of the substrate by being canceled with the spherical aberration generated in the objective lens by the movement of the light beam source along the optical axis.

Actually, an amount of change $\Delta Sat$ of the spherical aberration with respect to the change $\Delta t$ of the thickness of the substrate is proportional in the case of the same NA, and can be expressed as follows.

$$\Delta t \cdot (n^2 - 1)/n^3 \cdot \alpha = \Delta SAt \quad (\alpha: \text{a proportional constant}) \quad (11)$$

Herein, n is a refractive index at the wavelength of the light beam source of the transparent substrate.

It can be considered that the change of magnification $\Delta m$ of the single lens type objective lens and the amount of change of $\Delta SAm$ of the spherical aberration by the change of magnification $\Delta m$ are almost proportional.

$$f_0 \cdot \Delta m \cdot \beta = \Delta SAm (\beta: \text{a proportional constant}) \quad (12)$$

Herein, $f_0$ is a focal length of the objective lens.

Therefore, the following relationship may be satisfied in order to entirely correct the spherical aberration, $$\Delta SAt + \Delta SAm = 0 \quad (13)$$

That is, $$\Delta t \cdot (n^2 - 1)/(n^3 \cdot f_0 \cdot \Delta m) = -\beta/\alpha \text{ (constant)} \quad (14)$$

In this case, in Equation (11), when n is constant and $\Delta t$ is positive (>0), the spherical aberration is increased. That is, $\Delta SAt > 0$. As a result, since $n > 1$, the constant a becomes positive.

Further, in Equation (12), when a change of the lateral magnification is positive ($\Delta m > 0$) in the change of the lateral magnification $\Delta m$ (when an absolute value of the lateral magnification in a real image system, not in a reflection system, is reduced), the spherical aberration is increased. Therefore, $\Delta Sam > 0$. As a result, since $f_0 > 0$, the constant $\beta$ is positive.

As a result, when $\Delta t$ (=t2-t1>0) is positive, $\Delta m$ is negative (<0) from Equation (14).

When the lateral magnification in which the spherical aberration is corrected best at the transparent substrate thickness of t1, is m1, and the lateral magnification in which the spherical aberration is corrected best at the transparent substrate thickness of t2 (t2>t1, $\Delta t$=t2-t1), is m2, then, the following equation is obtained, $$\Delta m = m2 - m1 \quad (15)$$

As a result, the following relationship is obtained, $$m1 > m2 \quad (16)$$

The spherical aberration of the objective lens can be satisfactorily corrected when the surface on the side of the light beam source, of the objective lens, is the convex surface, and both lens surfaces are aspherical.

In order to satisfactorily correct the spherical aberration $\Delta SAt$ generated when the thickness of the transparent substrate changes ($\Delta t$), the relationship between the amount of the movement $\Delta d$ of the light beam source and a change $\Delta m$ of the lateral magnification ratio of the objective lens is found.

The amount of movement $\Delta d$ of the light beam source can be expressed as follows:

$$\Delta d = (1 - 1/m2) \cdot f_0 - (1 - 1/m1) \cdot f_0 = \{(1/m1) - (1/m2)\} \cdot f_0 \quad (17)$$

Herein, $f_0$ is the focal length of the objective lens.

Equation (17) is transformed as follows:

$$m2 = m1 \cdot f_0/(f_0 - m1 \cdot \Delta d) \quad (18)$$

When Equation (18) is substituted into Equation (15), then, $$\Delta m = m1^2 \cdot \Delta d/(f_0 - m1 \cdot \Delta d) \quad (19)$$

When the above Equations are substituted into Equation (14), the relationship among $\Delta d$, $\Delta t$ and the objective lens is expressed as follows, $$\Delta t \cdot (f_0 - m1 \cdot \Delta d)/(f_0 \cdot m1^2 \cdot \Delta d) \cdot (n^2-1)/n^3 = -\beta/\alpha = \text{constant} \quad (20)$$

Herein, in order to simplify the left side of equation (20), the left side is expressed by G. That is, $$G = \Delta t \cdot (f_0 - m1 \cdot \Delta d)/(f_0 \cdot m1^2 \cdot \Delta d) \cdot (n^2-1)/n^3 \quad (21)$$

It is necessary to set G by changing the spherical aberration $\Delta d$ generated due to the change $\Delta t$ of the thickness of the substrate so that the allowable error is suppressed within the spherical aberration of 0.045 λrms as the wavefront aberration value after allowable values, such as production errors or the like, are subtracted from the Marechal criterion (the wavefront aberration of 0.07 λrms) as a target value to be compensated for.

When $\Delta d$ is set so that G exceeds the upper limit (−0.5) of the conditional expression (2), the spherical aberration enters into the "under" range, and the spherical aberration exceeds 0.045 λrms even when NA2 is as small as 0.3. When $\Delta d$ is set so that G is reduced smaller than the lower limit of −2.1, the spherical aberration enters into the "over-corrected" range, and the spherical aberration exceeds 0.045 λrms, even when NA2 is about 0.3.

When NA2 is increased to larger than 0.50 (conditional expression (5')), it is difficult to maintain the spherical aberration within 0.045 λrms if G is not within the range from −1.5 to −0.8 (conditional expression (2')).

Specifically, when G is larger than −1.3 and smaller than −1.0, the spherical aberration is close to 0, resulting in excellent performance.

Further, when NA1 and NA2 exceed 0.65, excellent performance is not attainable.

When the numerical aperture of the side of the light beam source is $NA_o1$ at the first position (the position at t1), and the numerical aperture of the side of the light beam source is $NA_o2$ at the second position (the position at t2), $NA_o1$, and $NA_o2$ are required to satisfy the following relationship, $$0.035 \leq NA_o1 \leq 0.15$$

$$0.035 \leq NA_o2 \leq 0.15$$

When respective numerical apertures are smaller than 0.035, the utilization efficiency of the laser beam is reduced due to the divergent angle of the laser beam, and sufficient light intensity is not obtained for recording and reproducing optical information recording medium. When respective numerical apertures are larger than 0.15, the diameter of the spot is not reduced for recording and reproducing optical information recording medium due to the divergent angle of the laser beam, astigmatic difference of the laser beam, and oval-shaped light amount distribution.

The numerical aperture ($NA_o1$, $NA_o2$) of the light beam source-side can be expressed by a product of the numerical aperture on the information recording surface-side and an absolute value of the lateral magnification ratio (m1, m2) of the optical system. That is, $$NA_o1 = |m1| \cdot NA1 \quad (24)$$

$$NA_o2 = |m2| \cdot NA2 \quad (25)$$

Conditional expressions (6) and (7) are obtained when the above expressions (24) and (25) are substituted into the expressions (22) and (23).

Here, the following expressions are obtained in order to convert the light beams diverged from the light beam source into converged light beams by the objective lens, m1<0, m2<0 (conditional expression (8)).

The distance from the light beam source to the information recording surface is changed by unintentional movement, or the like, of the transparent substrate of the optical information recording medium, and spherical aberration due to change of the distance between the light beam source and image, is generated when the objective lens is driven so that automatic focusing is carried out on the change of the distance.

If $|m1| \cdot f_0 \cdot NA1^4$ exceeds 0.061 at the first arrangement position, the amount of generation of the spherical aberration due to change of the distance between the light beam source and the image, exceeds the allowable value (conditional expression (9))

If $|m2| \cdot f_0 \cdot NA2^4$ exceedds 0.061 at the first arrangement position, an amount of generation of the spherical aberration due to change of the distance between the light beam source and the image, also exceeds the allowable value (conditional expression (10)).

Reversely, when $|m1| \cdot f_0 NA1^4$ and $|m2| \cdot f_0 \cdot NA2^4$ are less than 0.045 at the first arrangement position and the second arrangement position, further excellent performance can be maintained (conditional expressions (9') and (10')).

An optical system of the optical pick-up apapratus according to the embodiment to attain the first object of the present invention, comprises: a laser beam source; a coupling lens having the positive refractive power to convert the divergent angle of the divergent light from the laser beam source into a smaller one; and an objective lens having a positive refractive power which converges the luminous flux outgoing from the coupling lens onto the information recording surface through the transparent substrate of the optical information recording medium, wherein the laser beam source and the coupling lens integrally move along the optical axis corresponding to the thickness of the transparent substrate, and satisfy the following condition, $$mt1 > mt2 \quad (26)$$

where, mti: the lateral magnification ratio of the entire optical system from the laser beam source to the transparent substrate (the thickness of which is ti), and t1<t2.

In the above-described objective lens, the surface on the side of the light beam source and the information recording surface are aspherical, and the surface on the side of the light beam source is convex. Then, the objective lens is characterized in satisfying the following relationship, $$-2.1 \leq G \leq -0.5 \quad (27)$$

herein $$G = \Delta t (f_0 - m_0 1 \cdot \Delta d)/(m_0 1^2 \cdot \Delta d \cdot f_0) \cdot (n^2-1)/n^3$$

where, $\Delta d = d2 - d1$ $\Delta t = t2 - t1$ d1: the interval from the emergent surface of the coupling lens to the incident surface of the objective lens when the laser beam source is located at the first position (DVD) (mm)
d2: the interval from the emergent surface of the coupling lens to the incident surface of the objective lens when the laser beam source is located at the second position (DVD) (mm)
t1: the first thickness of the transparent substrate of the optical information recording medium (mm)
t2: the second thickness of the transparent substrate of the optical information recording medium (mm)
$m_o1$: the lateral magnification of the objective lens single body in which the wavefront aberration is best at a transparent substrate thickness of t1.
$f_0$: the focal length of the objective lens
n: the refractive index of the transparent substrate at the wavelength of the light beam source Further, in the above-described objective lens, when the numerical aperture of luminous flux converging the light beam onto the image recording surface is NA1 at the first thickness of the transparent substrate, and NA2 at the second thickness which is thicker than the first thickness, then, the objective lens satisfies the following conditions, $$NA2 < NA1 \tag{28}$$

$$0.50 \leq NA1 \leq 0.65 \tag{29}$$

$$0.30 \leq NA2 \leq 0.65 \tag{30}$$

However, when $$NA2 < NA1 \tag{31}$$

$$0.50 \leq NA1 \leq 0.65 \tag{32}$$

$$0.50 \leq NA2 \leq 0.65 \tag{33}$$

the objective lens preferably satisfies the following condition, $$-1.5 \leq G \leq -0.80 \tag{34}$$

The optical system of the optical pick-up apparatus using the above-described objective lens is characterized in satisfying the following condition, $$-0.22 \leq mt1 \leq -0.095 \tag{35}$$

mt1: the lateral magnification ratio of the entire optical system in which the wavefront aberration is minimum when the transparent substrate, the thickness of which is minimum, of the optical information medium is used. Specifically, it is preferable to satisfy the following condition, $$-0.17 \leq mt1 \leq -0.12 \tag{36}$$

When the above-described objective lens is made of glass, the following condition is preferably satisfied, $$-0.18 \leq m_o1 \leq -0.06 \tag{37}$$

$m_o1$: the lateral magnification ratio of the objective lens single body with respect to the lateral magnification ratio mt1 of the entire optical system in which the wavefront aberration is minimum when the transparent substrate, the thickness of which is minimum, of the optical information medium is used.

When the objective lens is made of resin material, the objective lens preferably satisfies the following condition, $$-0.13 \leq m_o1 \leq -0.06 \tag{38}$$

The coupling lens is a spherical lens and the following condition is satisfied, $$0.48 \leq m_c \leq 0.85 \tag{39}$$

$M_c$: the lateral magnification ratio of the coupling lens which integrally moves with the light beam source along the optical axis.

When the aperture diameter at the arrangement position at the first thickness of the transparent substrate is $\phi A1$, and the aperture diameter at the arrangement position at the second thickness, which is larger than the first thickness, is $\phi A2$, then, it is preferable that the aperture diameter is adjustable such that $$\phi A1 > \phi A2 \tag{40}$$

In the optical system of the optical pick-up apparatus of the present invention, the spherical aberration generated due to the change of the thickness $\Delta t$ of the transparent substrate is compensated for when the light beam source and coupling lens are integrally moved along the optical axis, so that the condition is maintained in which the aberration is satisfactorily corrected without depending on the change of the thickness of the transparent substrate.

An amount of change $\Delta SAt_0$ of the spherical aberration is proportional to the change $\Delta t$ of the thickness of the transparent substrate at the same NA, and can be expressed as follows when the refractive index of the transparent substrate is n, and the proportional constant is $\alpha_0$.

$$\Delta t \cdot (n^2 - 1)/n^3 \cdot \alpha_0 = \Delta SAt_0 \tag{41}$$

Further, in this optical system, the spherical aberration can also be generated when the lateral magnification ratio mt1 is changed to mt2.

When the magnification of the coupling lens is $m_c$, the lateral magnification of the objective lens is $m_o$, the lateral magnification ratio of the entire optical system is mt, and the light beam source is integrally moved with the coupling lens, then, the magnification $m_c$ of the coupling lens is always constant, and mt is proportional to $m_o$.

Accordingly, in relation to the amount of th movement $\Delta d$ to correct the spherical aberration, the amount of movement, when the coupling lens and the light beam source are integrally moved in the above optical system, the magnification of which is mt, and which includes the coupling lens, can be considered to be the same as the amount of movement when only the light beam source is moved in the optical system, the magnification of which is $m_o$, and which does not include the coupling lens.

Accordingly, the amount of $\Delta d$ does not depend on the coupling lens, and depends on only the objective lens.

Further, a change of magnification of the single-lens objective lens $\Delta m_o$ and the amount of the change of the spherical aberration $\Delta SAm_o$ due to the change of magnification of the single-lens objective lens $\Delta m_o$, are considered to be almost proportional.

$$f_0 \cdot \Delta m_o \cdot \beta_0 = \Delta SAm_o \tag{42}$$

Where, $f_0$ is the focal length of the objective lens, and $\beta_0$ is a proportional constant.

In order to correct the entire change of the spherical aberration, the following equation may be satisfied.

$$\Delta SAt_0 + \Delta SAm_0 = 0 \qquad (43)$$

That is, $$\Delta t \cdot (n^2-1)/(n^3 \cdot f_0 \cdot \Delta m_0) = -\beta_0/\alpha_0 (\text{constant}) \qquad (44)$$

In this case, when n is constant and $\Delta t$ is positive (>0) in the equation (41), the spherical aberration moves to an "overcorrected"-range. Therefore, $\Delta SAt_0 > 0$, and $n > 1$. Accordingly, the constant $\alpha_0$ is positive.

When, in the equation (42), the change of the lateral magnification ratio $\Delta m_0$ is positive (m>0), (when an absolute value of the lateral magnification ratio is reduced in the case of a real image system, not a reflection system,), then, the spherical aberration moves toward the "overcorrected"-range. Therefore, $\Delta SAm_0 > 0$, and then, $f_0 > 0$, and the constant $\beta_0$ is positive.

As a result, when $\Delta t$ is positive, $\Delta m_0$ is negative(<0), as derived from the equation (44).

At this time, when the lateral magnification ratio in which the spherical aberration at the transparent substrate t1 is corrected best, is represented by $m_0 1$, and the lateral magnification ratio in which the spherical aberration at the transparent substrate t2 (t2>t1, $\Delta t = t2 - t1$) is corrected best, is represented by $m_0 2$, the following equation is obtained, $$\text{then, } \Delta m_0 = m_0 2 - m_0 1 \qquad (45)$$

As a result, $$m_0 1 > m_0 2 \qquad (46)$$

As described above, the relationship between the lateral magnification ratio mt of the entire optical system and the lateral magnification ratio of the objective lens single body, is obtained as follows, $$mt1 = m_0 1/m_c \qquad (47)$$

$$mt2 = m_0 2/m_c \qquad (48)$$

Since the lateral magnification ratio $m_c$ of the coupling lens, which is viewed from the side opposite to the light beam source, is always constant and positive ($m_c > 0$), the following expression is obtained.

$$mt1 > mt2 \qquad (49)$$

The spherical aberration of the objective lens is satisfactorily corrected when the surface on the side of the light beam source, of the objective lens is formed as a convex surface, and both surfaces are aspherical. The influence due to the change of temperature on the aberration can be reduced when glass material is used. When a resin material is used, the weitht of the objective lens can be reduced and its cost can be reduced.

In order to satisfactorily correct the spherical aberration $\Delta SAt_0$ generated due to the change of the transparent substrate thickness, the relationship between the amount of the movement $\Delta d$ in which the light beam source and the coupling lens are integrally moved, and the amount of the change $\Delta m_0$ of the lateral magnification ratio of the objective lens at that time, will be considered as follows.

The amount of the movement $\Delta d$ of the light beam source and the coupling lens can be expressed by the following equation, $$\Delta d = (1 - 1/m_0 2) \cdot f_0 - (1 - 1/m_0 1) \cdot f_0 = \{(1/m_0 1) - (1/m_0 2)\} \cdot f_0 \qquad (50)$$

Here, $f_0$ is a focal length of the objective lens.

This equation is transformed as follows.

$$m_0 2 = m_0 1 \cdot f_0/(f_0 - m_0 1 \cdot \Delta d) \qquad (51)$$

When this equation is substituted into Equation (45), $$\Delta m_0 = m_0 1^2 \cdot \Delta d/(f_0 - m_0 1 \cdot \Delta d) \qquad (52)$$

Therefore, the relationship among $\Delta d$, $\Delta t$ and the objective lens is obtained from Equation (44) as follows.

$$\Delta t (f_0 - m_0 1 \cdot \Delta d)/(m_0 1^2 \cdot \Delta d \cdot f_0) \cdot (n^2 - 1)/n^3 = -\beta_0/\alpha_0 = \text{constant} \qquad (53)$$

In order to simplify the equation, the left side of Equation (53) is expressed as G. That is, $$G = \Delta t (f_0 - m_0 1 \cdot \Delta d)/(m_0 1^2 \cdot \Delta d \cdot f_0) \cdot (n^2 - 1)/n^3 \qquad (54)$$

In order to suppress the spherical aberration generated corresponding to the change $\Delta t$ of the substrate thickness within the Marechal criterion (the wavefront aberration of 0.07 $\lambda$rms) by changing $\Delta d$, it is required to suppress the spherical aberration within 0.045 $\lambda$rms as the wavefront aberration value when considering production errors or the like, as the target value to be compensated for.

When $\Delta d$ is set so that G exceeds the upper limit of −0.5, the spherical aberration enters into the "under"-range, and the spherical aberration exceeds 0.045 $\lambda$rms even when NA2 is about 0.3. When $\Delta d$ is set so that G is reduced to less than the lower limit of −2.1, the spherical aberration enters into the overcorrected-range, and the spherical aberration exceeds 0.045 $\lambda$rms even when NA2 is about 0.3.

When NA2 is increased to greater than 0.50, it is difficult to maintain the spherical aberration within 0.045 $\lambda$rms if G is not exactly within the range from −1.5 to −0.8.

Specifically, when G is larger than −1.3 and smaller than −1.0, the spherical aberration is close to 0, resulting in excellent performance.

When NA1 is smaller than 0.5, it is not advisable to use the coupling optical system, and when NA1 and NA2 exceed 0.65, excellent performance can not be obtained.

In cases where the magnification ratio mt1 of a composite system of the objective lens and the coupling lens when the transparent substrate having the minimum thickness is used, is larger than −0.095, it is not advisable to use the coupling optical system. When mt1 is smaller than −0.22, the lateral magnification ratio mt2, in cases where the transparent substrate is thick, is increased further, and tends to be subject to the influence of changes of temperature, or the like. Further, the influence of distribution of the amount of the laser beams and the astigmatic difference becomes greater, resulting in deterioration of the performance.

Further, when mt1 is less than −0.12, the amount of a semiconductor laser can be sufficiently utilized and it can be utilized as the recording optical system.

When mt1 is lower than −0.17, and NA2 is greater than 0.5 at the second arrangement position, the system tends to be subject to the influence of changes of temperature, and the performance tends to be deteriorated due to the influence of the distribution of the amount of the semiconductor laser beam and astigmatic differences.

When the lateral magnification m01 of the objective lens single body at the first arrangement position, is greater than −0.06, the distance from the light beam source to the information reording medium is increased in order to maintain some working distance between the objective lens and the syurface of the substrate of the information rcording medium. When it is corrected by the coupling lens, the magnification ratio of the coupling lens is increased, and it is difficult to maintain satisfactory performance.

The allowable range in which a variation of the spherical aberration due to a change of distance from the laser beam source to the information recording medium, due to unintentional movement of the information recording medium, or the like, does not influence over the performance, is more than −0.18.

Further, when the objective lens is made of resin material, the allowable range in which not only a change of distance from the laser beam source to the information recording medium, due to unintentional movement of the information recording medium, or the like, but also a change of the temperature does not influence over the performance, is more than −0.13.

When the coupling lens is formed as a spherical single lens, the lens is easily processed and its performance can be maintained at low cost.

In cases where the objective lens related here is a high NA lens, when the magnification ratio $m_c$ of the coupling lens, viewed from the side opposite to the light beam source, is smaller than 0.48, its performance can not be maintained if the coupling lens is a spherical single lens.

Further, when the magnification ratio $m_c$ is larger than 0.85, it makes no sense to use a coupling lens in this optical system.

An embodiment to attain the second object of the present invention is accomplished by adopting any one of the following structures.

(1) In an optical disk apparatus for reproducing information signals from a plurality of types of optical disks, an optical pick-up apparatus has a correction means to correct conditions of an optical spot converged onto the information recording surface of the optical disk corresponding to the type of the optical disk, and the optical disk apparatus is characterized in that: the optical pick-up devie is supported so that it can linearly move between a position $P_{IN}$ inside the inner-most peripheral position in which information in a lead-in area in an information track of the optical disk can be read, and a position $P_{out}$ outside an outer-most peripheral position in which information in a lead-out area can be read; the correction means is driven by moving the optical pick-up apparatus from the outer-most peripheral position, in which information in the lead-out area can be read, to the $P_{out}$ position, by a feed motor; the corrected condition of the optical spot is determined as the first optical spot condition corresponding to the first type of optical disk; the correction means is driven by moving the optical pick-up from the inner-most peripheral position, in which information in the lead-in area can be read, to the $P_{IN}$ position by the motor; and the corrected condition of the optical spot is determined as the second optical spot condition corresponding to the second type of optical disk.

(2) In an optical disk apparatus for reproducing information signals from a plurality of types of optical disks, an optical pick-up apparatus has a correction means to correct conditions of the optical spot converged onto the information recording surface of the optical disk corresponding to the type of the optical disk, and the optical disk apparatus is characterized in that: the optical pick-up apparatus is supported so that it can linearly move between the lead-in area and the lead-out area including at least one of the position $P_{IN}$ inside the inner-most peripheral position in which information in the lead-in area in the information track of the optical disk can be read, and the position $P_{out}$ outside an outer-most peripheral position in which information in a lead-out area can be read; and the correction means is successively driven so that the condition of the optical spot is corrected by moving the optical pick-up apparatus from the inner-most peripheral position in which information in the lead-in area can be read, to the $P_{IN}$ position, or from the outer-most peripheral position in which information in the lead-out area can be read, to the $P_{OUT}$ position, by the feed motor.

(3) In an optical disk apparatus having an optical pick-up apparatus provided with a correction means for correcting the condition of the optical spot which is converged onto the information recording surface of the optical disk, corresponding to types of optical disk, the optical disk apparatus has an optical pick-up apparatus characterized in that: the correction means is driven to correct the condition of the optical spot by a drive means provided in a chassis portion when the optical pick-up apparatus is located at a position in which information in the lead-in area in the information track of the optical disk can be read, or located on the side of the inner periphery of said position.

(4) In an optical disk apparatus which is a means for correcting the conditions of the optical spot when a correction means for correcting the conditions of the optical spot which is converged onto the information recording surface of the optical disk corresponding to the types of optical disks, is moved linearly or rotatably in the optical pick-up apparatus, the optical disk apparatus has an optical pick-up apparatus characterized in that: the optical pick-up apparatus is supported so that it can move in the direction of the inner and outer periphery of the optical disk; and the direction of linear movement or the direction of the rotational axis of the rotational movement of the correction means is different from the direction of the movement to the inner and outer periphery.

(5) An optical disk apparatus having at least a correction means for correcting the conditions of the optical spot converged onto the information recording surface of the optical disk corresponding to types of the optical disks, the objective lens and an objective lens driving means in a movable portion which is linearly moved at high speed to the direction of the inner and outer periphery of the optical disk, the optical disk apparatus characterized in that: the correction means is arranged so that the center of gravity of the movable portion is not changed in a plane perpendicular to the direction of linear movement even when corrected by the correction means.

(6) The optical disk apparatus according to any of the apparatus (1) to (5), having: a correction condition detection means for detecting the condition of the correction means for correcting the condition of the optical spot converged onto the information recording surface of the optical disk corresponding to the types of optical disks; and a read-in position detection means for detecting that the optical pick-up apparatus positions lead-in areas of plurality of types of optical disks in a commonly readable position, the optical disk apparatus characterized in that a focus-search operation is carried out after detecting that outputs from the correction condition detection means and the read-in position detection means respectively coincide with predetermined values.

(7) The optical disk apparatus according to any of the apparatus (1) to (6), wherein the correction means of the optical pick-up apparatus corrects the condition of the optical spot by insertion and removal of a lens into the optical path and from the optical path from the laser beam source to the objective lens.

(8) The optical disk apparatus according to any of the apparatus (1) to (6), wherein the correction means of the optical pick-up apparatus corrects the condition of the optical spot by insertion and removal of a parallel plane plate into and from the converging luminous flux between the objective lens and the optical disk.

(9) The optical disk apparatus according to any of the apparatus (1) to (6), wherein the correction means of the optical pick-up apparatus corrects the condition of the optical spot by movement of the light beam source including the laser beam source in the direction of the optical axis.

(10) The optical disk apparatus according to any of the apparatus (1)m and (6), wherein the correction means of the optical pick-up apparatus corrects the condition of the optical spot by movement of a divergence changing lens arranged in the optical path from the laser beam source to the objective lens, in the direction of the optical axis.

(11) The optical disk apparatus according to any of the apparatus (1) to (6), wherein the correction means of the optical pick-up apparatus corrects the condition of the optical spot by selecting one of a plurality of objective lenses by movement of an objective lens driving means by which a plurality of objective lenses are integrally driven.

(12) The optical disk apparatus according to any of the apparatus (1) to (6), wherein the correction means of the optical pick-up apparatus corrects the condition of the optical spot by selecting one of a plurality of objective lenses when at least, the laser beam source, beam splitter or an optical detector is integrally moved with respect to the objective lens driving means by which a plurality of objective lenses are integrally driven.

(13) The optical disk apparatus according to any of apparatus (1) to (6), wherein the correction means of the optical pick-up apparatus, having an objective lens driving means for integrally driving a plurality of objective lenses, and having a mirror to bend the optical path by 90° between the objective lens driving means and the laser beam source, corrects the condition of the optical spot by selecting the objective lens, into which the laser beam enters, when the mirror is moved in the direction of the optical axis of the laser beam.

(14) The optical disk apparatus according to any of apparatus (1)to (13), wherein the correction means of the optical pick-up apparatus corrects the condition of the optical spot by adjusting the aperture diameter of the luminous flux entering into the objective lens.

(15) The optical disk apparatus according to any of apparatus (1) to (14), wherein the correction means of the optical pick-up apparatus corrects the condition of the optical spot by rotating the azimuth angle of 3-beams with respect to the direction of the track of the optical disk.

In the present invention, the correction means for correcting the condition of the optical spot converged onto the information recording surface of the optical disk corresponding to a plurality of types of optical disks in which the thickness of the substrates or the information recording density are different from each other, is provided in the optical pick-up apparatus. Driving the correction means is carried out by the driving force of the feed motor of the optical pick-up apparatus, or by the drive means such as a motor or solenoid provided on a chassis, which is provided separately from the optical pick-up apparatus, without mounting the driving means, such as a motor or a solenoid, on the optical pick-up apparatus.

In this connection, the correction of the condition of the optical spot is carried out using one or a plurality of the following methods, 1. the aberration correction corresponding to the thickness of the optical disks
2. the correction of the optical spot size corresponding to the difference of the information recording density
3. rotation of an azimuth angle of 3-beams corresponding to the difference of the track pitches.

BRIEF DESCRIPTION OF THE DRAWINGS

FIG. 43(a) is a view of the spherical aberration when the thickness of the transparent substrate is 0.6 mm. FIG. 43(b) is a view of the spherical aberration when 1.2 mm thickness of the transparent substrate is inserted while 0.6 mm thickness of the transparent substrate is arranged. FIG. 43(c) is a view of the spherical aberration when the optical system is adjusted for 1.2 mm thickness of the transparent substrate.

FIG. 46(a) is a view of the spherical aberration when the thickness of the transparent substrate is 0.6 mm. FIG. 46(b) is a view of the spherical aberration when 1.2 mm thickness of the transparent substrate is inserted while 0.6 mm thickness of the transparent substrate is arranged. FIG. 46(c) is a view of the spherical aberration when the optical system is adjusted for 1.2 mm thickness of the transparent substrate.

FIG. 49(a) is a view of the spherical aberration when the thickness of the transparent substrate is 0.6 mm. FIG. 49(b) is a view of the spherical aberration when 1.2 mm thickness of the transparent substrate is inserted while 0.6 mm thickness of the transparent substrate is arranged. FIG. 49(c) is a view of the spherical aberration when the optical system is adjusted for 1.2 mm thickness of the transparent substrate.

FIG. 52(a) shows the spherical aberration when the thickness of the transparent substrate is 0.6 mm. FIG. 52(b) shows the spherical aberration when the transparent substrate of 1.2 mm thickness is inserted while the transparent substrate of 0.6 mm thickness is arranged. FIG. 52(c) shows the spherical aberration when the thickness of the transparent substrate is adjusted to 1.2 mm.

FIG. 55(a) shows the spherical aberration when the thickness of the transparent substrate is 0.6 mm. FIG. 55(b) shows the spherical aberration when the transparent substrate of 1.2 mm thickness is inserted while the transparent substrate of 0.6 mm thickness is arranged. FIG. 55(c) shows the spherical aberration when the thickness of the transparent substrate is adjusted to 1.2 mm.

FIG. 58(a) shows the spherical aberration when the thickness of the transparent substrate is 0.6 mm. FIG. 58(b) shows the spherical aberration when the transparent substrate of 1.2 mm thickness is inserted while the transparent substrate of 0.6 mm thickness is arranged. FIG. 58(c) shows the spherical aberration when the thickness of the transparent substrate is adjusted to 1.2 mm.

FIG. 61(a) shows the spherical aberration when the thickness of the transparent substrate is 0.6 mm. FIG. 61(b) shows the spherical aberration when the transparent substrate of 1.2 mm thickness is inserted while the transparent substrate of 0.6 mm thickness is arranged. FIG. 61(c) shows the spherical aberration when the thickness of the transparent substrate is adjusted to 1.2 mm.

DETAILED DESCRIPTION OF THE PREFERRED EMBODIMENT

1. Examples (1–11) relating to the first and second embodiments to attain the first object will be described below.

Each example (1–11) includes the following numerical values. A laser beam source is defined as the zero-th surface, and the radius of curvature of the i-th surface, (including a diaphragm surface), counted from the zero-th surface in order, is expressed by ri, an interval between the i-th surface and the (i+1)-th surface is expressed by di, and a refractive index of a medium between the i-th surface and the i+1-th surface in the wavelength of a luminous flux of the laser beam source is expressed by ni. The refractive index of air is defined as 1.

In the case where an aspherical surface is used for a lens surface, the shape of the aspherical surface is expressed by the following equation when the conical coefficient is k, the aspherical surface coefficient is Ai, and the numerical exponent of the aspherical surface is Pi in an orthogonal coordinate system in which the vertex of the surface is the origin, and the direction of the optical axis is defined as the X-axis.

$$x = \frac{C\phi^2}{1+\sqrt{1-(1+\kappa)C^2\phi^2}} + \Sigma A i \phi^{Pi} \quad \text{[Equation 1]}$$

$$\phi = \sqrt{y^2+z^2}, \quad C = 1/r$$

EXAMPLE 1

Figure 1:
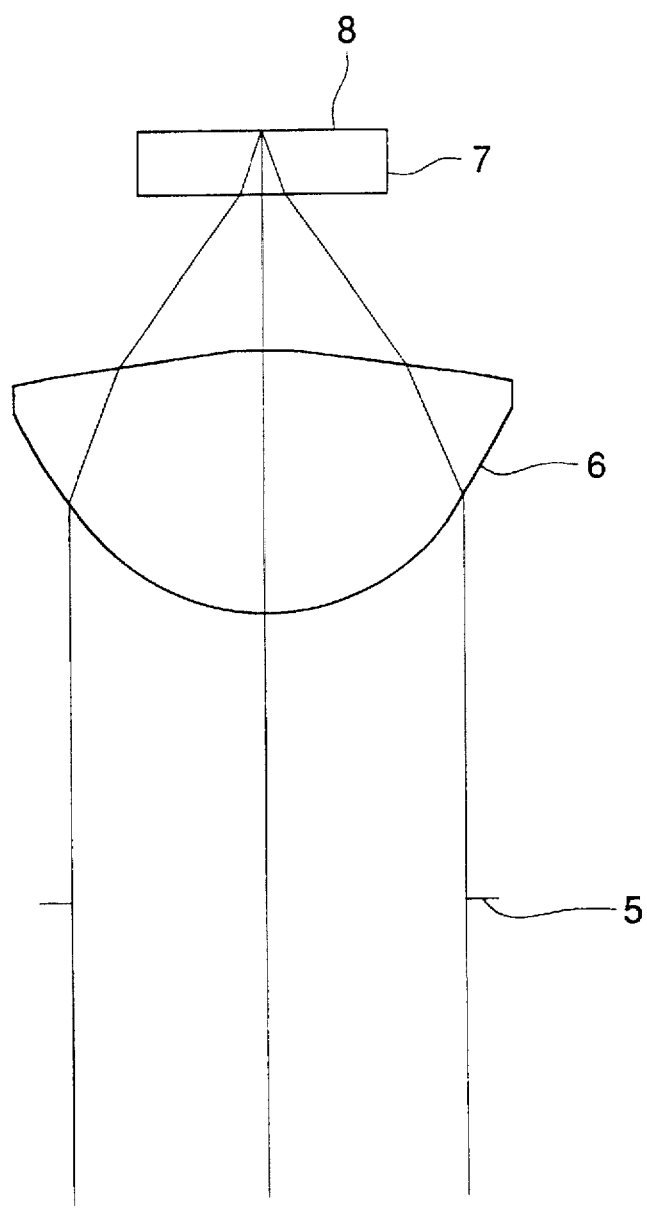
FIG. 1 is a view showing the optical path of an objective lens in which the aberration correction is optimized.
Figure 2:
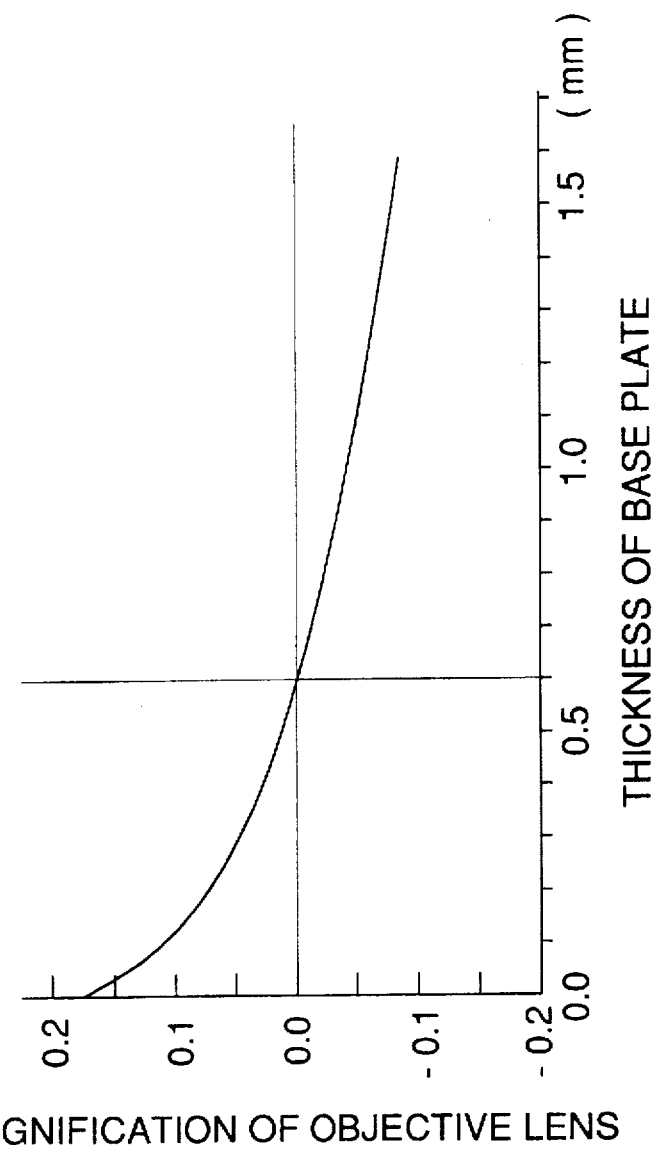
FIG. 2 is a view showing the relationship between the thickness of the substrate and the divergence degree when the objective lens shown in FIG. 1 is used.
Figure 3:
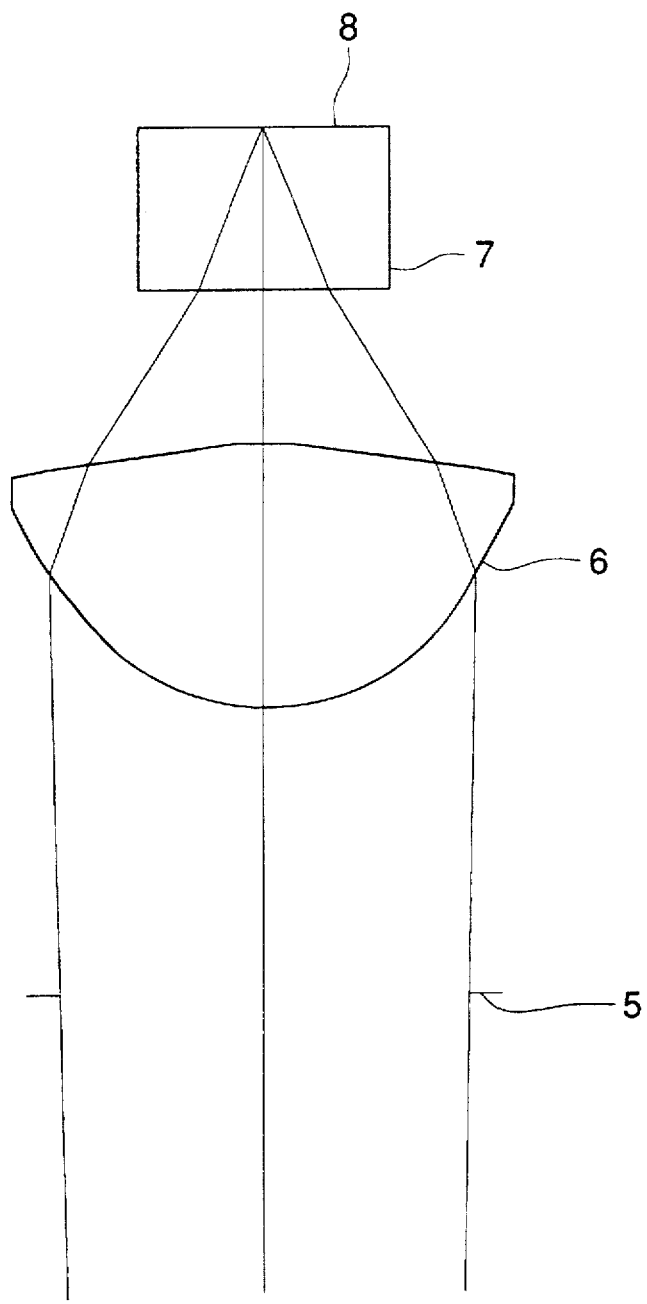
FIG. 3 is a view showing the case in which divergent light beams enter into the objective lens when the thickness of the substrate is increased.
Figure 4:
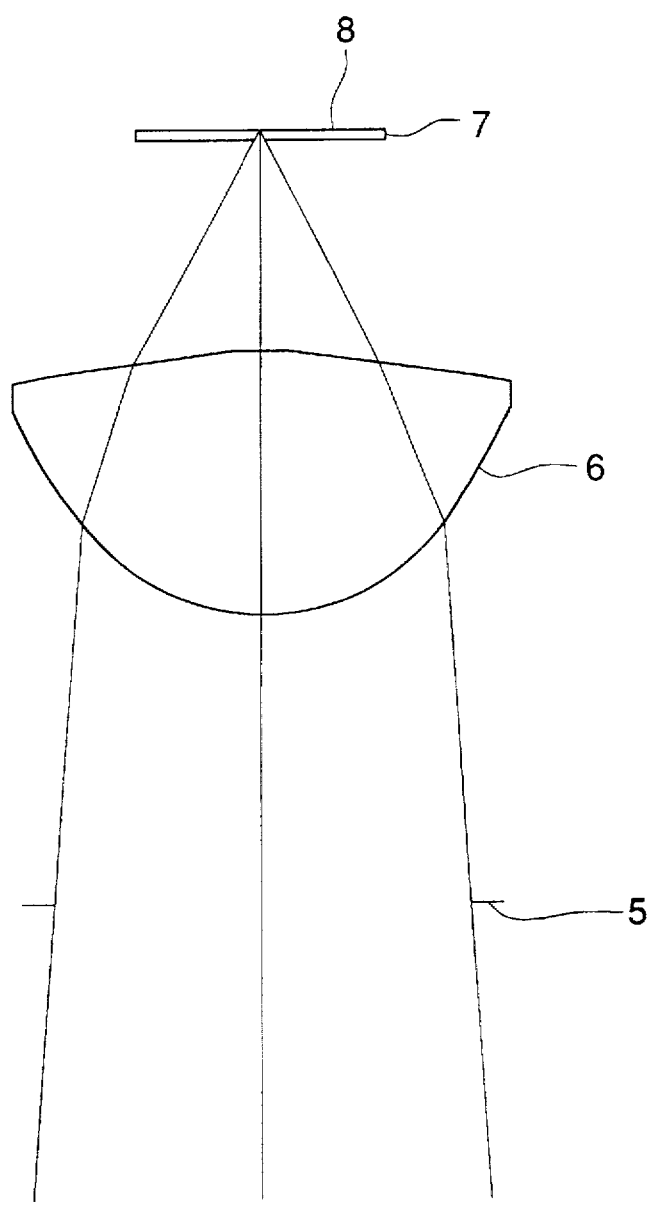
FIG. 4 is a view showing the case in which convergent light beams enter into the objective lens when the thickness of the substrate is decreased.
Figure 5:
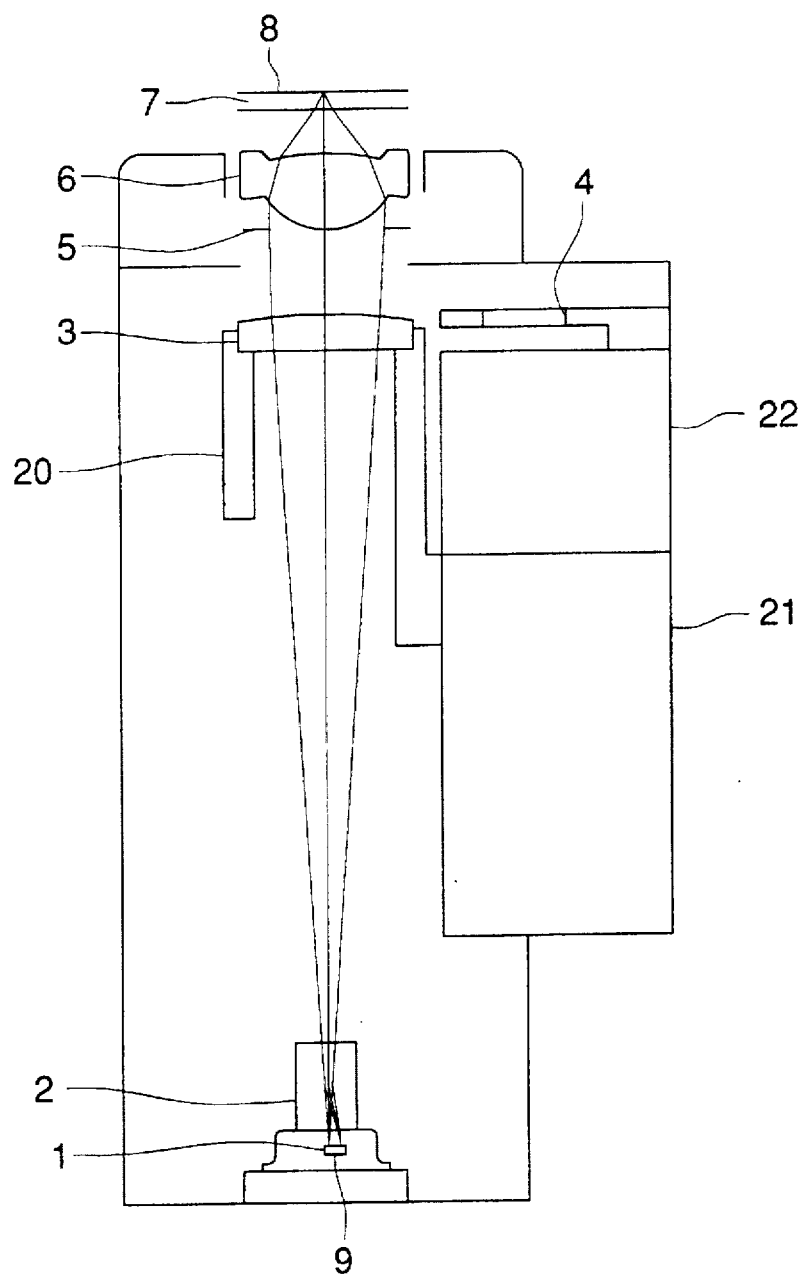
FIG. 5 is a view corresponding to the case where the thickness of the first substrate is 0.6 mm in Example 1.

FIG. 5 shows the structure of this system when an optical information recording medium of the first substrate thickness of 0.6 mm is read.

The luminous flux emitted from a laser beam source 1 passes through a hologram beam splitter 2, further passes through a lens 3 held by a frame 20 which is movable in the direction of the optical axis, and becomes almost a parallel luminous flux. The flux is limited to a predetermined luminous flux by a diaphragm 5, and enters into an objective lens 6. The luminous flux entered into the objective lens 6 is converged by the objective lens 6 onto a information recording surface 8 through a substrate 7. The luminous flux, modulated by an information pit located on the information recording surface 8 and reflected on the information recording surface 8, returns to the hologram beam splitter 2 after passing through the objective lens 6 and the lens 3, and is separated from the optical path of the laser beam source 1, and then, enters into a light receiving means 9. The light receiving means 9 is composed of multi-divided PIN photodiodes, and a current proportional to the strength of the entered luminous flux, flows from each element. This current is sent to a detection circuit system, not shown in the drawing, and an information signal, a focus error signal, and a track error signal are generated in this detection circuit system. A 2-dimensional actuator (not shown in the drawings) composed of a magnetic circuit and coils, or the like, controls the objective lens 6 and the diaphragm 5 which are integrally provided with each other, according to the focus error signal and the track error signal, so that the optical spot position always coincides with the information track. An example of numerical values in the example shown in FIG. 5 is shown below.

| i | ri | di | ni |
|---|---|---|---|
| 0 |  | 0.55 | 1 |
| 1 | ∞ | 3.0 | 1.514546 |
| 2 | ∞ | 23.9 | 1 |
| 3 | −156 | 1.2 | 1.878333 |
| 4 | −20.58 | 2.9 | 1 |
| 5 | Diaphragm ∞ | 0 | 1 (φ3.99) |
| 6 | 2.0282 | 2.6 | 1.4981 |
| 7 | −5.223 | 1.526 | 1 |
| 8 | ∞ | 0.6 | 1.58 |
| 9 | Information recording surface | | |

Aspherical coefficient of i = 6

$\kappa = -0.54772$
| | |
|---|---|
| $A_1 = 5.0718 \times 10^{-4}$ | $P_1 = 4.0000$ |
| $A_2 = 3.2560 \times 10^{-5}$ | $P_2 = 6.0000$ |
| $A_3 = -6.0919 \times 10^{-6}$ | $P_3 = 8.0000$ |
| $A_4 = -1.6366 \times 10^{-6}$ | $P_4 = 10.0000$ |

Aspherical coefficient of i = 7

$\kappa = -21.8737$
| | |
|---|---|
| $A_1 = 9.8897 \times 10^{-3}$ | $P_1 = 4.0000$ |
| $A_2 = -2.9123 \times 10^{-3}$ | $P_2 = 6.0000$ |
| $A_3 = 5.7052 \times 10^{-4}$ | $P_3 = 8.0000$ |
| $A_4 = -5.0245 \times 10^{-5}$ | $P_4 = 10.0000$ |

In this example, a divergent degree of the luminous flux entered into the objective lens 6 corresponds to a little convergent light, the wavefront aberration on the axis is 0.001 λrms at 0.6 NA, and 0.006 λrms, on the information recording surface side, when the objective lens is shifted by 0.1 mm by tracking. The reason for a little convergent light is to eliminate the spherical aberration generated by the lens 3, by the objective lens.

A total magnification ratio of the lens 3 and the objective lens 6 between the laser beam source 1 and the information recording surface 8 is −0.123, and NA on the side of the laser beam source is 0.074. Herein, the NA on the laser beam source side means an effective NA actually guided to the optical information recording medium, in the luminous flux emitted from the laser beam source, and it is obtained by the following equation:

(NA on the information recording surface side)×(the magnification ratio between the laser beam source and the information recording surface)

A semiconductor laser having a wave length of 635 nm is used as the laser beam source 1, and the divergent light of the semiconductor laser forms oval-shaped light beams of about 7°, and 30° in the full width half maximum. In this example, as described above, NA on the side of the laser beam source is 0.074, and the luminous flux corresponding to a divergent angle of 4.3° at the central portion is used. Accordingly, it can be considered that the intensity is almost uniform.

Generally, the semiconductor laser has the astigmatism of about 5 to 10 μm, however, in this example, since the magnification ratio is −0.123, the astigmatism is a sufficiently small value of about 0.08 to 0.15 μm on the information recording surface, so that the astigmatism can be neglected.

Next, when a 1.2 mm optical information recording medium, which is thicker than the first recording medium, is read, the lens 3, which is a divergence changing means, is moved to the second position on the side of the laser beam source in the direction of the optical axis by a moving means 21. Simultaneously, in order to adjust NA of the luminous flux entering into the optical formation recording medium, the second diaphragm means 4 is inserted into the optical path by a control means 22.

Figure 6:
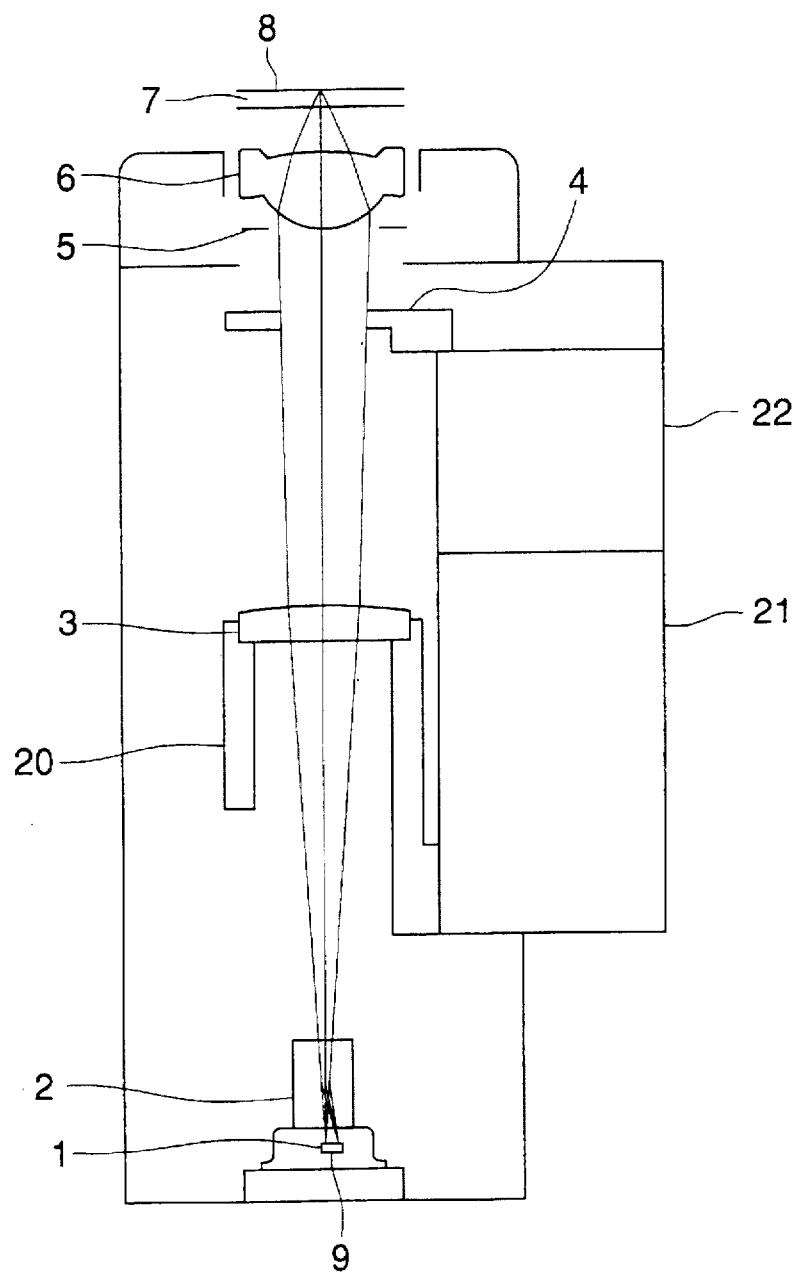
FIG. 6 is a view corresponding to the case where the thickness of the second substrate is 1.2 mm in Example 1.

The structure in the above case is shown in FIG. 6. A numerical example in the example shown in FIG. 6 is as follows.

| i | ri | di | ni |
|---|---|---|---|
| 0 |  | 0.55 | 1 |
| 1 | ∞ | 3.0 | 1.514546 |
| 2 | ∞ | 14 | 1 |
| 3 | −156 | 1.2 | 1.878333 |

-continued

| i | ri | di | ni |
|---|---|---|---|
| 4 | −20.58 | 10.99 | 1 |
| 5 | Diaphragm ∞ | 2.0 | 1 (φ3.51) |
| 6 | 2.0282 | 2.6 | 1.4981 |
| 7 | −5.223571 | 1.341 | 1 |
| 8 | ∞ | 1.2 | 1.58 |
| 9 | Information recording surface | | |

Aspherical coefficients of i=6 and i=7 have the same value as that the example shown in FIG. 5.

The magnification of the total lenses of the lens 3 and the objective lens 6 is −0.16 between the laser beam source 1 and the rcording surface 8, the NA on the side of the information recording surface is 0.52, and the NA on the side of the light beam source is 0.083. The wavefront aberration on the axis is 0.003 λrms, and 0.016 λrms when the objective lens is shifted by 0.1 mm by tracking. In this connection, the second diaphragm means 4 is not moved during tracking of the objective lens.

As described above, when the lens 3 is moved in the direction of the optical axis of the luminous flux of the laser beam source, the spherical aberration due to the difference of the thickness of the substrate can be canceled by changing the divergence degree of the luminous flux entering into the objective lens, and information of the optical information recording medium having a different substrate thickness can be read.

When the lens system corresponds to only two types of substrate thickness (for example, 0.6 mm, and 1.2 mm), the moving means 21 may mechanically push a frame holding the lens 3 to two points for fixing, by using a motor and a solenoid, resulting in a simple structure.

When the lens system corresponds to more than 3 types of substrate thickness, a position sensor to detect a position of the lens 3 is provided and the moving means 21 may be controlled by the output from this sensor.

Further, a control means 22 to attach or detach the diaphragm means 4 can be interlocked with the moving means 21, and its overall dimensions can be reduced when it is driven by a motor or a solenoid.

Further, fluctuation of the thickness of the substrates can also be corrected when the lens position 3 is minutely adjusted by the moving means 21.

When the thickness of the substrate is not 0.6 mm, but 0.57 mm or 0.63 mm at 0.60 NA on the side of the recording surface, the aberration of 0.03 λrms is respectively generated. In the case of a 0.57 mm substrate thickness, when the lens 3 is moved to the side of the objective lens by 0.9 mm so that the converging light is entered further into the objective lens 6, the aberration is corrected to 0.001 λrms. When the thickness of the substrates 0.63 mm, the lens 3 is moved to the side of the laser beam source by 0.85 mm so that the divergent light is entered into the objective lens 6, and the aberration can be corrected to 0.001 λrms.

Further, by this method, the aberration of each surface of the optical information recording medium, having a plurality of information recording surfaces in the direction of the thickness, can be corrected most appropriately.

For example, when there are 2 more information recording layers at 0.03 mm intervals in the direction of the thickness in the 0.57 mm thickness substrate, aberration correction corresponding to 0.6±0.03 mm may be carried out, and in this case, the movement of lens 3 of the same amount as in the case of the error correction of ±0.03 mm may be carried out.

In order to correct the fluctuation of the substrate thickness, after at least a focusing-servo operation is applied on the information recording surface 8 of the optical information recording medium, the position of the lens 3 is moved so that the amplitude of the reproduced signal becomes larger, or jittering becomes smaller. When the above operation is carried out during information reproducing, or during waiting under the condition that at least the focusing-servo operation is applied, then, generation of spherical aberration due to temperature and humidity in the information pick-up system or the optical information recording medium, can be corrected.

In this example, when the thickness of the substrate is 0.6 mm, the objective lens 6, in which the aberration is corrected by incidence of the parallel light, is used. When the thickness of the substrate is 1.2 mm, the objective lens 6, in which the aberration is corrected by incidence of the parallel light, is used, and as the lens which is the divergence changing means, a lens through which a parallel luminous flux is emitted at the first lens position separated from the objective lens, is used. When the converging luminous flux is emitted through the lens at the second position near the objective lens, this lens system can also correspond to two or more types of substrate thickness.

Alternatively, for example, a lens, the aberration of which is corrected by incidence of the parallel light in the case of the 0.8 mm substrate thickness, is used as the objective lens. In the case of 0.6 mm thickness, the converging light maybe emitted through the lens, which is the divergence changing means, at the second position near the objective lens 6, and in the case of 1.2 mm thickness, the divergent light may be emitted through the lens, which is the divergence changing means, at the first position separated from the objective lens 6.

In this connection, it is preferable that the spherical aberration, generated depending on the substrate thickness, is eliminated so that the optical spot has no aberration, and that the optical spot has a size which is most appropriate depending on the types of the information recording surface of the optical information recording medium. The optical spot size is mainly determined depending on NA on the light emergent side of the objective lens, and the wavelength. In the case where information is read from the information recording surface in which a pit-string is recorded in the shape of track, when NA is too larger with respect to the pit-string, and the optical spot size is too small, the tilt error, thickness error, polarization dependency, and a symmetry of eye-pattern, of the substrate, become larger.

Accordingly, a diaphragm diameter changing means to determine the optical spot size depending on the difference of types, specifically, depending on the difference of recording density represented by the track pitch, is prepared. When the diaphragm diameter is reduced, and NA is reduced, the optical spot size becomes larger. For example, the diaphragm diameter is reduced so that: λ/NA=approximately 1.75 (μm) in the case of the medium of the CD standard, and NA on the side of the information recording surface is approximately 0.36 when λ=635 nm. When the diaphragm diameter is reduced as described above, the aberration generated at the time of focusing and tracking of the objective lens, and the accuracy of lens setting by which the lens which is the divergence changing means is positioned at the second position separated from the objective lens, can be reduced.

When parallelism between the objective lens and the substrate deviates due to warping or waviness of the substrate, or an assemble error of the information pick-up apparatus, etc., coma is generated. The larger NA on the side of the information recording surface is, or the larger the substrate thickness is, the larger the coma is. When the coma is generated, the first ring of the optical spot becomes asymmetric, resulting in deterioration of the reproduction signal. Accordingly, when the divergence degree of the luminous flux entering into the objective lens 6 is changed and the lens system corresponds to the thicker substrate, it is preferable that NA of the luminous flux entering into the information recording surface is reduced. Although NA 0.6 is reduced to 0.52 in the example, NA on the side of the information recording surface can be reduced by a single diaphragm means when the thickness of the substrate is large, and the divergence degree of the luminous flux entering into the objective lens is large, by setting a diaphragm, movable at the time of focusing and tracking, on the side of the information recording medium separated from a focal position on the side of incidence of the luminous flux into the objective lens, integrally with the objective lens. The nearer the diaphragm means to the surface of the information recording medium, the larger the effect is. Therefeore, the diaphragm means is preferably provided on the side of emission of the light of the objective lens.

In the example shown in FIG. 6, when the substrate is inclined by 0.3°, the front wave aberration is reduced to 0.04 λrms. This is almost coma. In this connection, in this structure, non-parallel light is entered into the objective lens 6, and when the objective lens 6 is shifted by tracking, coma is generated. Accordingly, when the optical information recording medium is inclined by warping or the like, the coma can be canceled when the objective lens 6 is shifted. In the case where the substrate is inclined by 0.3°, the wavefront aberration of 0.04 λrms can be reduced to 0.009 λrms, when a DC bias current is applied on a tracking actuator and the objective lens 6 is shifted by 0.22 mm.

EXAMPLE 2

Figure 7:
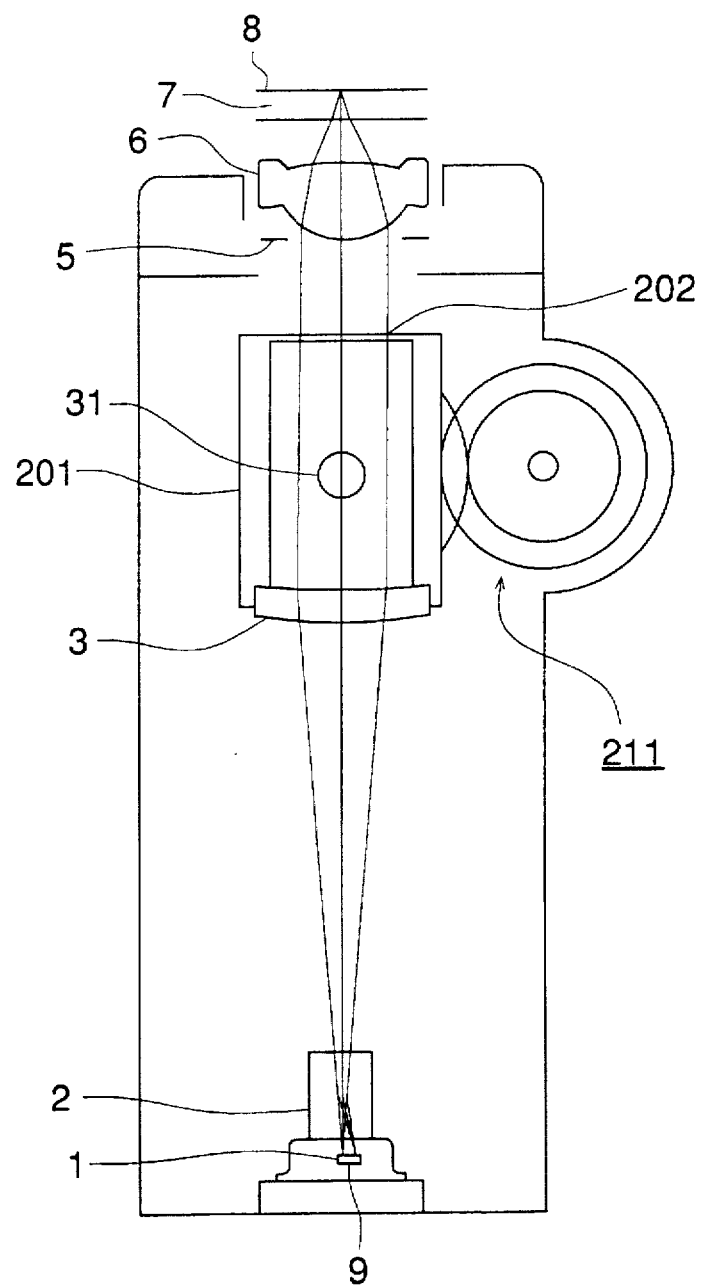
FIG. 7 is a view corresponding to the case where the thickness of the second substrate is 1.2 mm in Example 2.

The information pick-up apparatus using a moving means, in which a lens frame rotating means 211 for reversing and moving the lens 3 between the beam splitter 2 and the objective lens 6 is used, is shown in FIG. 7 as the information pick-up apparatus to reproduce two types of optical information recording medium in which a 0.6 mm substrate is used as the substrate of the first thickness, and a 1.2 mm substrate is used as the thicker substrate of the second thickness. FIG. 7 shows the optical system in which the laser beam source 1, beam splitter 2, lens 3, objective lens 6, the optical detector as the light receiving means 9, which are the same as those in Example 1, are used, and when the information on the information recording surface of the 0.6 mm substrate is read, the positional arrangement of the optical system is the same as that in FIG. 5 in Example 1. The aberration is 0.001 λrms on the axis, and when the objective lens is shifted by 0.1 mm by tracking, the aberration is 0.006 λrms.

FIG. 7 shows the structure of the optical system when the information recording surface of 1.2 mm thickness substrate is reproduced.

| i | ri | di | ni |
|---|---|---|---|
| 0 |  | 0.55 | 1 |
| 1 | ∞ | 3.0 | 1.514546 |
| 2 | ∞ | 15.4 | 1 |
| 3 | 20.58 | 1.2 | 1.878333 |
| 4 | 156 | 9.6 | 1 |
| 5 | Diaphragm | 2 | 1 (φ2.43) |
| 6 | 2.0282 | 2.6 | 1.4981 |
| 7 | −5.2236 | 1.328 | 1 |
| 8 | ∞ | 1.2 | 1.58 |
| 9 | Information recording surface | | |

The aspherical surface coefficients of i=6 and i=7 are the same as those in Example 1.

In this structure, NA on the side of the information recording surface is 0.36;

NA on the side of the laser beam source is 0.057; the magnification ratio between the laser beam source and the information recording surface is −0.158;

the wavefront aberration on the axis is 0.001 λrms; and the wavefront aberration at the time of 0.1 mm shift of the objective lens is 0.006 λrms. When the lens 3 is reversed, an under-spherical aberration generated by the lens 3, and the effect of correction of the overcorrected-spherical aberration due to an increase of the substrate thickness is increased. The lens 3 is held in a lens holding frame 201, and when it is rotated around an axis 31 which is perpendicular to the optical axis, the first position and the second position are switched. For this switching operation, a motor or a solenoid can be used.

When the motor is used, the lens 3 is moved to the first position (or the second position), and an amount of rotation of the lens holding frame 201 is minutely adjusted. Thereby, the coma generated by the inclination of the substrate can be eliminated. In this case, the direction of the rotation axis 31 is set so that the lens holding frame can be minutely adjusted by the rotation of the lens 3 in the direction in which the inclination of the substrate tends to occur.

In this example, NA on the side of the laser beam source is 0.074 in the case of the 0.6 mm thickness substrate, and NA on the side of the laser beam source is 0.057 in the case of the 1.2 mm thickness substrate. In this case, the utilization factor of the laser beam is about 1:0.59. Accordingly, light intensity detected by the light detector is also 1:0.59, and each signal intensity is lowered when using the 1.2 mm thickness substrate. Accordingly, when the divergent degree of the laser beam is switched to that used at the time of 1.2 mm thickness substrate, it is preferable that the amount of the laser beam is simultaneously increased by approximately 70%, or a gain of the processing system for detecting the current outputted from the light detector is increased by approximately 70%.

Reversely, when the NA on the side of the information recording surface is about 0.47 corresponding to the 1.2 mm thickness substrate, the NA on the side of the laser beam source is 0.074. Accordingly, even when the thickness of the substrate is different, the utilization factor of the laser beam is almost equal, so that adjustment of the amount of the laser beam, and the structure of the signal processing system become simple.

Further, a diaphragm 202 can be integrally provided with the lens holding frame 201 at a portion distant from the lens 3 on the lens holding frame 201, resulting in a simpler structure.

When a 3-beam method is used for detecting the deviation (track-error) between the information track and the optical spot on the information recording surface, a diffraction grating is arranged in the optical path between the laser beam source and the beam splitter, and ±1-order light diffracted by the grating is converged onto the information recording surface as the optical spot which is shifted by a ¼ track from the center of the information track. This reflected light is received by the light detector, and is detected as a tracking error signal.

Figure 8:
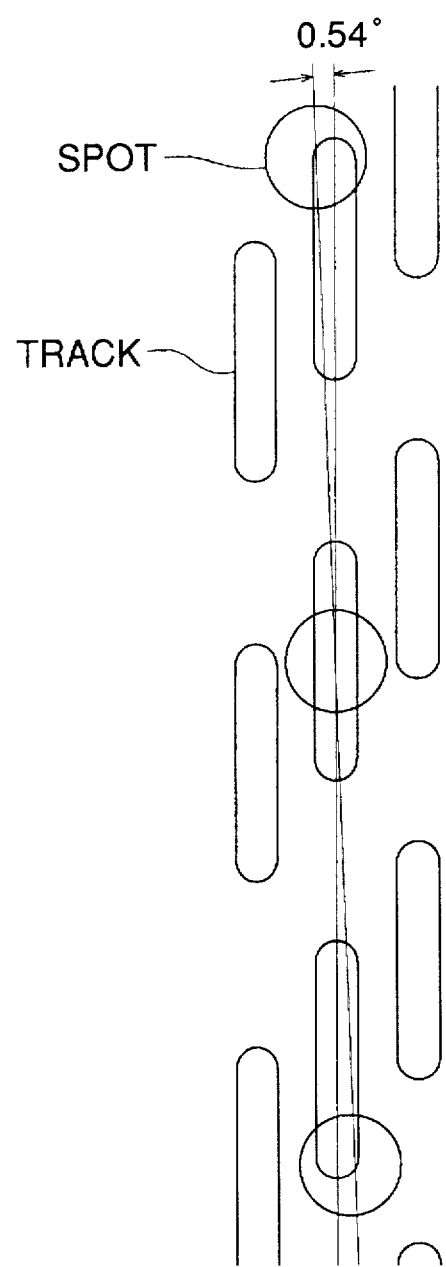
FIG. 8 is a view of a 3-spot arrangement on the track (track pitch 0.75 mm).

In this example, when the track pitch on the information recording surface of the optical information recording medium having a 0.6 mm substrate thickness is 0.75 µm, and spot intervals among ±1-order light spots and the reading spot due to the 0-order light are 20 µm, and when an angle, formed by a line connecting these three spots and the information track, is 0.54°, then, the deviation is ¼ track (FIG. 8).

Figure 9:
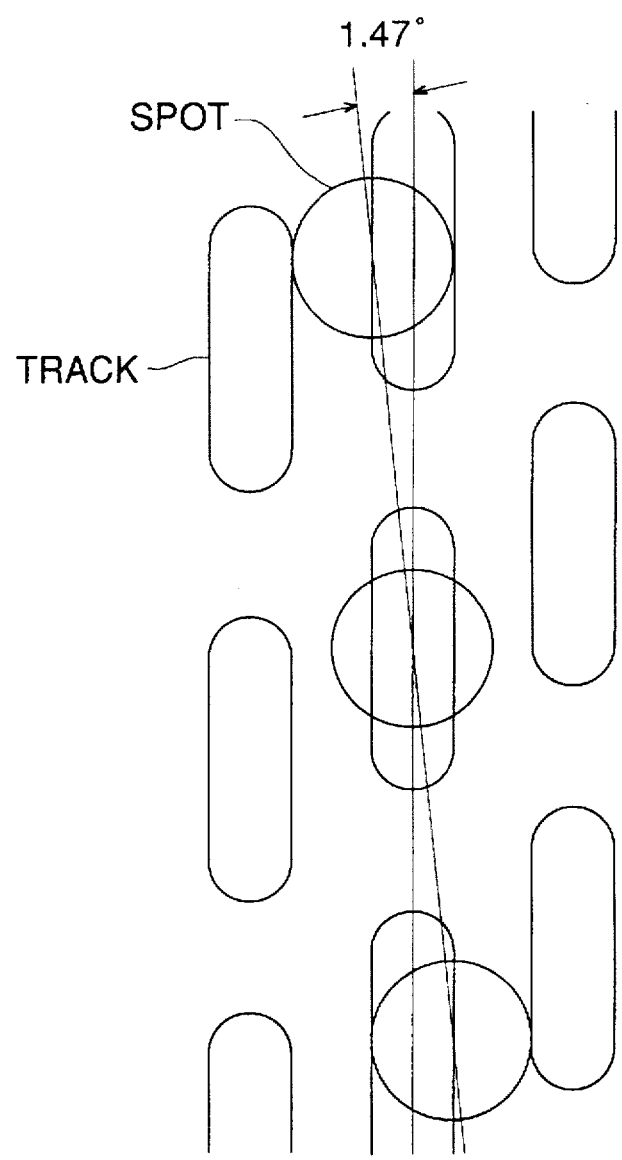
FIG. 9 is another view of 3-spot arrangement on the track (track pitch 1.6 mm).

In this case, when the lens 3 is rotated at the 1.2 mm substrate thickness, the magnification ratio between the laser beam source and the information recording surface is changed from −0.123 to −0.158, and the spot intervals between the ±1-order light spots and the reading spot are 15.6 µm. In this case, when the track pitch of the information track on the information recording surface is 1.6 µm, it is preferable that the angle formed by a line connecting these 3 spots and the information track is 1.47° (FIG. 9).

Accordingly, it is preferable that the divergent angle is changed corresponding to the substrate thickness, and the angle formed between the line connecting 3 spots on the information recording surface and the information track, is changed corresponding to the pitch of the information track.

This can be realized by the following methods: only diffraction grating is integrally held and rotated; the laser beam source, diffraction grating, beam splitter, and light detector are integrally rotated around the optical axis extending to the objective lens; or the entire information pick-up apparatus is rotated with respect to the optical information recording medium.

A light beam projecting and receiving unit is integrally provided with the laser beam source, beam splitter and light beam detector, and when the light beam projecting and receiving unit is moved in the direction of the optical axis in the same manner as in Example 12, which will be described later, the range of the thickness of the substrate by which the spherical aberration can be corrected, is more enlarged. Further, when the mechanism is simplified and the light beam projecting and receiving unit is moved by the 2-point switching method, this system can correspond to 4-thicknesses of the substrate in combination with 2-point rotational movement of the divergence changing lens.

EXAMPLE 3

Figure 10:
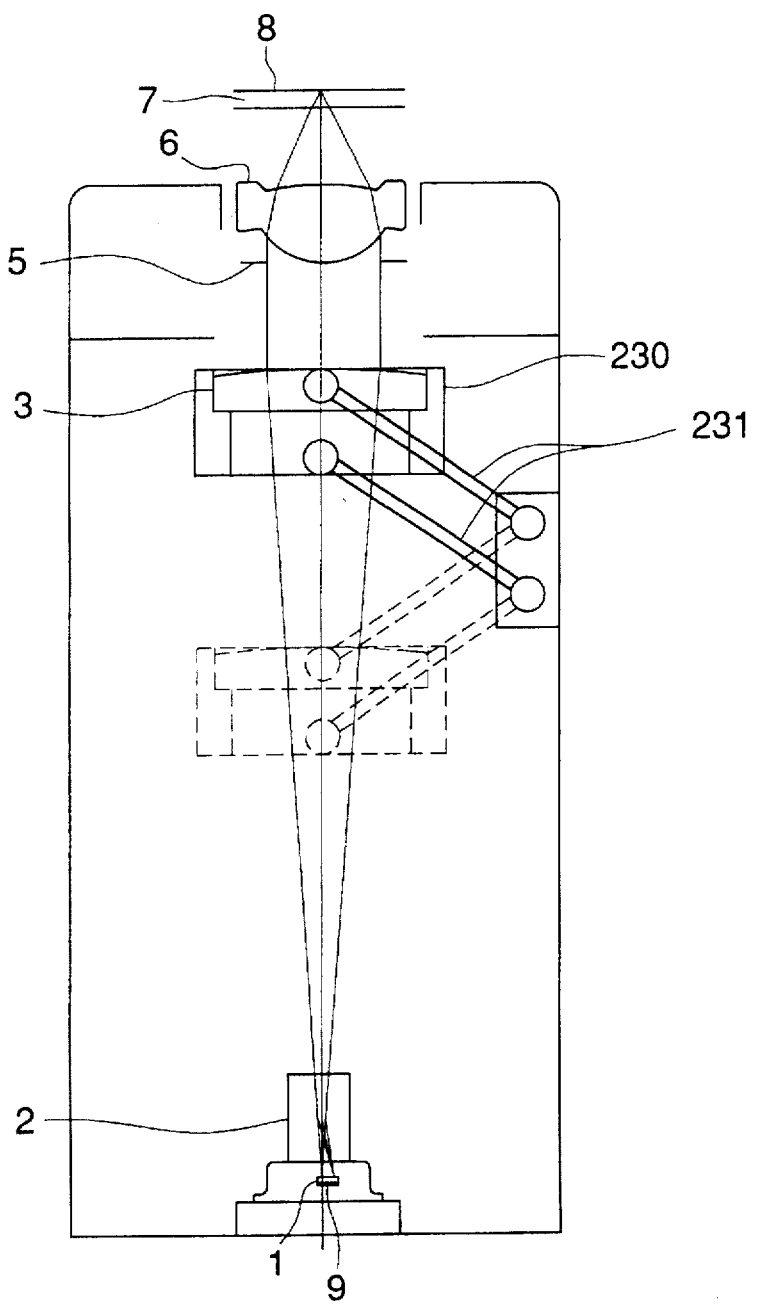
FIG. 10 shows Example 3 in which the lens is moved in an optical axis direction using a lens frame moving means having a circular arc movement.

As Example 3, an optical pick-up apparatus, in which a lens frame moving means 231, for circularly moving the lens 3 between the beam splitter 2 and the objective lens 6 as a moving means, is used, is shown in FIG. 10 as an optical pick-up apparatus to reproduce 2 types of optical information recording mediums, respectively having a first substrate thickness of 0.6 mm and a second substrate thickness of 1.2 mm, which is thicker than the first substrate thickness. A laser beam source 1, beam splitter 2, lens 3, lens 6, and light receiving means 9, etc., are the same as those in Example 1. A diaphragm means 5 to determine NA on the side of the information recording surface, is provided on the side of emission of the objective lens 6, and can be moved at focusing and tracking integrally with the objective lens. A lens frame 230 is supported by the optical pick-up main body using 2-parallel links so as to rotate around the axis perpendicular to the optical axis. Because parallel links are used, even when the lens frame is rotated, the lens 3 can maintain its perpendicularity with respect to the optical axis connecting the laser beam source 1 to the objective lens.

In the arrangement shown by a solid line in the drawing, the luminous flux diversed from the laser beam source 1, is formed into parallel luminous flux through the lens 3 which is the divergence changing means, and enters into the objective lens 6. Then, the diameter of the luminous flux is reduced to a predetermined NA by the diaphragm means 5, and converged onto the information recording surface 8 as an almost non-aberration optical spot through the substrate 7 having the first substrate thickness of 0.6 mm.

The number of the link may be one when the lens frame is contacted with the side of the optical pick-up apparatus main body, and the perpendicularity of the lens 3 with respect to the optical axis can be maintained by being pushed by a spring.

The reason for the diaphragm means 5 being arranged at the side of emission of the objective lens 6, is as follows. When the lens 3 is positioned at a position corresponding to the 1.2 mm substrate thickness as shown by a dotted line, and diverging light beams are entered into the objective lens 6, NA on the side of the information recording surface is reduced further. When NA is reduced, generation of the coma due to inclination of the substrate can be suppressed. The diaphragm means 5 is set close to the substrate within the range in which the required operation distance from the substrate surface can be obtaibed. In order to prevent damage onto the substrate, a self-lubrication property is preferably provied on the side of information recording medium of the diaphragm means 5.

EXAMPLE 4

In this example, the optical system in Example 1 is used and the optical information recording medium of the 0.6 mm thickness substrate is reproduced. When the substrate thickness is 1.2 mm, an optical element 401 having a concave lens function by which the divergent degree is increased, is inserted into the optical path from the laser beam source to the objective lens.

Figure 11:
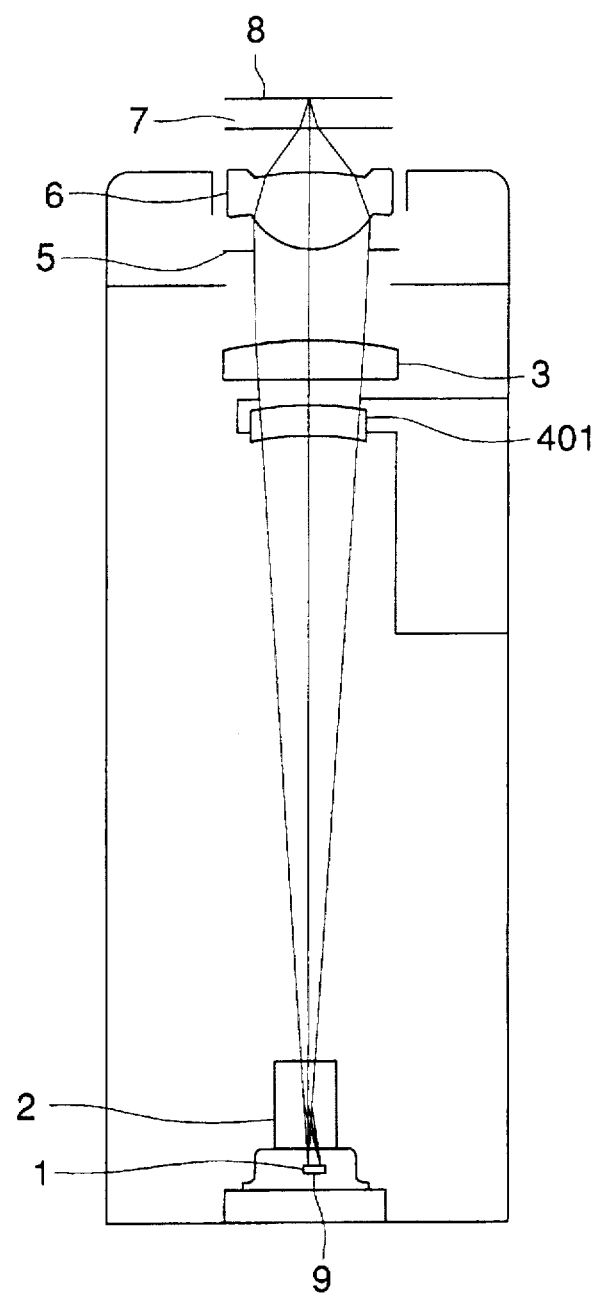
FIG. 11 is a view corresponding to the thickness of 1.2 mm of the second substrate in Example 4.

The structure at the 1.2 mm thickness substrate is shown in FIG. 11.

The structure of the optical system is as follows.

| i | ri | di | ni |
|---|---|---|---|
| 0 |  | 0.55 | 1 |
| 1 | ∞ | 3 | 1 |
| 2 | ∞ | 21.9 | 1 |
| 3 | −10.2174 | 1 | 1.4981 |
| 4 | −23.0258 | 1 | 1 |
| 5 | −156 | 1.2 | 1.878333 |
| 6 | −20.58 | 3.06 | 1 |
| 7 | 2.0282 | 2.6 | 1.4981 |
| 8 | −5.2236 | 1.367 | 1 |
| 9 | ∞ | 1.2 | 1.58 |
| 10 | Information recording surface | | |

Aspherical coefficient of i = 4

$\kappa = 14.94238$
$A_1 = 1.6539 \times 10^{-4}$
$A_2 = 6.9517 \times 10^{-4}$
$A_3 = 8.2519 \times 10^{-6}$
$A_4 = -4.6438 \times 10^{-6}$ $P_1 = 4.0000$
$P_2 = 6.0000$
$P_3 = 8.0000$
$P_4 = 10.0000$ Aspherical surface coefficients of i=7 and i=8 are the same those in Example 1.

NA on the information recording surface-side 0.55

NA on the laser beam source-side 0.064

Magnification ratio between the information recording surface and the laser beam source −0.064

Wavefront aberration on the axis 0.001 λrms Wavefront aberration in the case of 0.1 mm shift of the objective lens 0.007 λrms In this example, although this optical element 401 is inserted between the beam splitter and the lens 3, it maybe inserted between the lens 3 and the objective lens 6. In this structure, on the laser beam source-side is easily increased, and the utilization efficiency of the luminous flux is higher.

EXAMPLE 5

In this example, the objective lens 6 is used by which laser beams diverging from a finite distance are directly converged rough the 1.2 mm thickness substrate without aberration. specifically, in this example, the 1.2 mm thickness substrate is used which corresponds to densification and is excellent in production using small optical spots.

Figure 12:
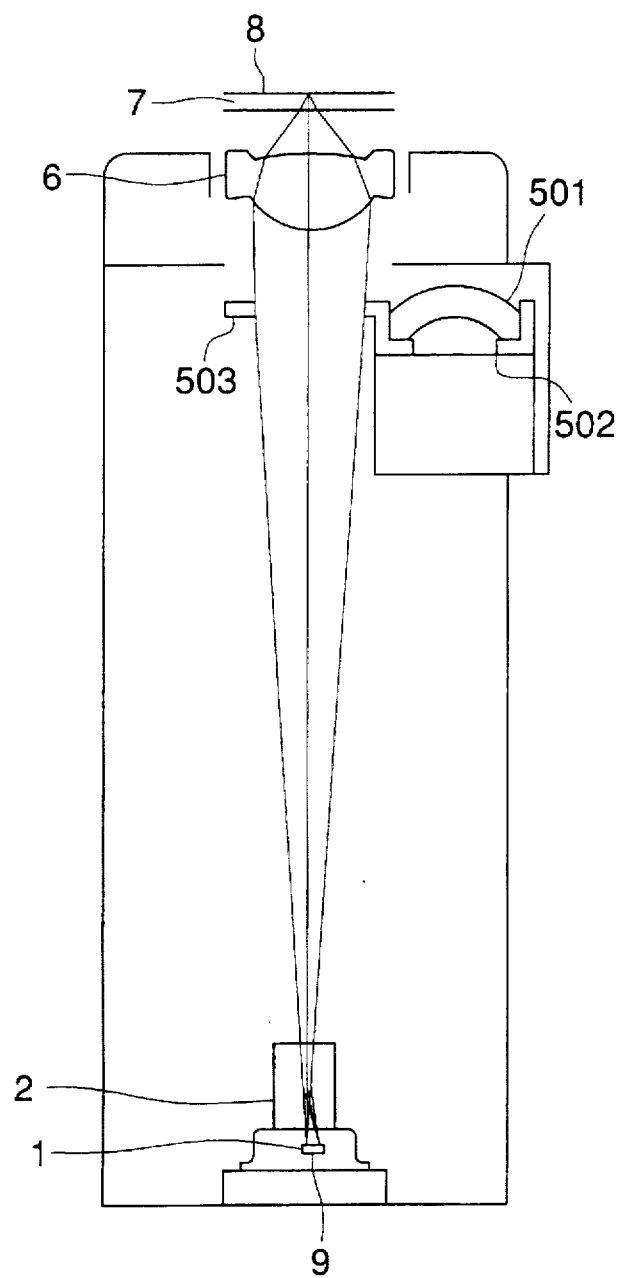
FIG. 12 is a view corresponding to the thickness of 1.2 mm of the second substrate in Example 5.

In FIG. 12,

| i | ri | di | ni |
|---|---|---|---|
| 0 |  | 0.55 | 1 |
| 1 | ∞ | 3 | 1.514546 |
| 2 | ∞ | 17 | 1 |
| 3 | Diaphragm ∞ | 2 | 1 |
| 4 | 1.9095 | 2.7 | 1.4981 |
| 5 | −2.9131 | 1.162 | 1 |
| 6 | ∞ | 1.2 | 1.58 |
| 7 | Information recording surface | | |

Aspherical coefficient of i = 4

$\kappa = -1.75740$
$A_1 = 1.8932 \times 10^{-2}$         $P_1 = 4.0000$
$A_2 = -1.2233 \times 10^{-3}$        $P_2 = 6.0000$
$A_3 = 1.8861 \times 10^{-4}$         $P_3 = 8.0000$
$A_4 = -9.3147 \times 10^{-6}$        $P_4 = 10.0000$ Aspherical coefficient of i = 5

$\kappa = -9.20981$
$A_1 = 6.1162 \times 10^{-3}$         $P_1 = 4.0000$
$A_2 = -1.5274 \times 10^{-4}$        $P_2 = 6.0000$
$A_3 = -1.4276 \times 10^{-4}$        $P_3 = 8.0000$
$A_4 = 1.7874 \times 10^{-5}$         $P_4 = 10.0000$ NA on the information recording surface-side 0.55

NA on the laser beam source-side 0.080

Magnification ratio between the information recording surface and the laser beam source −0.145

Wavefront aberration on the axis 0.000 λrms

Figure 13:
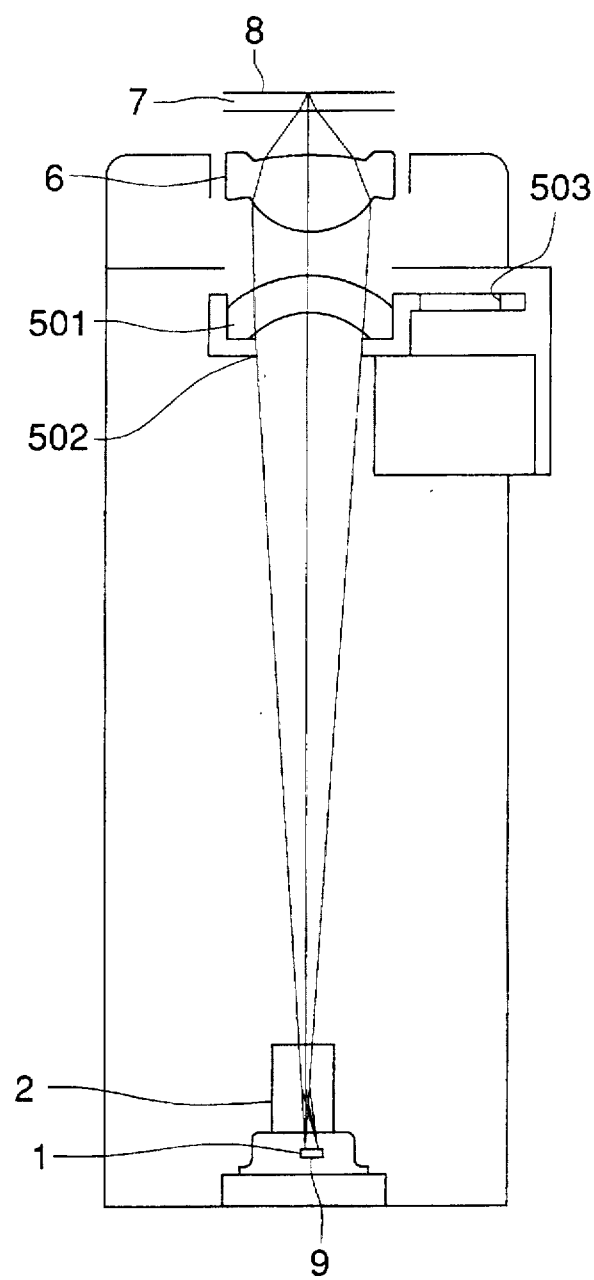
FIG. 13 is a view corresponding to the thickness of 0.8 mm of the first substrate in Example 5.

Wavefront aberration in the case of 0.1 mm shift of the objective lens 0.001 λrms In FIG. 13, a lens 501 having a convex lens function, with which a diaphragm 502 is integrally held in a holding frame, is inserted between the beam splitter 2 and the objective lens 6 in der to correspond to the 0.8 mm thickness substrate.

The diaphragm 503 is also integrally provided in the holding frame at the 1.2 mm thickness substrate.

| i | ri | di | ni |
|---|---|---|---|
| 0 |  | 0.55 | 1 |
| 1 | ∞ | 3 | 1.514546 |
| 2 | ∞ | 16.2 | 1 |
| 3 | −2.9942 | 1.3 | 1.4981 |
| 4 | −3.0208 | 1.5 | 1 |
| 5 | 1.9095 | 2.7 | 1.4981 |
| 6 | −2.9131 | 1.162 | 1 |
| 7 | ∞ | 0.8 | 1.58 |
| 8 | Information recording surface | | |

-continued

| i | ri | di | ni |
|---|---|---|---|

Aspherical coefficient of i = 4

$\kappa = 0.03174$
$A_1 = 8.2371 \times 10^{-4}$         $P_1 = 4.0000$
$A_2 = 2.1896 \times 10^{-4}$         $P_2 = 6.0000$
$A_3 = -4.7237 \times 10^{-6}$        $P_3 = 8.0000$
$A_4 = 1.1840 \times 10^{-5}$         $P_4 = 10.0000$
$A_5 = -2.1310 \times 10^{-6}$        $P_5 = 12.0000$ NA on the information recording surface-side 0.55

NA on the laser beam source-side 0.071

Magnification ratio between the information recording surface and the laser beam source −0.129

Wavefront aberration on the axis 0.002 λrms

Wavefront aberration in the case of 0.1 mm shift of the objective lens 0.017 λrms The diaphragm to determine NA on the information recording surface-side is also provided on the fourth surface.

In this example, the distance from the light emerging surface of the objective lens 6 to the substrate surface is the same, and the movable range, in the direction of focusing, of an actuator to drive the objective lens can be reduced, resulting in a decrease of the overall actuator size.

Also in this example, the aberration generated when the objective lens 6 is shifted, is mainly coma, and the coma due to the inclination of the substrate can be canceled when a bias current is applied onto the tracking actuator or the lens 501 to be inserted, is shifted by a motor.

EXAMPLE 6

Figure 14:
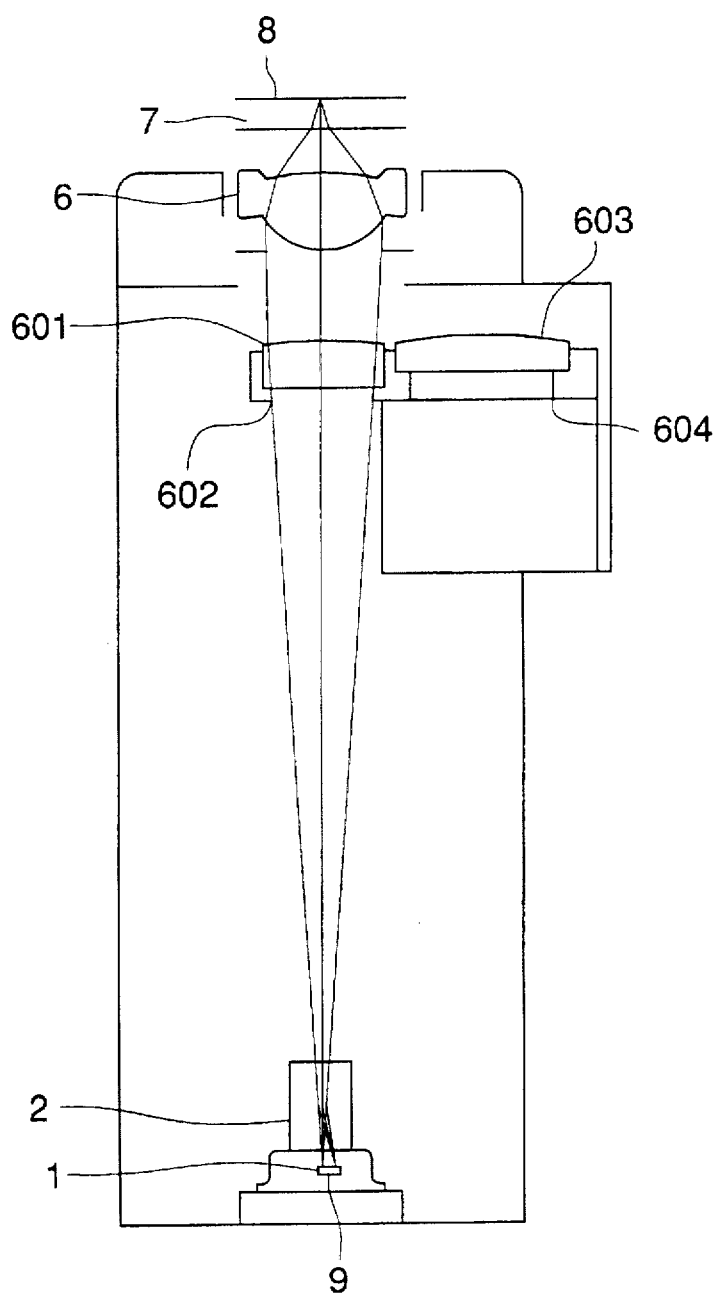
FIG. 14 is a view corresponding to the thickness of 1.2 mm of the second substrate in Example 6.

In Example 6, one of a plurality of lenses having different refractive power is selectively inserted as shown in FIG. 14, so that the divergent degree of the luminous flux entering into the objective lens 6 can be adjusted.

The optical system structured as shown in FIG. 5 in Example 1 is used for a 0.6 mm thickness substrate. With respect to the substrate, the thickness of which is larger than 0.6 mm, a lens 601 of long focal length held in the lens frame which is integrally formed with a diaphragm 602, is used. With respect to the substrate, the thickness of which is smaller than 0.6 mm, a lens 603 of a short focal length held in the lens frame which is integrally formed with a lens 602, is used. A single lens is held by a single frame, and these lenses can be switched by driving the frame with a motor or a solenoid. Further, when a diaphragm is also provided in the lens frame, the spot size can be easily switched.

EXAMPLE 7

Figure 15:
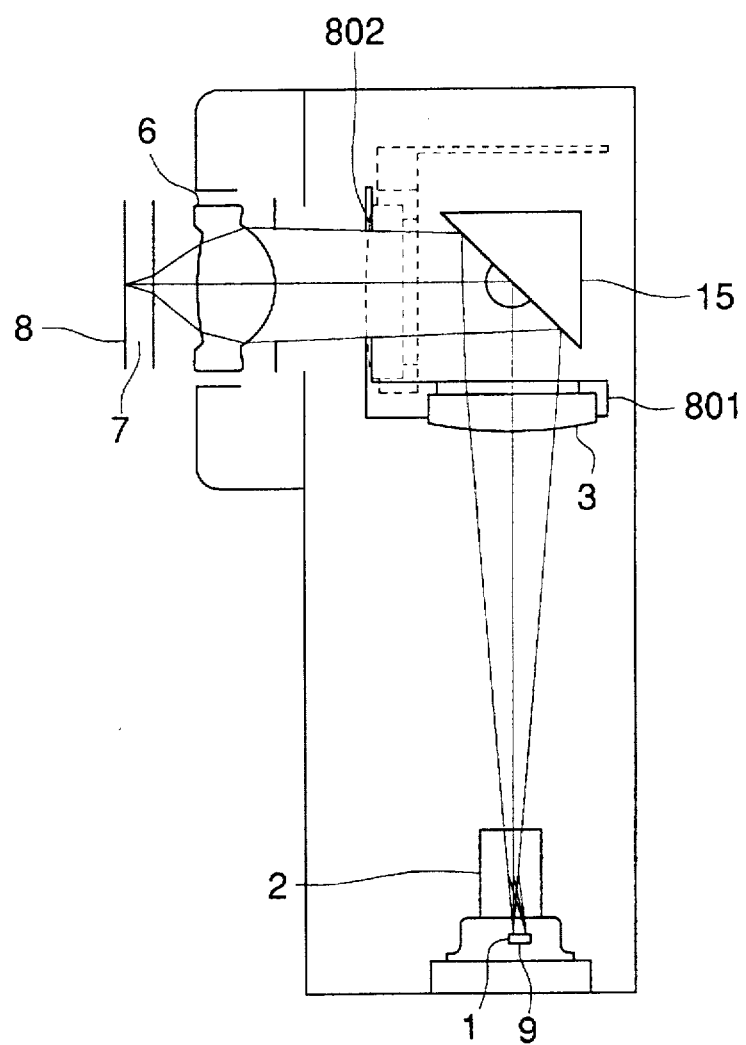
FIG. 15 is a view of an optical system in the arrangement in Example 7.
Figure 16:
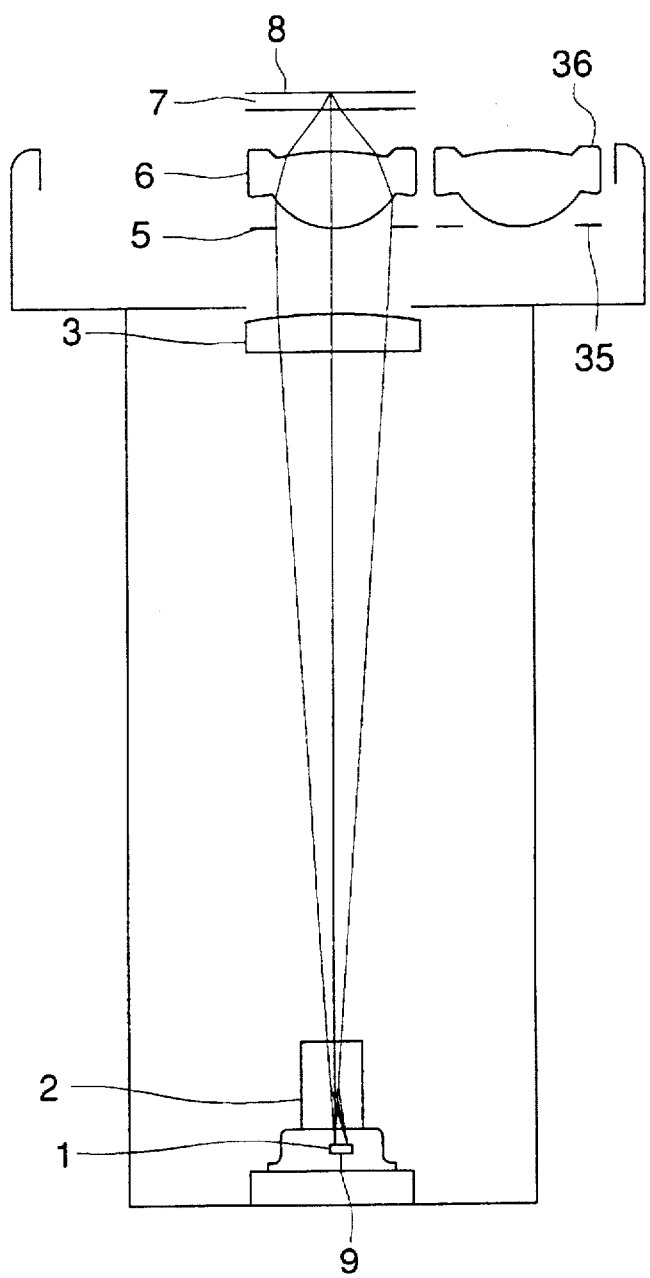
FIG. 16 is a view of the optical system in the example which is conventionally proposed.
Figure 17:
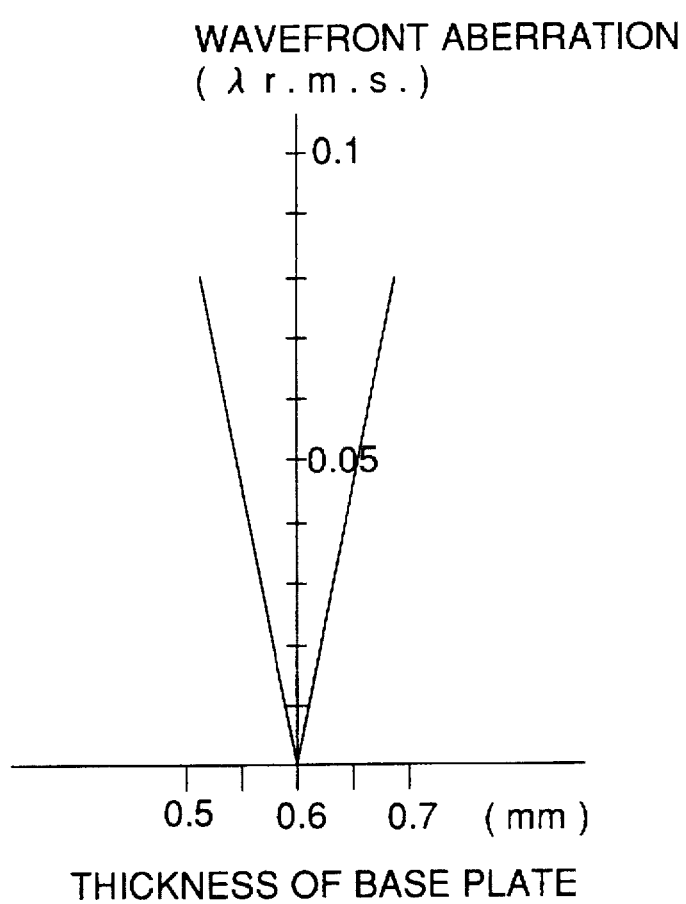
FIG. 17 is a view showing the relationship between the thickness error and wavefront aberration.

In this example, the same optical system as that in Example 2 is used, and the thickness of the system units is reduced. In FIG. 15, the lens 3 is held by the lens frame 801, the rotation center of which is caused to coincide with a crossing point of the optical axis of the deflection mirror 15. In the case of a 0.6 mm thickness substrate, the lens 3 is located on the side of the objective lens 6 (shown by a dotted line), and in the case of a 1.2 mm thickness substrate, this frame is rotated by 90°, and the lens 3 is located on the side of the laser beam source (shown by a solid line). The diaphragm 802 is also integrally provided in the lens frame, and when this lens frame 801 is rotated, movement of the lens position and switching of the diaphragm can be simultaneously carried out, resulting in lowered cost.

In Examples, the divergent degree is changed before and after the start of the reproduction of the optical information recording medium, and at the time of correction for temperature and humidity variation. When the divergent degree is not changed, the output of the motor, constituting the moving means to move the divergence changing means, can be used for other purposes, such as a driving source of the optical pick-up apparatus, in the direction of the inner and outer periphery; and a driving source for tilt-adjustment by which warpage of the substrate is detected and at least the objective lens actuator portion of the information pick-up apparatus is tilted.

Although the cases corresponding to two types of substrates having 0.6 mm thickness and 1.2 mm thickness are mainly shown in the above Examples, it is of course obvious that the present invention can correspond to various kinds of thickness other than the two kinds of thickness above-described. Further, an optical information recording medium having two informaiton recording surfaces corresponding to the front and rear surfaces of one transparent substrate can be reproduced from the same direction.

Further, the present invention is not limited to the exclusive reproducing method, but any recording method can be utilized.

In the optical disk apparatus using the optical pick-up apparatus described in Examples, when the optical information recording medium, (which is called an optical disk hereinafter), is read, a judging means for judging the thickness of the substrate of the optical disk which is loaded in the optical disk apparatus, is provided, and the divergent degree of the luminous flux entering into the objective lens is set corresponding to the information by the judging means. This judging means may be structured by at least a thickness detecting means, and a common logic circuit such as CPU, or the like.

The thickness detection means is realized by the following methods.

A. Thickness information is detected through a switch from an optical disk cartridge having the thickness information.
B. In the case of the optical disk, the outer diameter of which is different corresponding to the thickness, the difference of the outer diameter is detected by a photointerrupter, or the like.
C. A switch for setting information corresponding to the substrate thickness is provided outside of the optical disk apparatus, and the thickness information is detected by the status of the switch.
D. A thickness detection optical system composed of LEDs, phototransistors, or the like, is provided opposite to the loaded optical disk, and the thickness information is discriminated based on the output of this optical system.
E. The objective lens of the optical pick-up apparatus is driven in the upper and lower directions by using an actuator for a focusing drive, and the movement amount of the objective lens moved while the reflected light from the front and rear surfaces of the substrate is detected based on the movement time.
F. The luminous flux incident surface-side of the optical disk is held as the reference by a spindle motor, the objective lens of the optical pick-up apparatus is vertically driven by using an actuator for focusing drive, and the position at which the focused point is generated by a focus error signal from the information recording surface, is detected according to the driving current value or driving time.
G. When the luminous flux entering into the objective lens is on the fist divergent degree corresponding to 0.6 mm thickness substrate, the objective lens is vertically driven with respect to the rotating optical disk by using an actuator for focusing drive, and the focus error signal is detected. The substrate thickness is detected by discriminating whether a predetermined information signal or track error signal is detected or not in the vicinity of the focused point.

Even if the optical disk apparatus can read the optical disks having a plurality of types of the substrate thickness, when the optical disk having the similar thickness and shape can be loaded into the apparatus, it is required to discriminate whether the optical disk is presumed type disk or not, simultaneously with discrimination of the thickness. For this purpose, it may be detected whether the signal from the information recording surface of the optical disk is a presumed type disk or not.

For this purpose, when the luminous flux entering into the objective lens is at the second divergent degree corresponding to, for example, the 1.2 mm thickness substrate, the optical disk is rotated at a predetermined first rotation speed (for example, 1500 rpm) by a spindle motor, and the objective lens is vertically driven by an actuator for focusing drive. When the information signal having a predetermined frequency component is not detected in the vicinity of the focused point of the focusing error signal, or when a predetermined information signal is not detected after the focusing servo operation or the tracking servo operation has been carried out, then, the control means, composed of a CPU or the like, moves the divergence changing means using the moving means so that the divergent degree is changed to the second one corresponding to, for example, the 0.6 mm thickness substrate.

When the information pick-up apparatus in Example 1 is used, the lens which is the divergence changing means is moved by the moving means and the divergent degree of the luminous flux entering into the objective lens can be changed under the condition that the focusing and tracking servo operations are carried out. In the case of the information pick-up apparatus in Examples 2 and 3, time of laser beam interruption is increased, and the servo operation tends to be unstable. Accordingly, the divergent angle may be changed after the servo operation is stopped once.

After the divergent angle has been changed, the information signal is detected again. When the predetermined information is not obtained, the optical disk is ejected from the apparatus because it is not a presumed type disk.

Further, in the optical disk apparatus which can read the optical disks having a plurality of types of substrate thickness, the optical disk is rotated at a predetermined second rotation speed (for example, 1500 rpm) under the condition that the divergent degree is set at the second one corresponding to, for example, a 1.2 mm thickness substrate, in order to read the optical disks having the same thickness but a different reference rotation number. When the signal, including a predetermined frequency component, can not be detected under the condition that at least the focusing servo operation is carried out, or when the signal can be detected as the signal from the optical disk of the type to be rotated at the first rotation speed (for example, 500 rpm), the rotation speed is changed to the first rotation speed.

In the case where the divergent degree or the rotation speed is changed, when the pitch of the information track of the optical disk from which reading is presumed after the change, is different from the original setting, it is preferable that the diaphragm means for changing the diameter of the luminous flux is simultaneously controlled so that NA is changed to obtain a desirable spot size.

Further, when a tracking error in the 3-beam method is detected, the angle of the 0-order light and +1-order light with respect to the information track is simultaneously changed.

The refractive index of optical members made of glass. plastic. or the like. and the wavelength of a laser beam source vary due to temperature and humidity. Further. members holding those optical members also expand and contract. and thereby. the intervals between optical members vary. Accordingly. spherical aberration is generated due to variations of temperature and humidity. This aberration can be corrected when the position of the divergence degree moving means is controlled.

In order to correct variations of temperature and humidity. after at least the focusing servo operation is carried out on the information recording surface 8 of the optical informaiton recording medium. the position of the divergence degree changing means is moved so that the amplitude of the reproduced signal becomes larger. or jittering is reduced. Further. when the above-described motions are carried out during information reproduction. or during waiting under the condition that at least the focusing servo operation is carried out. the optimum information recording and reproducing can be carried out.

As described above. according to the present invention. optical information recording mediums having different substrate thickness can be recorded and reproduced by a single information pick-up apparatus. and an information pick-up apparatus and an information recording medium apparatus which have interchnageability with a plurality of substrate thickness. and which have a simple structure and are low in cost. can be realized.

Further. only one optical spot is used for recording and writing. and thereby. power loss is minimized. Accordingly. the S/N ratio is increased in reading. and writing can be carried out by lower laser power in recording.

Still further. only one objective lens is used in the system. and thereby. the size and weight of movable portions of an actuator to drive the objective lens. can be reduced. and consumed current is reduced. Further. the sensitivity can easily be increased. and this apparatus can easily correspond to high speed rotation of the information recording medium.

Further. this apparatus can easily correspond to arbitrary substrate thickness. and fluctuations of the substrate thickness can be easily corrected.

Next. Examples (8 to 11) according to the first and second embodiments to attain the first object of the present invention will be described. In the example of numerical values in each example. the distance between the i-th surface and the (i+1)th surface on the optical axis at the position (the first position) for the 0.6 mm substrate thickness is represented by d1i. and that at the position (the second position) for the 1.2 mm substrate thickness is represented by d2i.

EXAMPLE 8

Thickness of the transparent substrate
0.6 mm (t1) 1.2 mm (t2)
Distance between surfaces
d1i d2i
Diaphragm diameter
$\phi$4.08 $\phi$4.08
Magnification ratio of the entire optical system
$-1/7.9$ $-1/6.2$
NA on the information recording surface-side
0.60 0.59
Focal length of the divergence changing lens
$f_c$=26.85 (mm)
Focal length of the objective lens
$f_O$=3.40 (mm)

Focal length of the entire optical system at a transparent substrate thickness of $t_1$
$f_T$=3.53 (mm)

| i | ri | d1i | d2i | ni |
|---|---|---|---|---|
| 0 | | 0.55 | 0.55 | 1.0 |
| 1 | ∞ | 3.00 | 3.00 | 1.51455 |
| 2 | ∞ | 22.05 | 12.40 | 1.0 |
| 3 | 39.8985 | 2.00 | 2.00 | 1.80186 |
| 4 | 13.6343 | 3.00 | 3.00 | 1.58701 |
| 5 | −17.4703 | 3.00 | 12.83 | 1.0 |
| 6 | Diaphragm (∞) | 0.00 | 0.00 | 1.0 |
| 7 | 2.0500 | 2.60 | 2.60 | 1.49005 |
| 8 | −5.1870 | 1.60 | 1.42 | 1.0 |
| 9 | ∞ | 0.60 | 1.20 | 1.58 |
| 10 | Information recording surface (∞) | | | |

Figure 18:
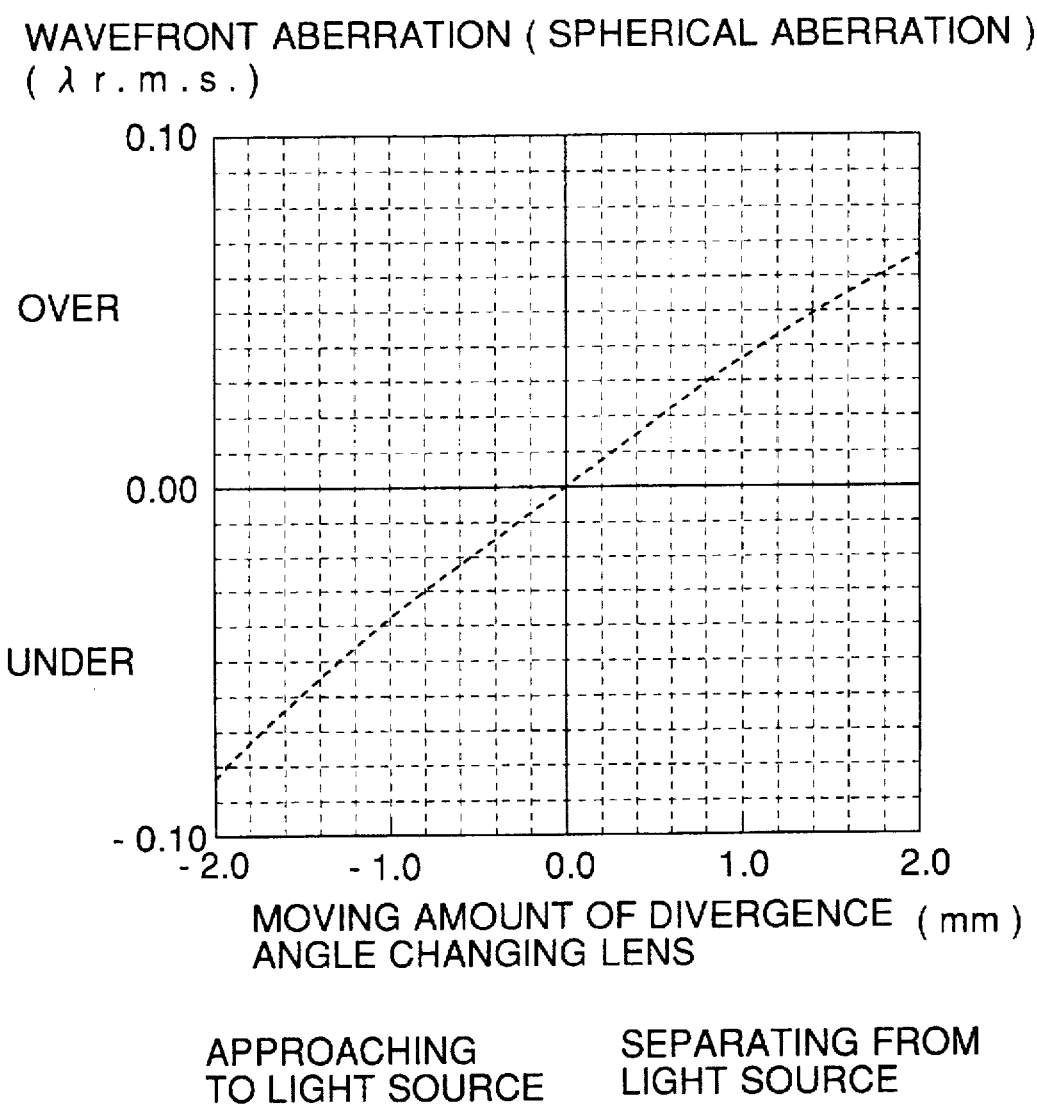
FIG. 18 is a graph showing the relationship between an amount of movement of a divergence changing lens and spherical aberration in Example 8 of the present invention.

Aspherical data of i = 7 surface $\kappa = -0.46211$
$A_1 = -0.81009 \times 10^{-3}$   $P_1 = 4.0000$
$A_2 = -0.18077 \times 10^{-3}$   $P_2 = 6.0000$
$A_3 = -0.23378 \times 10^{-4}$   $P_3 = 8.0000$
$A_4 = -0.87100 \times 10^{-5}$   $P_4 = 10.0000$ Aspherical data of i = 8 surface $\kappa = -20.447$
$A_1 = 0.91069 \times 10^{-2}$   $P_1 = 4.0000$
$A_2 = -0.35507 \times 10^{-2}$   $P_2 = 6.0000$
$A_3 = 0.78952 \times 10^{-3}$   $P_3 = 8.0000$
$A_4 = -0.68843 \times 10^{-4}$   $P_4 = 10.0000$ FIG. 18 is a graph showing the relationship between a movement amount of the divergence changing lens in Example 8 and the spherical aberration.

Figure 19A:
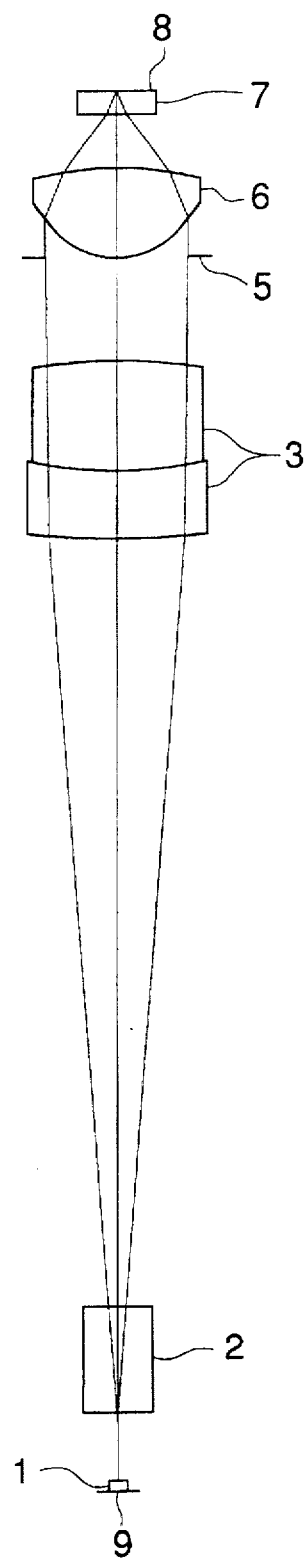
FIGS. 19(a) and 19(b) are views of the optical path in cases in which the thickness of the transparent substrates are respectively 0.6 mm and 1.2 mm in Example 8 of the present invention.
Figure 19B:
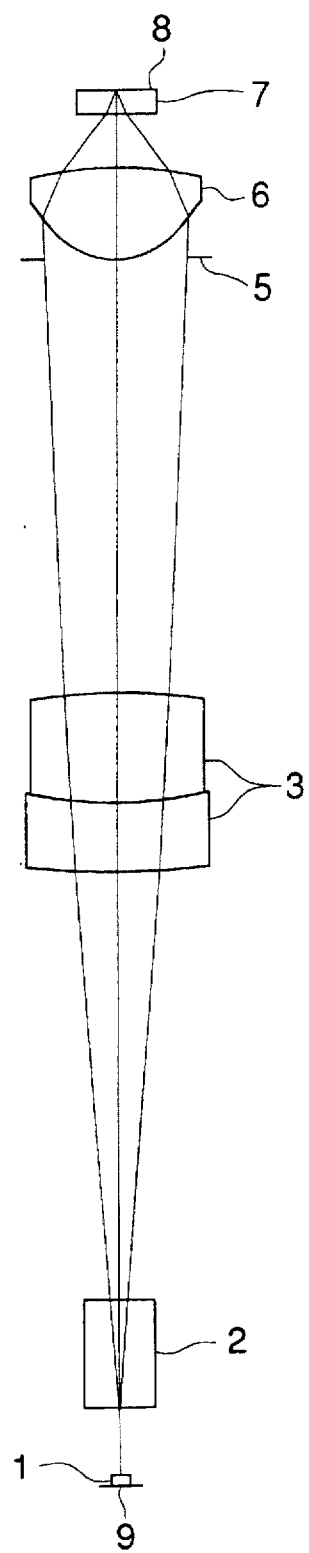

FIGS. 19(a). 19(b). 21(a). 21(b). 23(a). 23(b). 25(a) and 25(b) are views showing optical paths respectively for a 0.6 mm transparent substrate thickness and a 1.2 mm transparent substrate thickness in Example 8 and Examples 9. 10 and 11. which will be described later.

Figure 20:
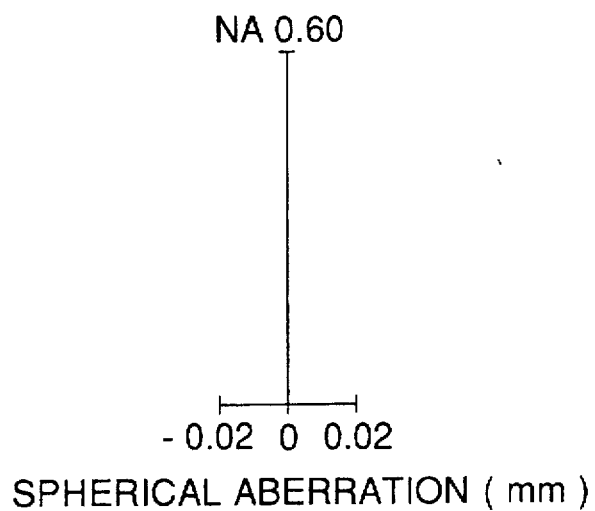
FIG. 20(a) is a view showing the spherical aberration in the case in which the thickness of the transparent substrate is 0.6 mm in the optical system in Example 8.
FIG. 20(b) is a view showing the spherical aberration of the divergence changing lens in the case where the 1.2 mm thickness of the transparent substrate is inserted while the 0.6 mm thickness of the transparent substrate is arranged.
FIG. 20(c) is a view showing the spherical aberration of the divergence changing lens in the case where the 0.6 mm thickness of the transparent substrate is inserted while the 1.2 mm thickness of the transparent substrate is arranged.
FIG. 20(d) is a view showing the spherical aberration in the case where the optical system is adjusted for 1.2 mm thickness of the transparent substrate.
Figure 20:
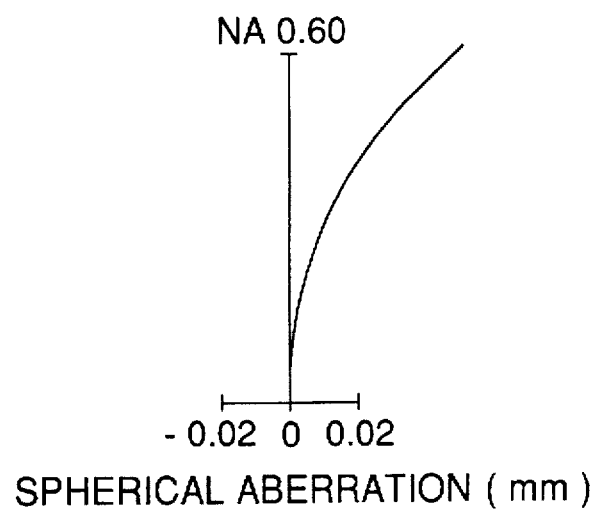
Figure 20:
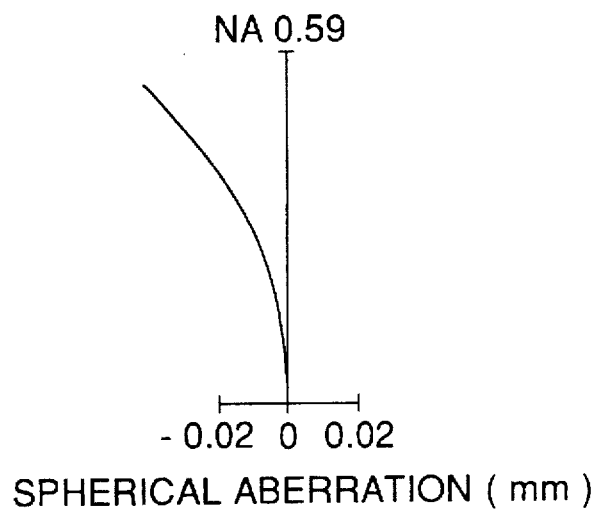
Figure 20:
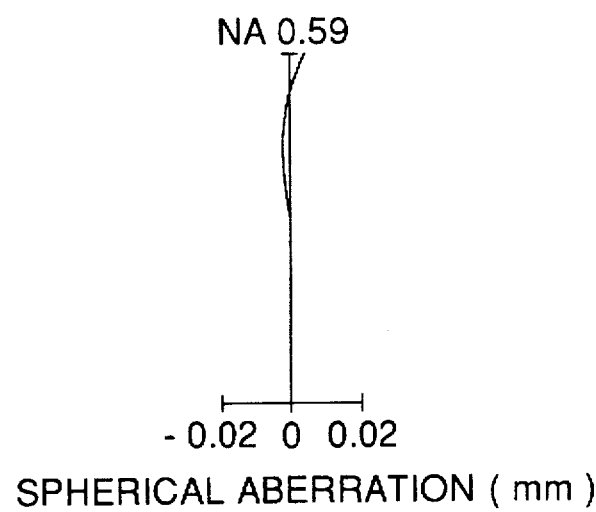
Figure 21:
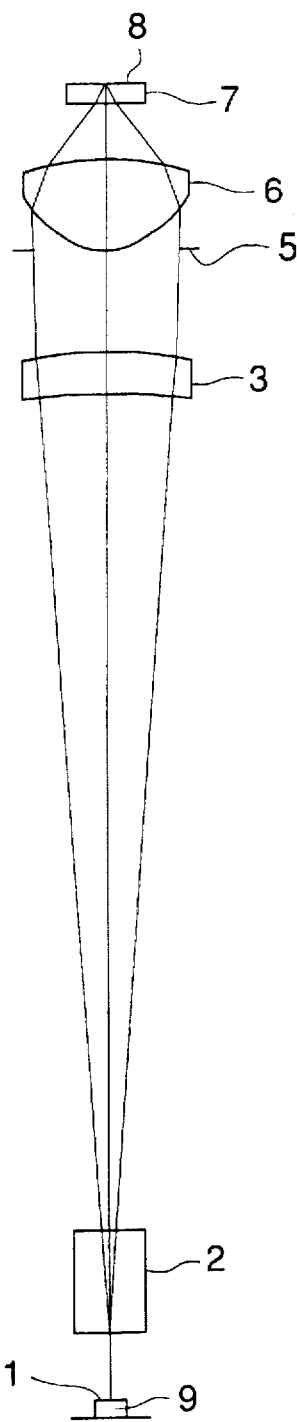
FIGS. 21(a) and 21(b) are views of the optical path when the thickness of the transparent substrates are respectively 0.6 mm and 1.2 mm in Example 9 of the present invention.
Figure 21:
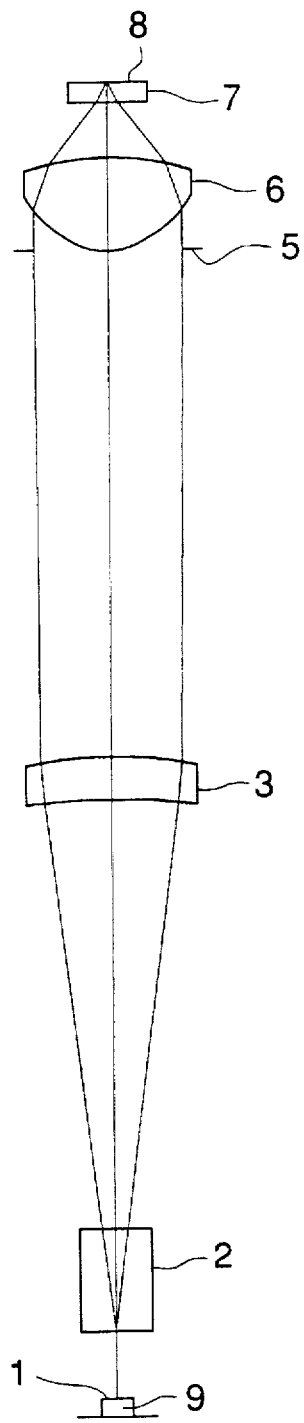
Figure 22:
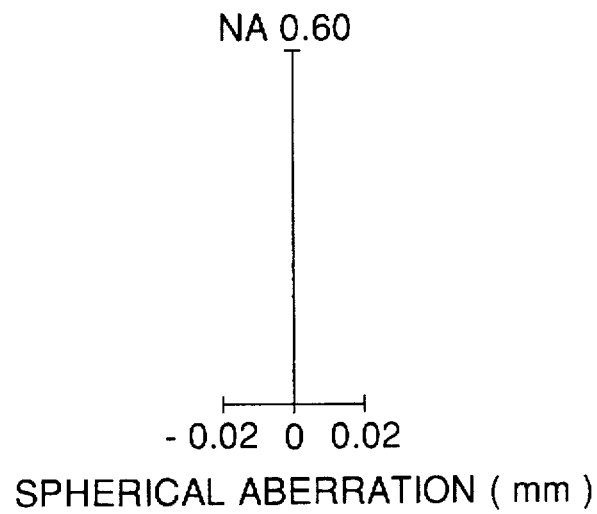
FIG. 22(a) is a view of the spherical aberration in the case of 0.6 mm thickness of transparent substrate in the optical system in Example 9.
FIG. 22(b) is a view of the spherical aberration of the divergence changing lens when 1.2 mm thickness of transparent substrate is inserted while 0.6 mm thickness of transparent substrate is arranged.
FIG. 22(c) is a view of the spherical aberration of the divergence changing lens when 0.6 mm thickness of transparent substrate is inserted while 1.2 mm thickness of transparent substrate is arranged.
FIG. 22(d) is a view of the spherical aberration in the case where the optical system is adjusted for 1.2 mm thickness of the transparent substrate.
Figure 22:
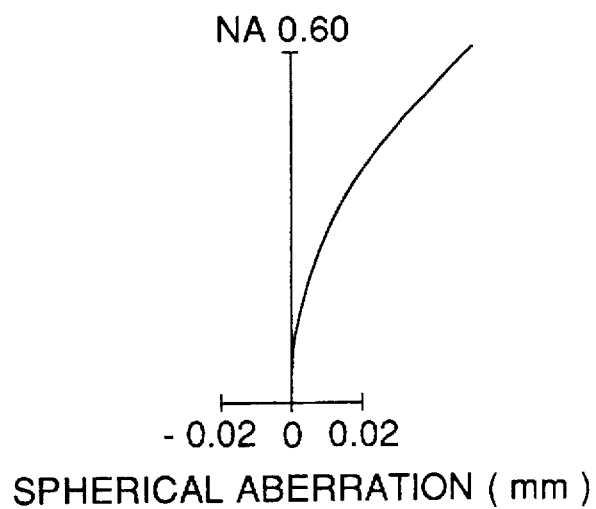
Figure 22:
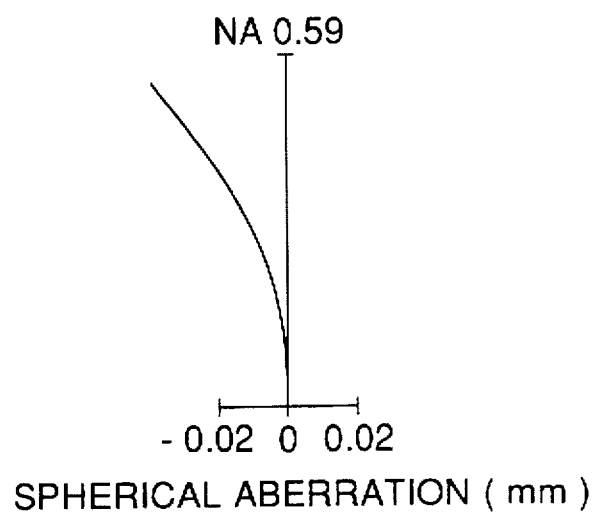
Figure 22:
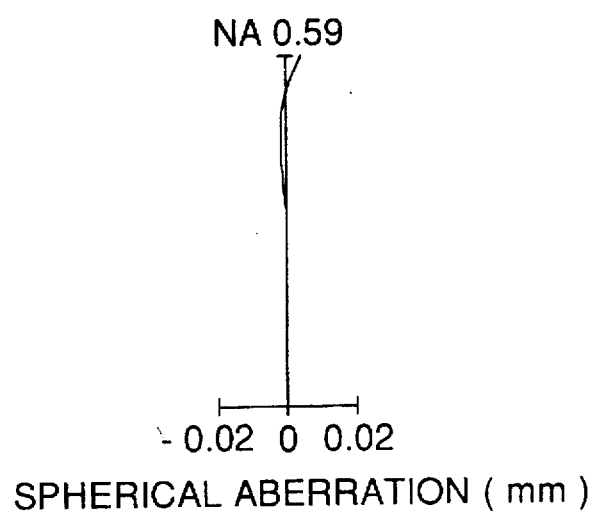
Figure 23A:
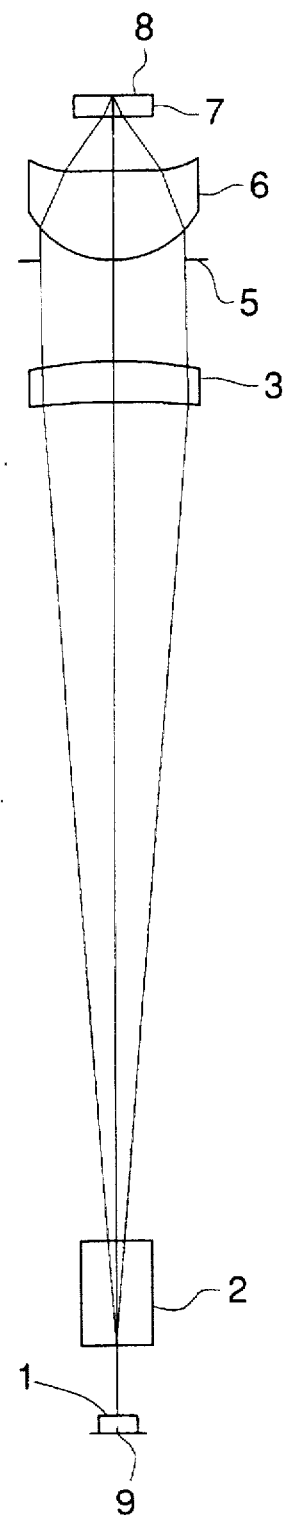
FIGS. 23(a) and 23(b) are views of the optical path in cases where the thickness of the transparent substrates are respectively 0.6 mm and 1.2 mm in Example 10 of the present invention.
Figure 23:
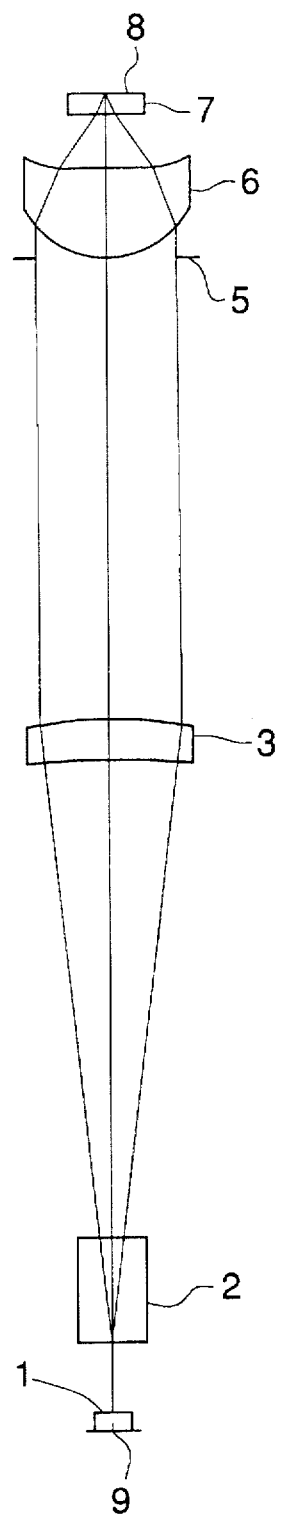
Figure 24:
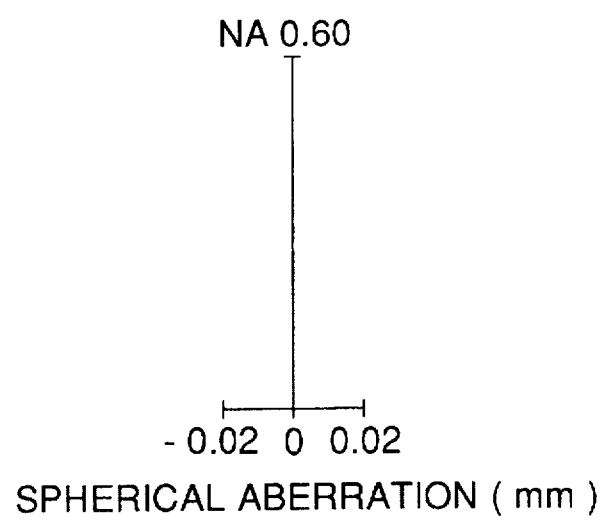
FIG. 24(a) is a view of the spherical aberration in the case of 0.6 mm thickness of the transparent substrate in the optical system in Example 10.
FIG. 24(b) is a view of the spherical aberration of the divergence changing lens when 1.2 mm thickness of transparent substrate is inserted while 0.6 mm thickness of transparent substrate is arranged.
FIG. 24(c) is a view of the spherical aberration of the divergence changing lens when 0.6 mm thickness of transparent substrate is inserted while 1.2 mm thickness of transparent substrate is arranged.
FIG. 24(d) is a view of the spherical aberration in the case where the optical system is adjusted for 1.2 mm thickness of the transparent substrate.
Figure 24:
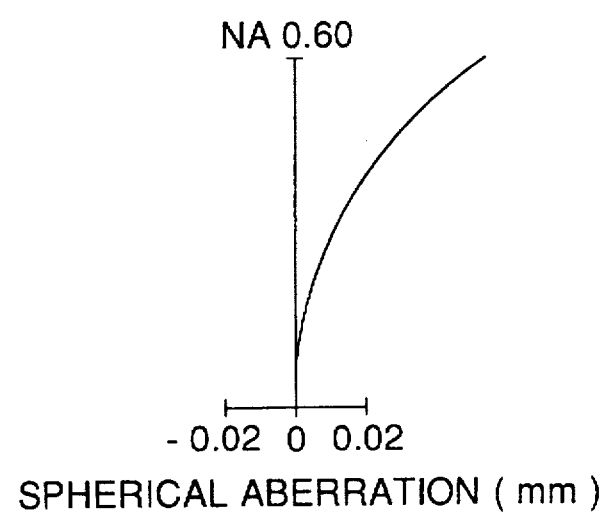
Figure 24:
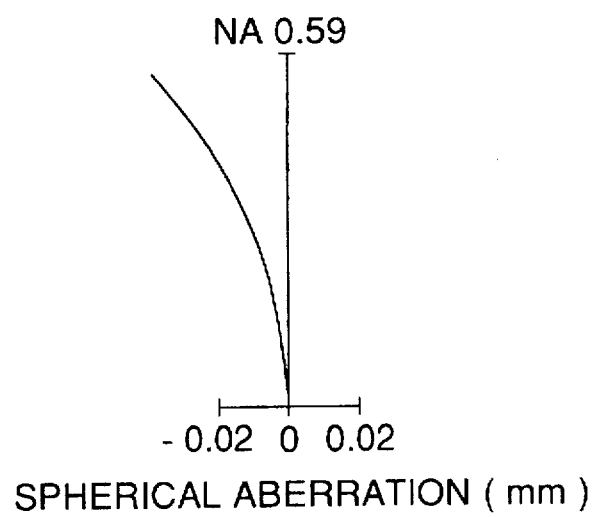
Figure 24:
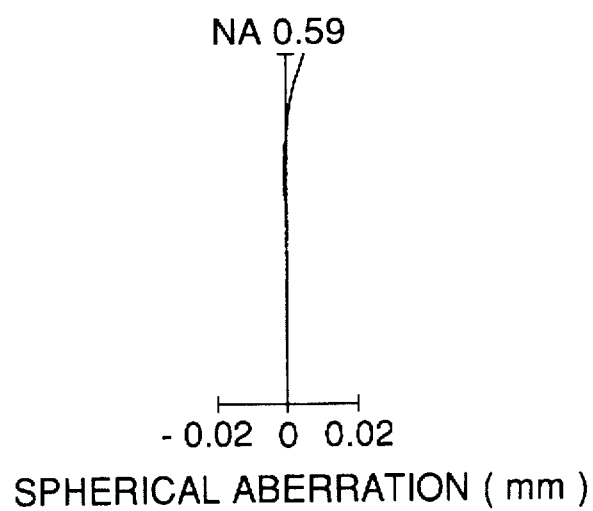
Figure 25:
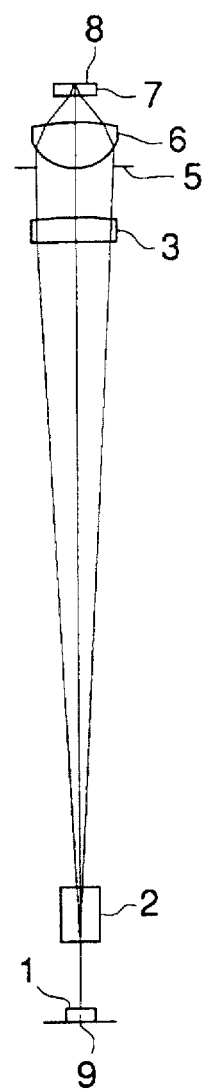
FIGS. 25(a) and 25(b) are views of the optical path in cases where the thickness of the transparent substrates are respectively 0.6 mm and 1.2 mm in Example 11 of the present invention.
Figure 25:
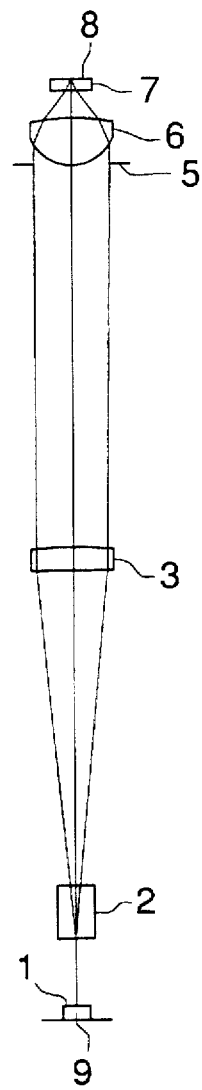
Figure 26:
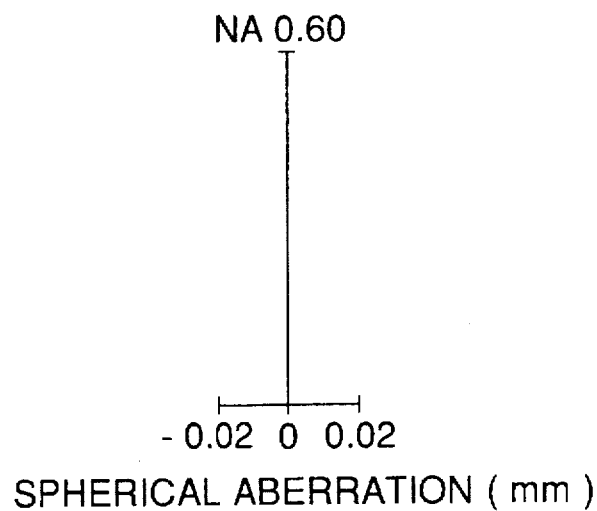
FIG. 26(a) is a view of the spherical aberration in the case of 0.6 mm thickness of transparent substrate in the optical system in Example 11.
FIG. 26(b) is a view of the spherical aberration of the divergence changing lens when 1.2 mm thickness of transparent substrate is inserted while 0.6 mm thickness of transparent substrate is arranged.
FIG. 26(c) is a view of the spherical aberration of the divergence changing lens when 0.6 mm thickness of transparent substrate is inserted while 1.2 mm thickness of transparent substrate is arranged.
FIG. 26(d) is a view of the spherical aberration in the case where the optical system is adjusted for 1.2 mm thickness of the transparent substrate.
Figure 26:
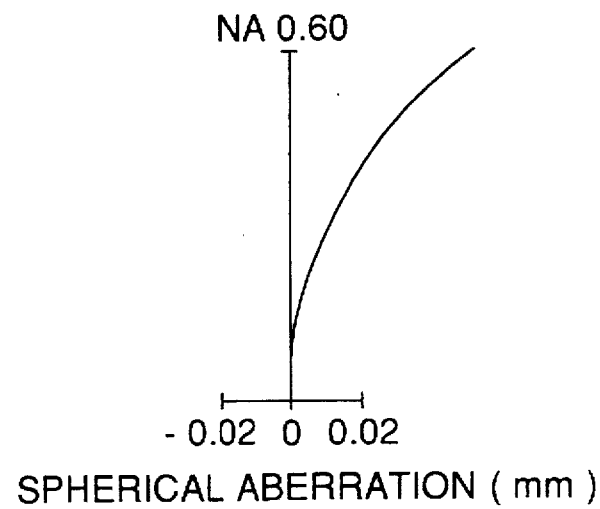
Figure 26:
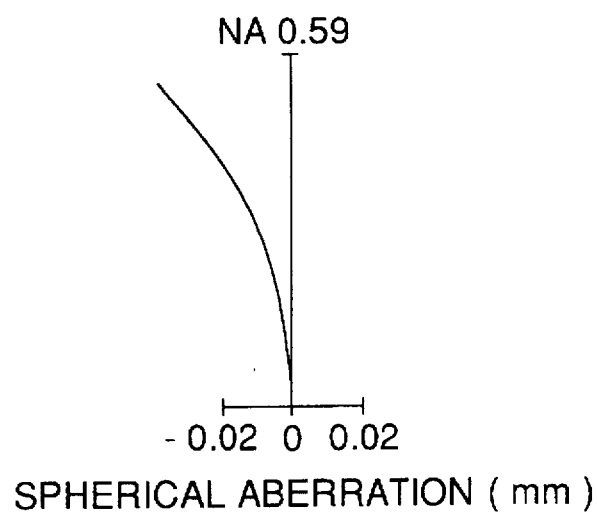
Figure 26:
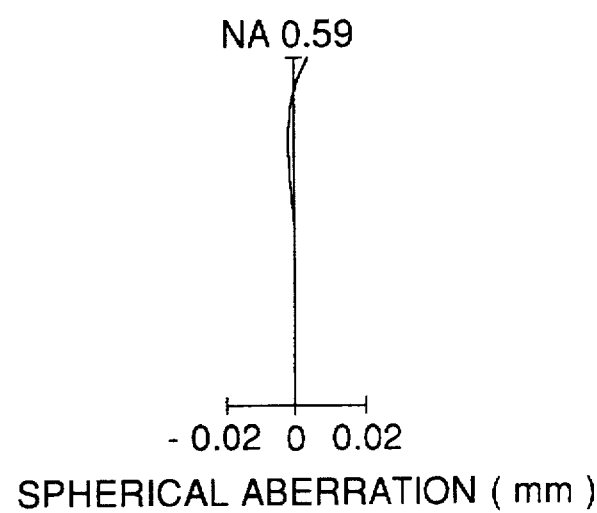

In the optical systems shown in Examples 8. 9. 10 and 11. FIGS. 20(a). 22(a). 24(a) and 26(a) are views respectively showing the spherical aberration for a 0.6 mm transparent substrate thickness. FIGS. 20(b). 22(b). 24(b) and 26(b) are views respectively showing the sherical aberration when the 1.2 mm thickness transparent substrate is inserted while respective divergence changing lenses are arranged for a 0.6 mm transparent substrate thickness. FIGS. 20(c). 22(c). 24(c) and 26(c) are views respectively showing the spherical aberration when 0.6 mm thickness transparent substrate is inserted while respective divergence changing lenses are arranged for a 1.2 mm thickness transparent substrate. FIG. 20(d). 22(d). 24(d) and 26(d) are views respectivly showing the spherical aberration when the lens is adjusted for a 1.2 mm transparent substrate thickness.

EXAMPLE 9

Thickness of the transparent substrate
0.6 mm (t1) 1.2 mm (t2)
Distance between surfaces
d1i d2i
Diaphragm diameter
$\phi$4.08 $\phi$4.08
Magnification ratio of the entire optical system
$-1/8.0$ $-1/6.2$
NA on the information recording surface-side
0.60 0.59
Focal length of the divergence changing lens
$f_c$=26.85 (mm)
Focal length of the objective lens $f_o$=3.40 (mm)

Focal length of the entire optical system at a transparent substrate thickness of $t_1$ $f_T$=3.41 (mm)

| i | ri | d1i | d2i | ni |
|---|---|---|---|---|
| 0 | Source | 0.55 | 0.55 | 1.0 |
| 1 | ∞ | 3.00 | 3.00 | 1.51455 |
| 2 | ∞ | 23.90 | 14.15 | 1.0 |
| 3 | −156.0000 | 1.20 | 1.20 | 1.82920 |
| 4 | −19.5513 | 3.00 | 12.93 | 1.0 |
| 5 | Diaphragm (∞) | 0.00 | 0.00 | 1.0 |
| 6 | 2.0500 | 2.60 | 2.60 | 1.49005 |
| 7 | −5.1870 | 1.60 | 1.42 | 1.0 |
| 8 | ∞ | 0.60 | 1.20 | 1.58 |
| 9 | Information recording surface (∞) | | | |

Aspherical data of i = 6 surface $\kappa = -0.46211$
$A_1 = -0.8100910^{-3}$    $P_1 = 4$
$A_2 = -0.18077 \times\times 10^{-3}$    $P_2 = 6$
$A_3 = -0.23378 \times 10^{-4}$    $P_3 = 8$
$A_4 = -0.87100 \times 10^{-5}$    $P_4 = 10$ Aspherical data of i = 7 surface $\kappa = -20.447$
$A_1 = 0.91069 \times 10^{-2}$    $P_1 = 4$
$A_2 = -0.35507 \times 10^{-2}$    $P_2 = 6$
$A_3 = 0.78952 \times 10^{-3}$    $P_3 = 8$
$A_4 = -0.68843 \times 10^{-4}$    $P_4 = 10$

EXAMPLE 10

Thickness of the transparent substrate 0.6 mm (t1) 1.2 mm (t2)

Distance between surfaces d1i d2i

Diaphragm diameter

φ4.08 φ4.08

Magnification ratio of the entire optical system

−1/8.0 −1/6.1

NA on the information recording surface-side 0.60 0.59

Focal length of the divergence changing lens $f_c$=26.85 (mm)

Focal length of the objective lens $f_o$=3.40 (mm)

Focal length of the entire optical system at a transparent substrate thickness of $t_1$ $f_T$=3.34 (mm)

| i | ri | d1i | d2i | ni |
|---|---|---|---|---|
| 0 | Source | 0.55 | 0.55 | 1.0 |
| 1 | ∞ | 3.00 | 3.00 | 1.51455 |
| 2 | ∞ | 23.90 | 14.51 | 1.0 |
| 3 | −156.0000 | 1.20 | 1.20 | 1.82920 |
| 4 | −19.5513 | 3.00 | 12.58 | 1.0 |
| 5 | Diaphragm (∞) | 0.00 | 0.00 | 1.0 |
| 6 | 2.4000 | 2.60 | 2.60 | 1.69404 |
| 7 | −78.2277 | 1.51 | 1.32 | 1.0 |
| 8 | ∞ | 0.60 | 1.20 | 1.58 |
| 9 | Information recording surface (∞) | | | |

Aspherical data of i = 6 surface $\kappa = -0.22769$
$A_1 = -0.14079 \times 10^{-2}$    $P_1 = 4$
$A_2 = -0.18562 \times 10^{-3}$    $P_2 = 6$
$A_3 = -0.22586 \times 10^{-4}$    $P_3 = 8$

| i | ri | d1i | d2i | ni |
|---|---|---|---|---|
| | $A_4 = -0.24870 \times 10^{-5}$ | | $P_4 = 10$ | |

Aspherical data of i = 7 surface $\kappa = -21.22$
$A_1 = 0.11864 \times 10^{-1}$    $P_1 = 4$
$A_2 = -0.32315 \times 10^{-2}$    $P_2 = 6$
$A_3 = 0.89784 \times 10^{-3}$    $P_3 = 8$
$A_4 = -0.65119 \times 10^{-4}$    $P_4 = 10$

EXAMPLE 11

Thickness of the transparent substrate 0.6 mm (t1) 1.2 mm (t2)

Distance between surfaces d1i d2i

Diaphragm diameter

φ4.08 φ4.08

Magnification ratio of the entire optical system

−1/11.8 −1/8.9

NA on the information recording surface-side 0.60 0.59

Focal length of the divergence changing lens $f_c$=26.85 (mm)

Focal length of the objective lens $f_o$=3.40 (mm)

Focal length of the entire optical system at a transparent substrate thickness of $t_1$ $f_T$=3.31 (mm)

| i | ri | d1i | d2i | ni |
|---|---|---|---|---|
| 0 | Source | 0.55 | 0.55 | 1.0 |
| 1 | ∞ | 3.00 | 3.00 | 1.51455 |
| 2 | ∞ | 36.96 | 16.22 | 1.0 |
| 3 | −339.3412 | 1.20 | 1.20 | 1.82920 |
| 4 | −30.2635 | 3.00 | 23.92 | 1.0 |
| 5 | Diaphragm (∞) | 0.00 | 0.00 | 1.0 |
| 6 | 2.0500 | 2.60 | 2.60 | 1.49005 |
| 7 | −5.1870 | 1.60 | 1.42 | 1.0 |
| 8 | ∞ | 0.60 | 1.20 | 1.58 |
| 9 | Information recording surface (∞) | | | |

Aspherical data of i = 6 surface $\kappa = -0.46211$
$A_1 = -0.81009 \times 10^{-3}$    $P_1 = 4$
$A_2 = -0.18077 \times 10^{-3}$    $P_2 = 6$
$A_3 = -0.23378 \times 10^{-4}$    $P_3 = 8$
$A_4 = -0.87100 \times 10^{-5}$    $P_4 = 10$ Aspherical data of i = 7 surface $\kappa = -20.447$
$A_1 = 0.91069 \times 10^{-2}$    $P_1 = 4$
$A_2 = -0.35507 \times 10^{-2}$    $P_2 = 6$
$A_3 = 0.78952 \times 10^{-3}$    $P_3 = 8$
$A_4 = -0.68843 \times 10^{-4}$    $P_4 = 10$ 2. Examples (12–24) relating to the third and fourth embodiments to attain the first object will be described below.

Each example (12–24) includes the following numerical values. A laser beam source is defined as the zero-th surface, and the radius of curvature of the i-th surface, (including a diaphragm surface), counted from the zero-th surface in order, is expressed by ri, an interval between the i-th surface and the (i+1)-th surface is expressed by di, and a refractive index of a medium between the i-th surface and the i+1-th surface in the wavelength of a luminous flux of the laser beam source is expressed by ni. The refractive index of air is defined as 1.

In the case where an aspherical surface is used for a lens surface, the shape of the aspherical surface is expressed by the following equation when the conical coefficient is k, the aspherical surface coefficient is Ai, and the numerical exponent of the aspherical surface is Pi in an orthogonal coordinate system in which the vertex of the surface is the origin, and the direction of the optical axis is defined as the X-axis.

$$x = \frac{C\phi^2}{1 + \sqrt{1-(1+\kappa)C^2\phi^2}} + \Sigma Ai\phi^{Pi} \quad \text{[Equation 1]}$$

$$\phi = \sqrt{y^2 + z^2}, \quad C = 1/r$$

Initially, Examples 12 and 13 will be described below.

EXAMPLE 12

As Example 12, the structure of FIGS. 27 and 28 will be described.

A projecting and receiving unit 302, in which a semiconductor laser chip 1, hologram beam splitter 2, and light detector 9 are integrally provided, is held by a moving means 301 by which the projecting and receiving unit 302 is moved in the direction of the optical axis along which the laser beam advances to the objective lens 6. The divergent degree of the luminous flux entering into the objective lens 6 can be changed when the projecting and receiving unit 302 is moved in the optical axis direction.

Figure 27:
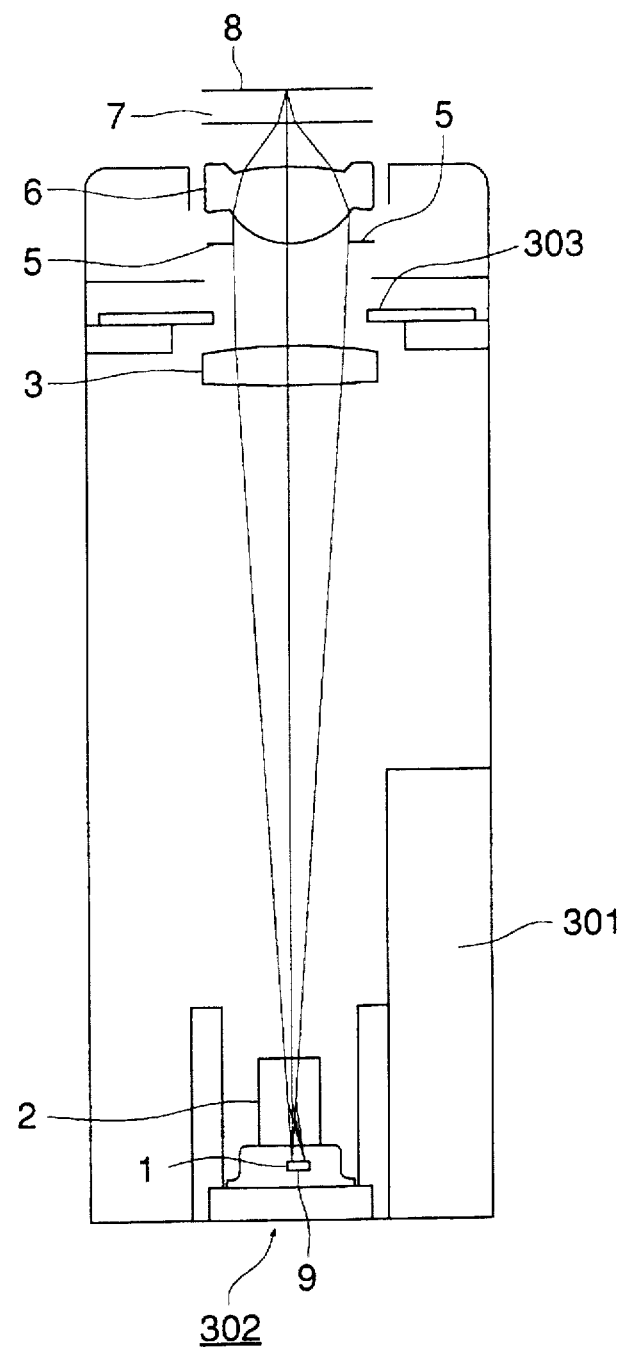
FIG. 27 is a view corresponding to the thickness of 0.6 mm of the first substrate in Example 12.

The optical system structured as shown in FIG. 27 is arranged at a position in which the laser beam source, corresponding to information reading from the optical information recording medium of the first substrate of 0.6 mm thickness, is located at the first position.

The specifications of the optical system structured as shown in FIG. 27 are as follows.

| i | ri | di | ni |
|---|---|---|---|
| 0 |  | 0.55 | 1 |
| 1 | ∞ | 3.0 | 1.514546 |
| 2 | ∞ | 21.62 | 1 |
| 3 | 90.325 | 1.5 | 1.4981 |
| 4 | −14.364 | 2.7 | 1 |
| 5 | Diaphragm ∞ | 0 | 1 (φ3.998) |
| 6 | 2.0282 | 2.6 | 1.4981 |
| 7 | −5.2236 | 1.531 | 1 |
| 8 | ∞ | 0.6 | 1.58 |
| 9 | Information recording surface | | |

Aspherical surface coefficient of i = 3

$\kappa = -290.104$
$A_1 = -1.5229 \times 10^{-5}$  $P_1 = 4.0000$
$A_2 = 2.9716 \times 10^{-5}$   $P_2 = 6.0000$
$A_3 = -4.9564 \times 10^{-6}$  $P_3 = 8.0000$
$A_4 = 2.9132 \times 10^{-7}$   $P_4 = 10.0000$ Aspherical surface coefficient of i = 4

$\kappa = 0.20030$
$A_1 = -1.4252 \times 10^{-5}$  $P_1 = 4.0000$
$A_2 = 2.5238 \times 10^{-5}$   $P_2 = 6.0000$
$A_3 = -3.8308 \times 10^{-6}$  $P_3 = 8.0000$
$A_4 = 2.1154 \times 10^{-7}$   $P_4 = 10.0000$ In this connection, aspherical surface coefficients i=6 and i=7 are the same as those in Example 1.

NA on the information recording surface-side 0.60

NA on the laser beam source-side 0.080

Magnification ratio between the information recording surface and the laser beam source 0.1331

Wavefront aberration on the axis 0.002 λrms

Wavefront aberration of the objective lens in the case of 0.1 mm shift 0.002 λrms In this structure, the same lens as that in Examples 1 is used as the objective lens 6, and a lens, in which the aspherical surface is used and the spherical surface is accurately corrected, is used as the lens 3 which is a divergence changing means. Then, almost non-aberration parallel luminous flux is entered into the objective lens 6 so that the aberration does not vary even when the objective lens 6 is shifted at the time of tracking.

Figure 28:
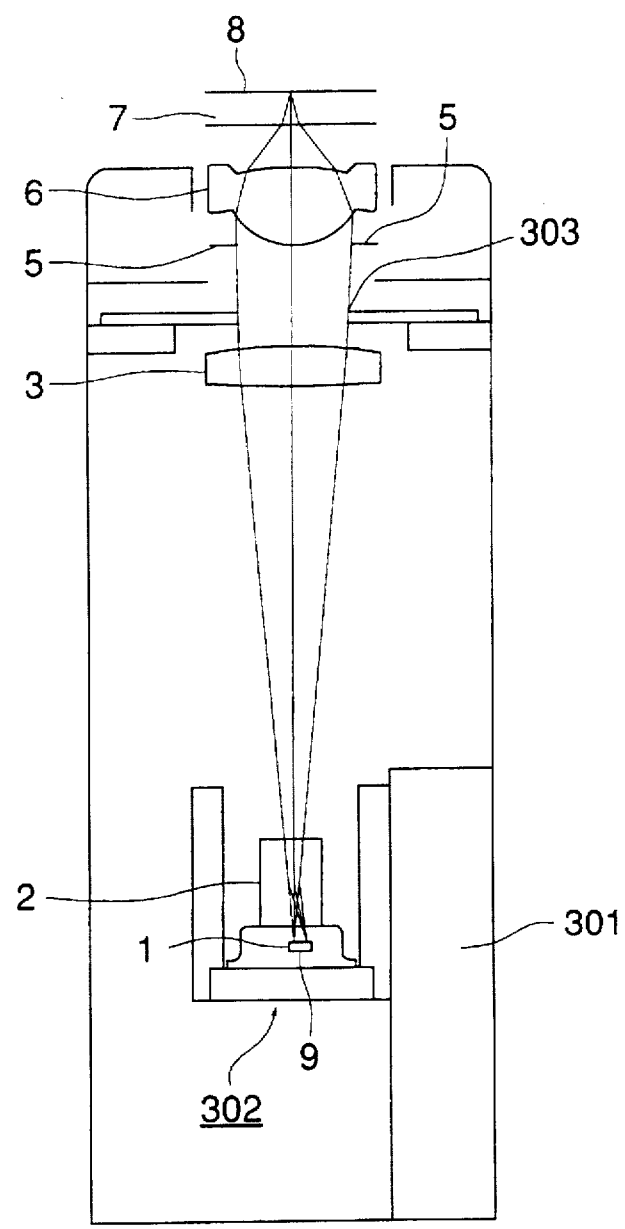
FIG. 28 is a view corresponding to the thickness of 1.2 mm of the second substrate in Example 12.

In FIG. 28, the light projecting and receiving unit 302 is moved toward the second position of the objective lens 6 side in order to correspond to the 1.2 mm substrate thickness. In the structure of the optical system at this time, intervals between respective surfaces change as follows with respect to FIG. 27.

| d2 | from 21.62 | to 14.0 |
|---|---|---|
| d4 | 2.7 | to 1.1 |
| d5 | 0 | to 2.0 |
| d7 | 1.531 | to 1.343 |

An i=5 is the diaphragm surface, and in FIG. 27, it is a diaphragm integrally movable with the objective lens 6, and further in FIG. 28, it is an iris diaphragm 303 inserted between the lens 3 and the objective lens 6.

NA on the information recording surface-side 0.55 (a diaphragm diameter φ3.724)

NA on the laser beam source-side 0.104

Magnification ratio between the information recording surface and the laser beam source −0.190

Wavefront aberration on the axis 0.005 λrms

Wavefront aberration of the objective lens in the case of 0.1 mm shift 0.022 λrms In this example, a hologram is used as the beam splitter, and the semiconductor laser and the light detector are used in proximity to each other. The size of this optical system can easily be reduced, and it is easily moved. It is preferable that a half mirror, a polarization beam splitter, or the like, is used as the beam splitter, and even when the laser beam source and the light detector are structured separate from each other, these are integrated and can be moved in the direction of the optical axis of the objective lens.

When the diaphragm diameter of the iris diaphragm 303 is reduced and NA on the side of the information recording surface is approximately 0.42, NA on the side of the laser beam source is approximately 0.08. Even when the substrate thickness is changed, NA on the side of the laser beam source is almost the same, and the light emergence efficiency or an amount of the light returning to the light detector is also almost the same. Accordingly, a laser light-amount control system and a signal detection system is easily structured.

EXAMPLE 13

Figure 29:
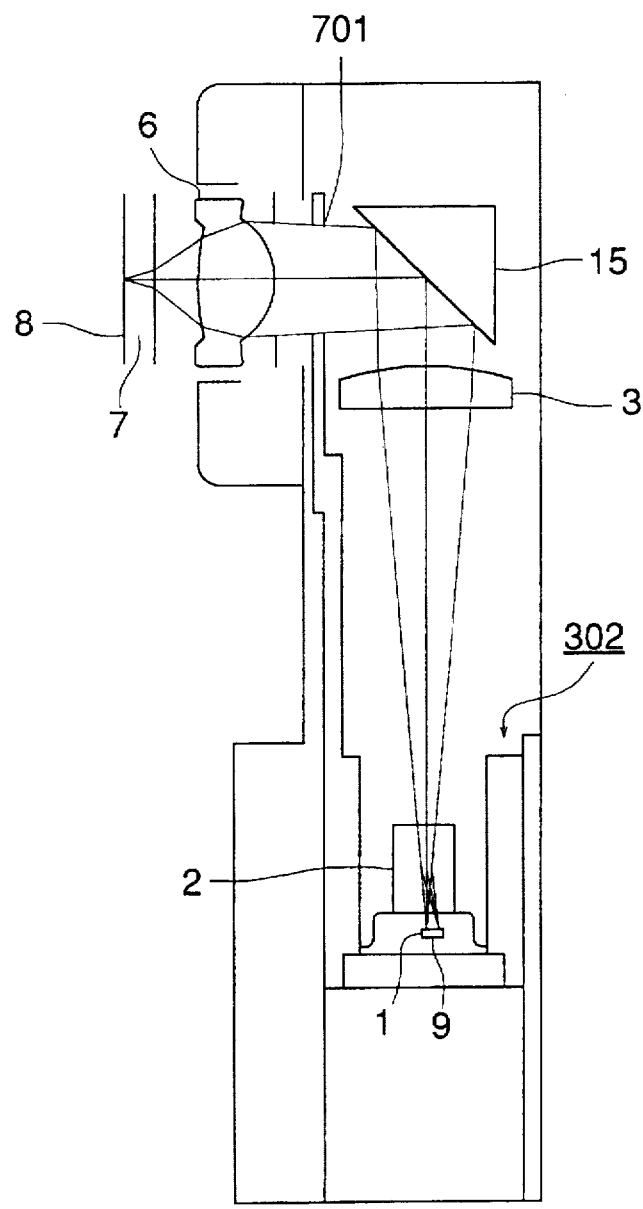
FIG. 29 is a view of an optical system in the arrangement in Example 13.

In this example, the same optical system as that in Example 12 is used, and thinner information pick-up is used. In FIG. 29, a deflection mirror 15 is arranged between the objective lens 6 and the lens 3, so that the optical path is deflected by 90°. A top of the light projecting and receiving unit 302 is integrally provided with a diaphragm 701 which is arranged between the objective lens 6 and the deflection mirror 15 when the unit is moved to the position corresponding to a 1.2 mm thickness substrate, and the diaphragm is simultaneously switched by only movement of the projecting and receiving unit, resulting in low cost.

In the case of tracking by the 3-beam method, when a diffraction grating is arranged between the semiconductor laser and the beam splitter 2, and the light projecting and receiving unit 302, composed of a semiconductor laser 1, receiving means 9, beam splitter 2 and diffraction grating, is structured as a feeding guide, by which this unit 302 is slightly rotated (by about 1°) around the optical axis when the unit 302 is moved corresponding to the thickness of the substrate, the azimuth of the 3-beams can be most appropriately adjusted simultaneously corresponding to the track pitch of the information recording surface.

Next, Examples (14 to 17) according to the third and fourth embodiments to attain the first object of the present invention, will be described. Conditions of numerical values in each example, are the same as those in the above Examples (8 to 13).

In these examples (14–17), the wavelength of the light beam source $l=635$ nm, and in the thickness of transparent substrate, the first thickness corresponding to the first position $t1=0.6$ mm, and the second thickness corresponding to the second position $t2=1.2$ mm. In this case, the refractive index $n=1.58$ at the wavelength of the light beam source.

Further, the numerical aperture NA1 on the information recording surface-side at the first position is set to 0.6.

In the numerical aperture NA2 on the information recording surface-side at the second position, simulation for review is carried out with respect to the aberration view and a change of the wavefront aberration by presuming the case where the same diaphragm (the same diaphragm diameter $\phi A1$ at the same position with respect to the objective lens) as that at the first position, is used. In this case, however, it may also be allowed that the diaphragm diameter is adjustable and is smaller than $\phi A1$. When the diaphragm diameter is made smaller than $\phi A1$, it is clear that the NA2 value is reduced, and the amount of the aberration and the amount of the wavefront aberration are decreased less than those at $\phi A1$.

In the following table, $f_0$ is the focal length of the objective lens, U1 and U2 are the distances between the light beam source and the information recording surface of the information recording medium respectively at the first position and the second position (the distance between an object and the image), and m1 and m2 respectively represent the lateral magnification of the objective lens at the first position and the second position.

T1 and T2 respectively represent the distance from the objective lens, at the first position and the second position, to the light beam source (the direction forward from the light beam source toward the information recording medium is positive).

EXAMPLE 14

$f_0 = 3.2410959$

| 1st position | | | |
|---|---|---|---|
| T1 = −34.713 | U1 = 40.000 | m1 = −0.1000 | |
| 2nd position | | | |
| T2 = −22.383 | U2 = 28.089 | m2 = −0.1614 | |
| | ri | dli | d2i | ni |
| 1 | 2.080 | 3.10 | 3.10 | 1.49446 |
| 2 | −3.539 | 1.587 | 1.406 | |
| 3 | ∞ | 0.60 | 1.2 | 1.58000 |
| 4 | ∞ | | | |

-continued

| Aspherical coefficient | |
|---|---|
| 1st surface | |
| $\kappa = -6.08630 \times 10^{-1}$ | |
| $A_1 = -4.27090 \times 10^{-4}$ | $P_1 = 4.0000$ |
| $A_2 = -1.49720 \times 10^{-4}$ | $P_2 = 6.0000$ |
| $A_3 = -1.04560 \times 10^{-6}$ | $P_3 = 8.0000$ |
| $A_4 = -4.67950 \times 10^{-7}$ | $P_4 = 10.0000$ |
| 2nd surface | |
| $\kappa = -1.36490 \times 10$ | |
| $A_1 = 3.72820 \times 10^{-3}$ | $P_1 = 4.0000$ |
| $A_2 = -2.85100 \times 10^{-4}$ | $P_2 = 6.0000$ |
| $A_3 = 1.49930 \times 10^{-5}$ | $P_3 = 8.0000$ |
| $A_4 = 1.89980 \times 10^{-9}$ | $P_4 = 10.0000$ |

The distance di from the light beam source to the objective lens with respect to each transparent substrate is expressed as follows.

$d1 = -T1$ $d2 = -T2$

Accordingly, the amount of movement of the light beam source is expressed as follows.

$\Delta d = d2 - d1 = T1 - T2 = -12.33$ mm

Since $\Delta t = t2 - t1 = 0.6$ mm, $G = \Delta t \cdot (f_0 - m1 \cdot \Delta d)(f_0 \cdot m1^2 \cdot \Delta d) \cdot (n^2 - 1)/n^3 = -1.1438$ When the same diaphragm (the diaphragm having the same diaphragm diameter at the same position with respect to the objective lens) is used with respect to the first position and the objective lens, the numerical aperture at the second position NA2max is expressed as follows.

$NA2_{max} = 0.595$

When $NA2 = NA2_{max} = 0.595$, $NA1 \cdot |m1| = 0.0600$ $NA2 \cdot |m2| = 0.0958$ $|m1| \cdot f_0 \cdot NA1^4 = 0.0420$ $|m2| \cdot f_0 \cdot NA2^4 = 0.0654$ When the diaphragm diameter is adjustable and the numerical aperture at the second position $NA2 = 0.53$, $NA2 \cdot |m2| = 0.0853$ $|m2| \cdot f_0 \cdot NA2^4 = 0.0412$ When the numerical aperture at the second position NA2 0.45

$NA2 \cdot |m2| = 0.0725$ $|m2| \cdot f_0 \cdot NA2^4 = 0.0214$

Figure 30:
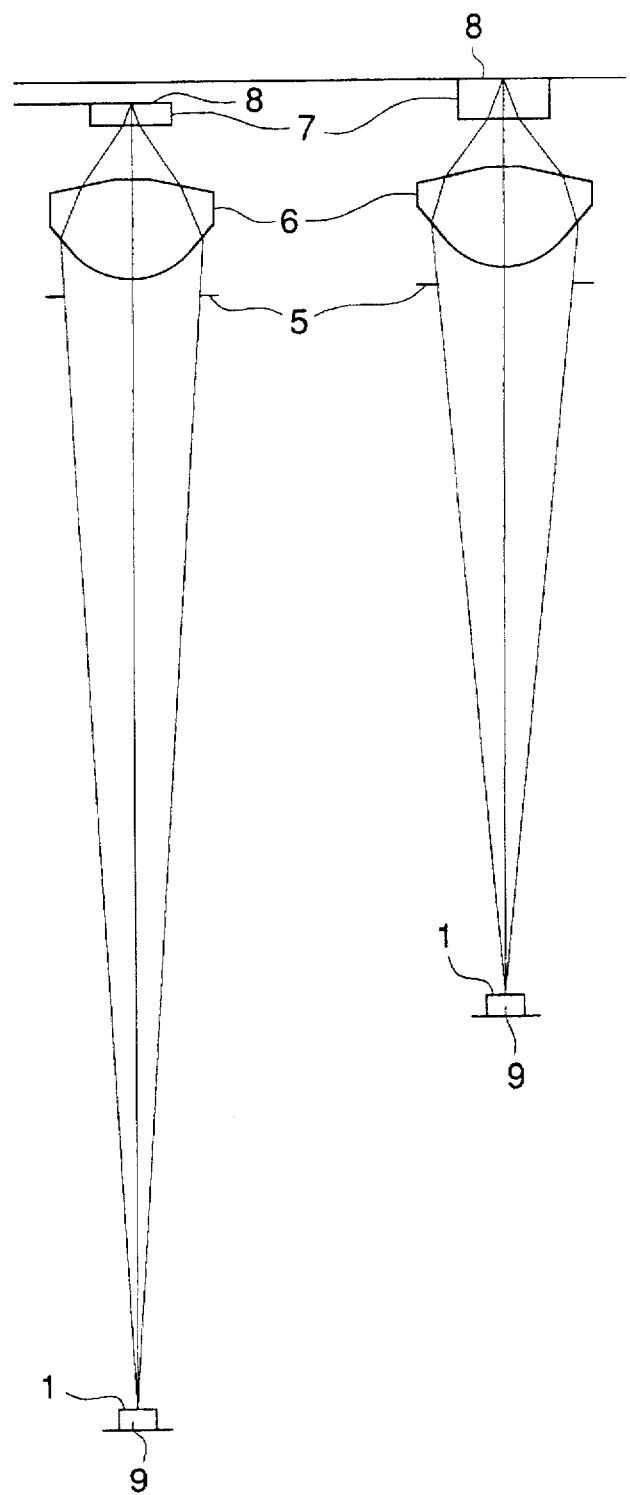
FIGS. 30(a) and 30(b) are views of the optical path respectively showing the first and second arrangement positions in Example 14 of the present invention.
Figure 31:
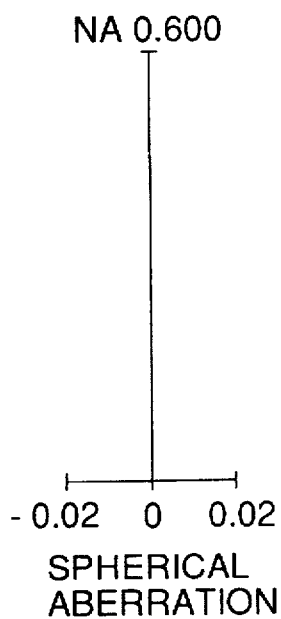
FIGS. 31(a), 31(b) and 31(c) are views of the spherical aberration in Example 14 of the present invention.
Figure 31:
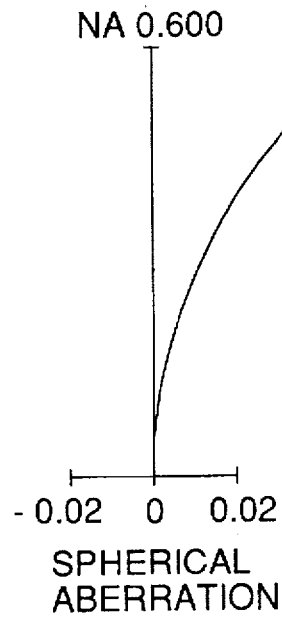
Figure 31:
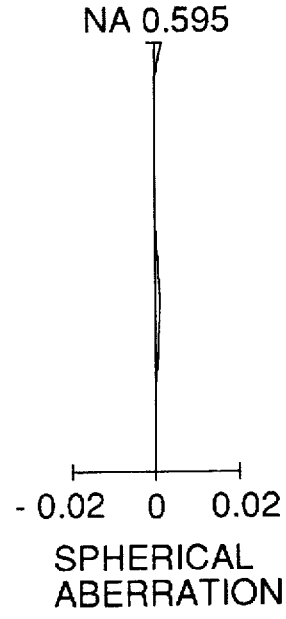

When $NA2 = 0.38$ $NA2 \cdot |m2| = 0.0612$ $|m2| \cdot f_0 \cdot NA2^4 = 0.0109$ The first position and the second position in Example 14 are shown in FIGS. 30(a) and 30(b). Views of the aberration when NA2=NA2max are shown in FIGS. 31(a), 31(b) and 31(c). FIG. 31(a) is the view of the aberration at the first position when t1=0.6 mm. FIG. 31(b) is the view of the aberration at the first position when the thickness of the transparent substrate t2=1.2 mm. At this time, the spherical aberration moves toward the "overcorrected" range. The view of the spherical aberration at the second position when t2=1.2 mm is shown in FIG. 31(c). In this case, the spherical aberration is almost corrected.

Figure 32:
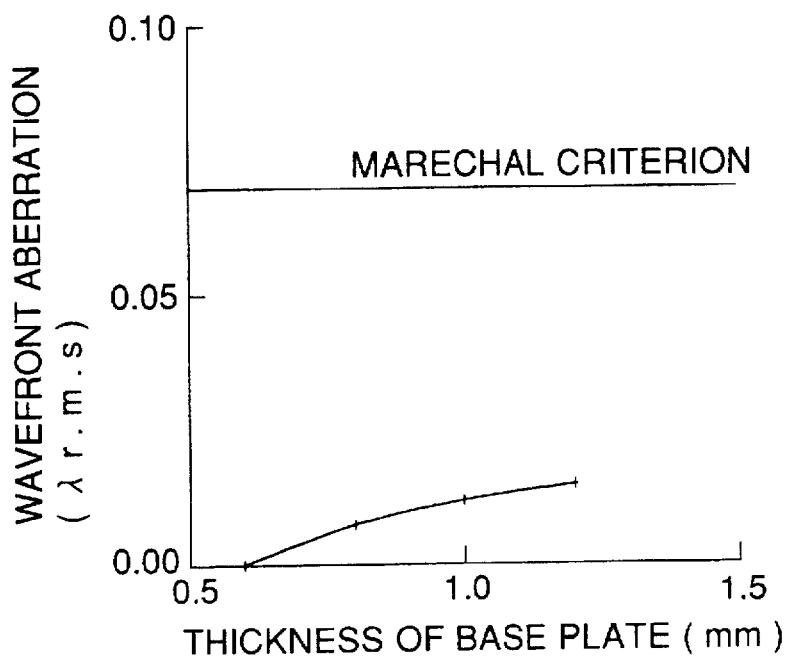
FIG. 32 is a view showing changes of the wavefront aberration when the thickness of the substrate is changed from 0.6 mm to 1.2 mm in Example 14.
Figure 33:
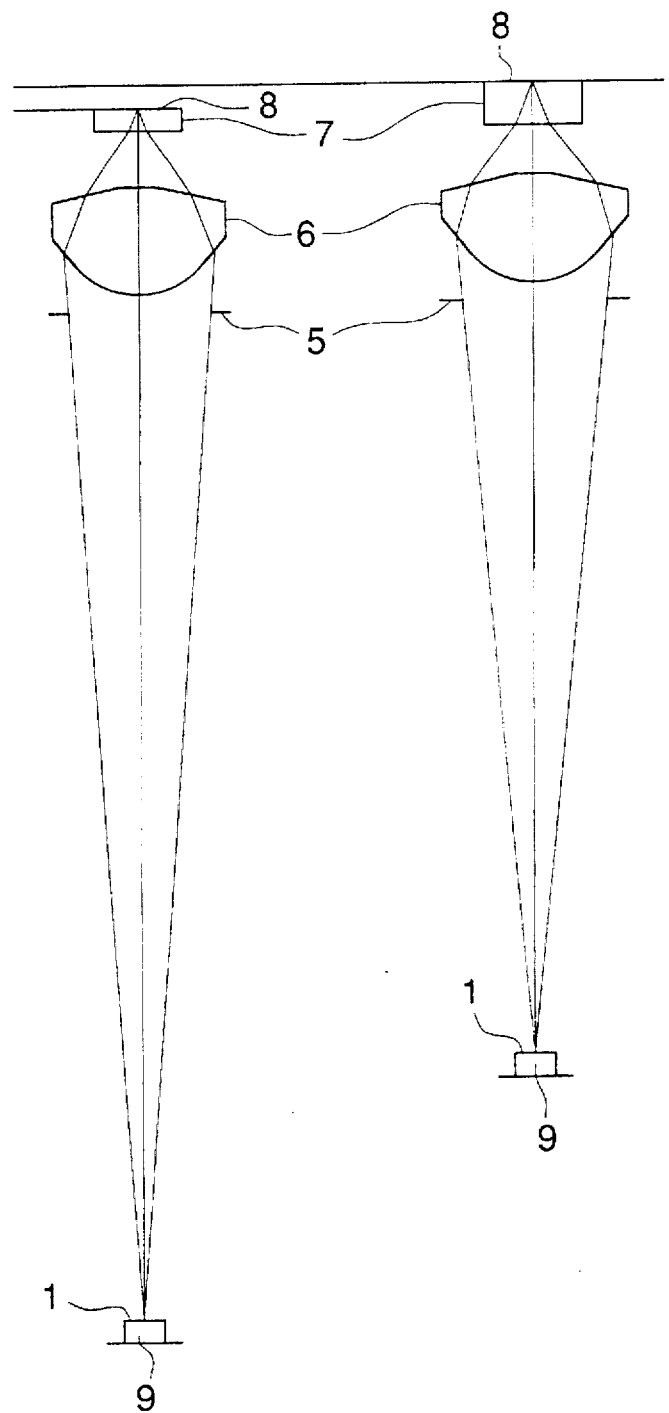
FIGS. 33(a) and 33(b) are views of the optical path respectively showing the first and second arrangement positions in Example 15 of the present invention.

FIG. 32 shows a change of the wavefront aberration value when the light beam source is moved so that the spherical aberration becomes minimum at each thickness of the transparent substrates the case where the thickness of the transparent substrate is changed from 0.6 mm to 1.2 mm in Example 14. In this case, the numerical aperture NA1=0.60 at a 0.6 mm transparent substrate thickness, and the numerical aperture NA2 at a 1.2 mm transparent substrate thickness is as follows, $NA2=NA2_{max}=0.595$. In these cases, the numerical apertures are respectively in the vicinity NA0.6.

Although the wavefront aberration value is 0.015 $\lambda$rms when t=1.2 mm, this value is sufficiently smaller than Marechal criterion, consequently is at the level in which no problems occur.

EXAMPLE 15

$f_0=3.3763632$

| 1st position | | | | |
|---|---|---|---|---|
| T1 = −29.470 | | U1 = 35.000 | | m1 = −0.1250 |
| 2nd position | | | | |
| T2 = −20.819 | | U2 = 26.768 | | m2 = −0.1839 |
| | ri | d1i | d2i | ni |
| 1 | 2.180 | 3.10 | 3.10 | 1.49446 |
| 2 | −3.775 | 1.830 | 1.649 | |
| 3 | ∞ | 0.60 | 1.2 | 1.58000 |
| 4 | ∞ | | | |

Aspherical coefficient

Figure 34:
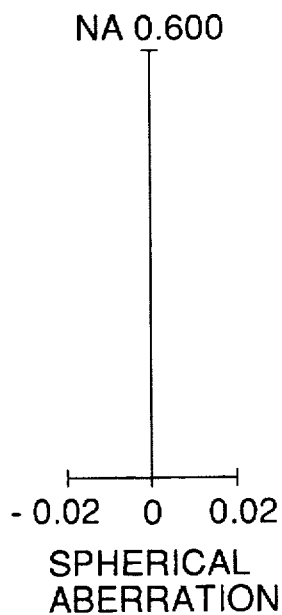
FIGS. 34(a), 34(b) and 34(c) are views of the spherical aberration in Example 15 of the present invention.
Figure 34:
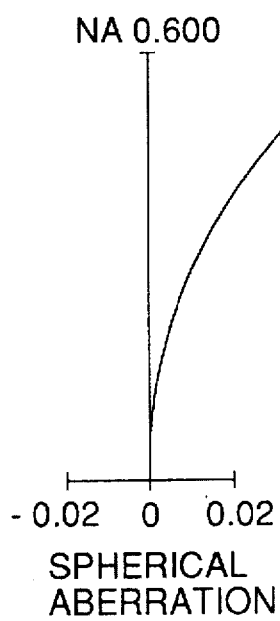
Figure 34:
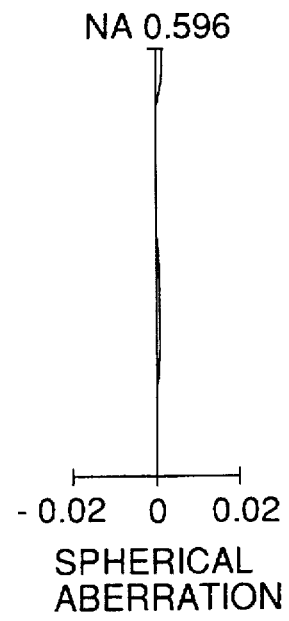
Figure 35:
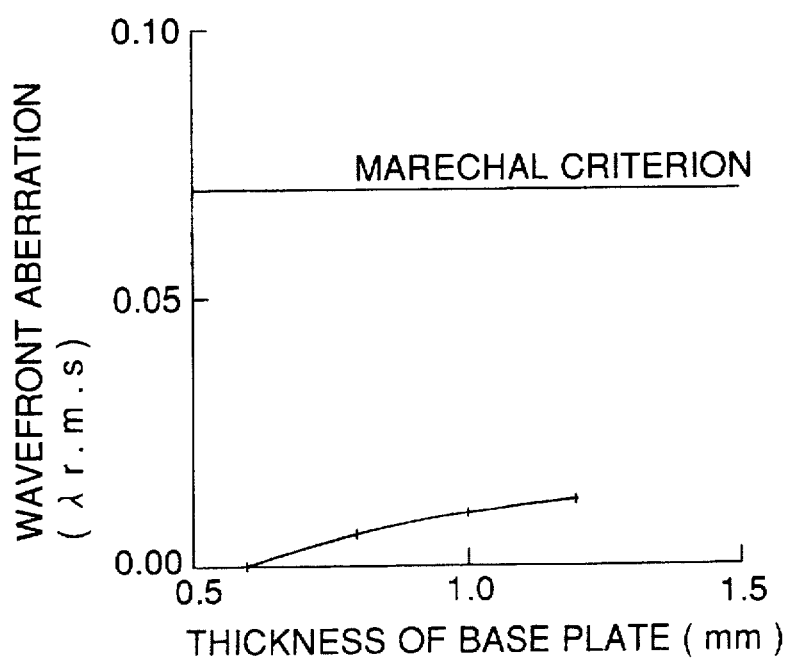
FIG. 35 is a view showing changes of the wavefront aberration when the thickness of the substrate is changed from 0.6 mm to 1.2 mm in Example 15.
Figure 36:
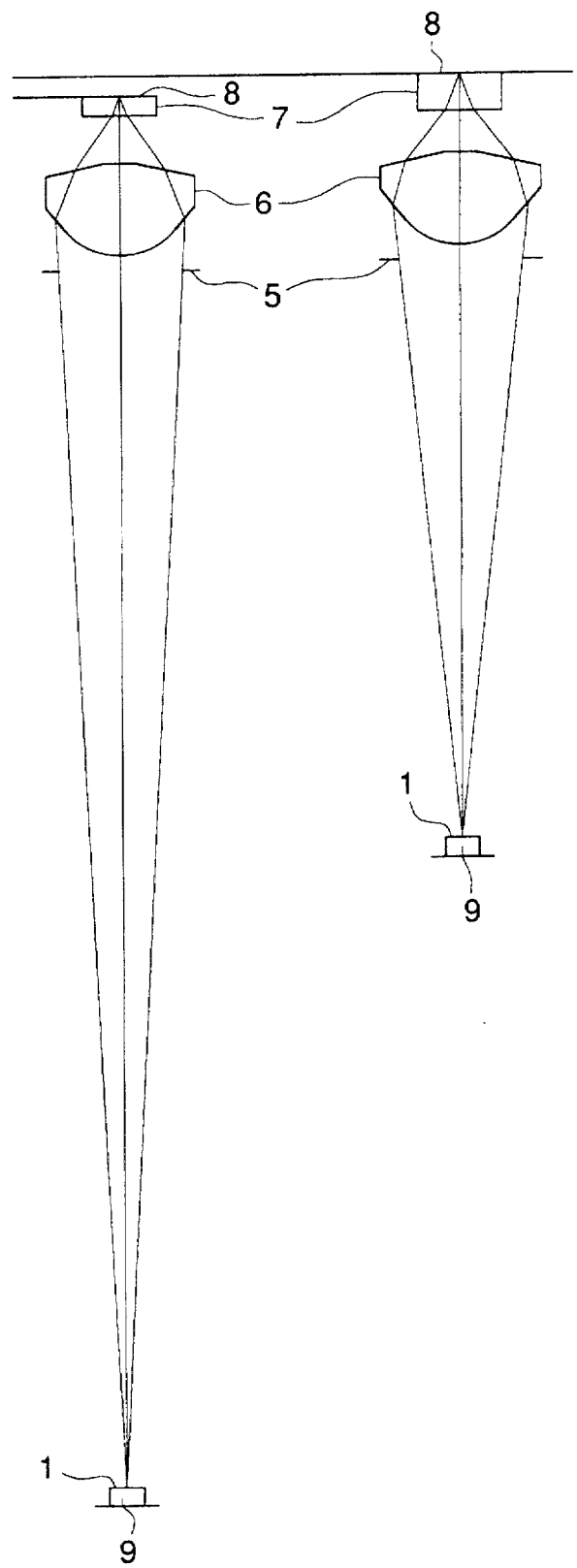
FIGS. 36(a) and 36(b) are views of the optical path respectively showing the first and second arrangement positions in Example 16 of the present invention.
Figure 37:
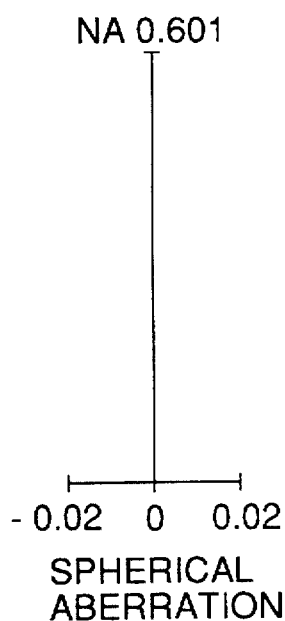
FIGS. 37(a), 37(b) and 37(c) are views of the spherical aberration in Example 16 of the present invention.
Figure 37:
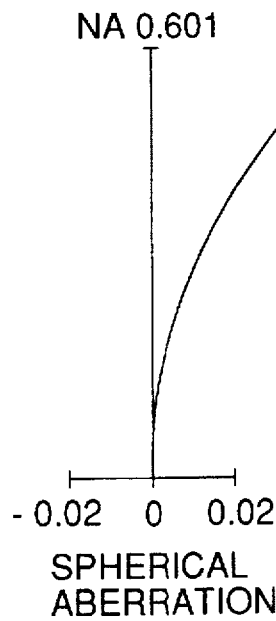
Figure 37:
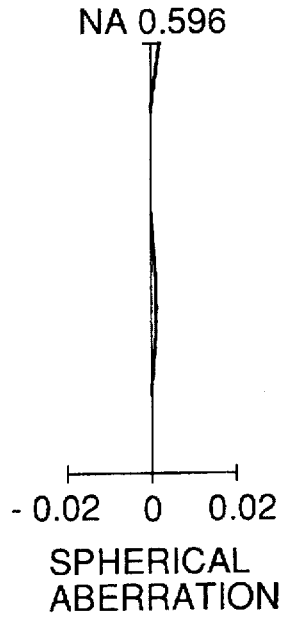
Figure 38:
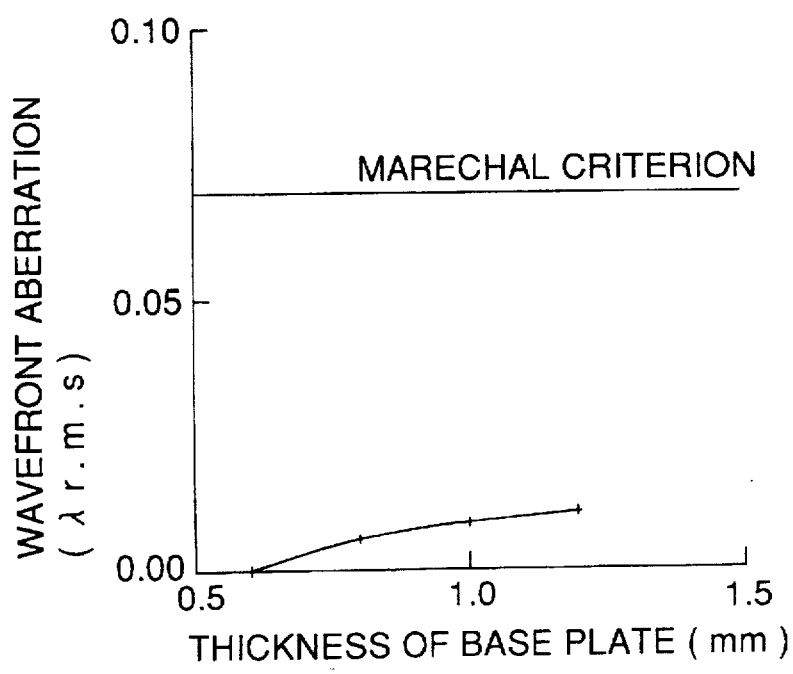
FIG. 38 is a view showing changes of the wavefront aberration when the thickness of the substrate is changed from 0.6 mm to 1.2 mm in Example 16.
Figures 39A, 39B:
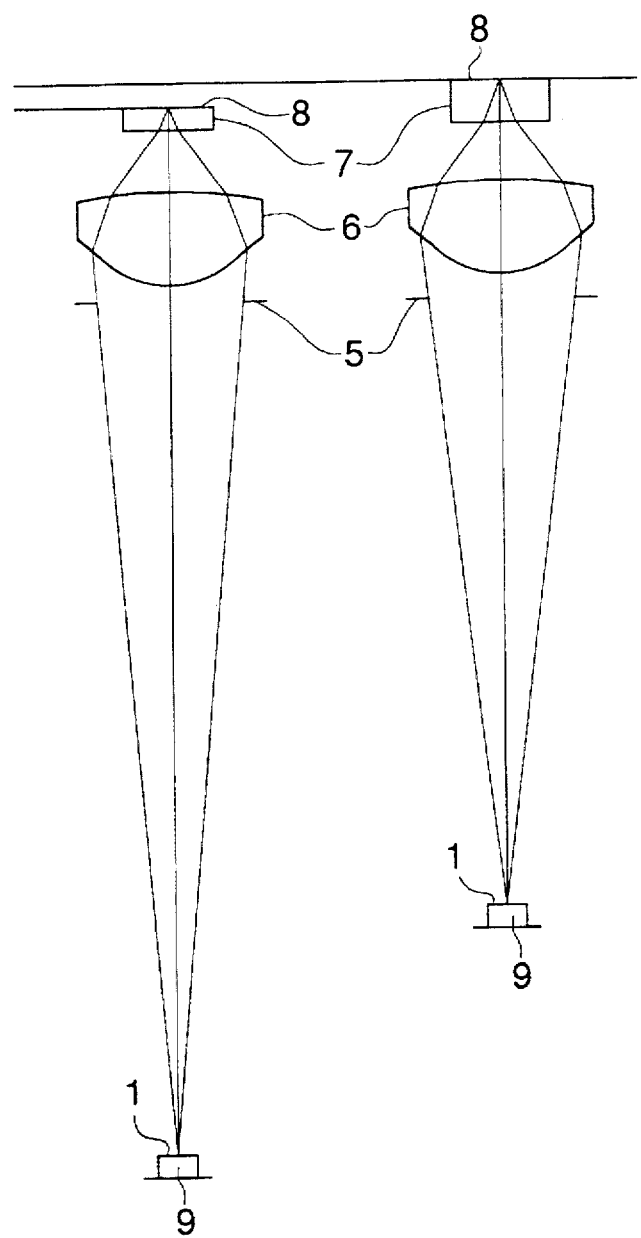
FIGS. 39(a) and 39(b) are views of the optical path respectively showing the first and second arrangement positions in Example 17 of the present invention.
Figure 40:
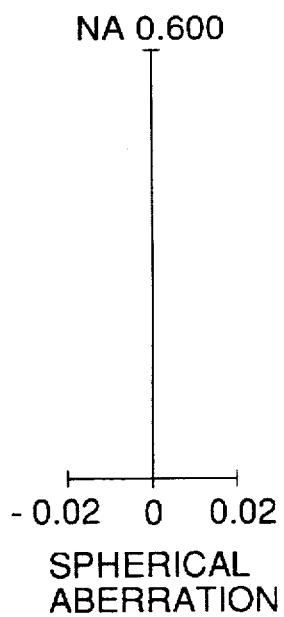
FIGS. 40(a), 40(b) and 40(c) are views of the spherical aberration in Example 17 of the present invention.
Figure 40:
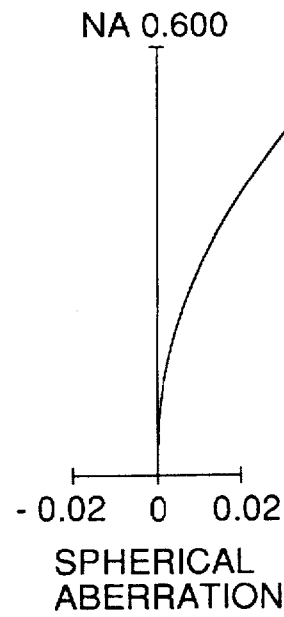
Figure 40:
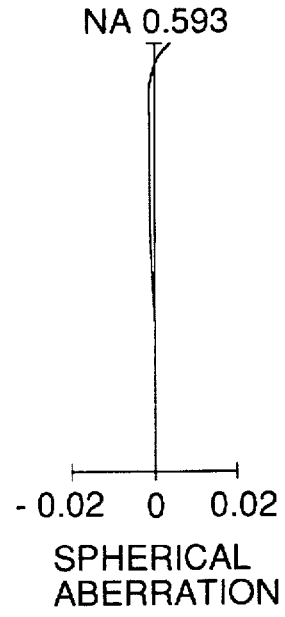
Figure 41:
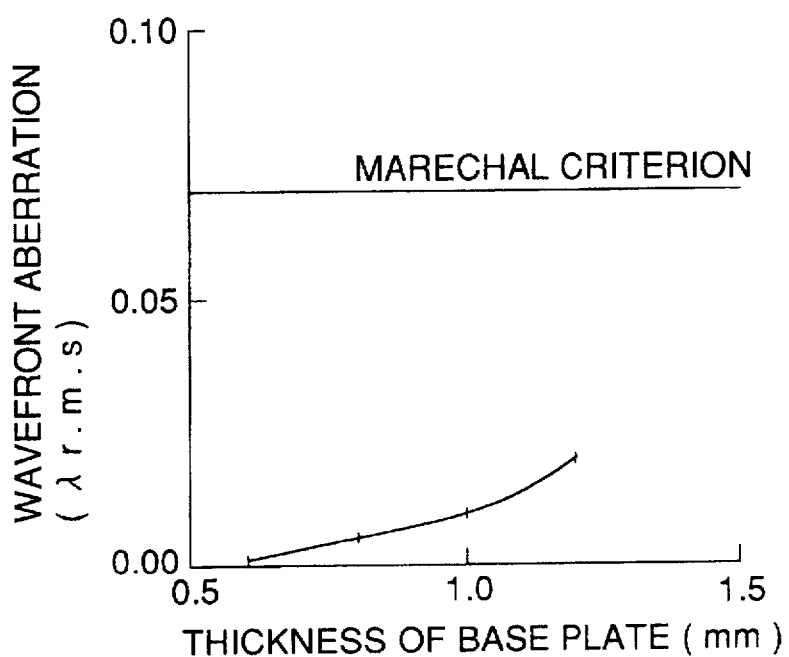
FIG. 41 is a view showing changes of the wavefront aberration when the thickness of the substrate is changed from 0.6 mm to 1.2 mm in Example 17.

1st surface $\kappa = -5.56960 \times 10^{-1}$
$A_1 = -1.38700 \times 10^{-3}$ $P_1 = 4.0000$
$A_2 = -2.05900 \times 10^{-4}$ $P_2 = 6.0000$
$A_3 = -5.04330 \times 10^{-6}$ $P_3 = 8.0000$
$A_4 = -7.19700 \times 10^{-7}$ $P_4 = 10.0000$ 2nd surface $\kappa = -1.27410 \times 10$
$A_1 = 2.53780 \times 10^{-3}$ $P_1 = 4.0000$
$A_2 = -1.10930 \times 10^{-4}$ $P_2 = 6.0000$
$A_3 = 1.24000 \times 10^{-5}$ $P_3 = 8.0000$
$A_4 = -2.74030 \times 10^{-7}$ $P_4 = 10.0000$ $\Delta d=T1-T2=-8.651$ $G=-1.1446$ $NA1=0.6$ $NA2_{max}=0.596$ When $NA2=NA2_{max}=0.596$ $NA1 \cdot |m1|=0.0750$ $NA2 \cdot |m2|=0.1097$ and $|m1| \cdot f_0 \cdot NA1^4=0.0547$ $|m2| \cdot f_0 \cdot NA2^4=0.0784$ When the numerical aperture NA2=0.53, $NA2 \cdot |m2|=0.0975$ $|m2| \cdot f_0 \cdot NA2^4=0.0490$ When the numerical aperture NA2=0.45, $NA2 \cdot |m2|=0.0828$ $|m2| \cdot f_0 \cdot NA2^4=0.0255$ When NA2=0.38, $NA2 \cdot |m2|=0.0699$ $|m2| \cdot f_0 \cdot NA2^4=0.0129$ In the same manner as in Example 14, the first and second arrangements in Examples 15, 16 and 17 are respectively shown in FIGS. 33(a), 33(b), 36(a), 36(b), 39(a) and 39(b). Views of spherical aberation at $NA2=NA2_{max}$ are respectively shown in FIGS. 34(a) to 34(c), 37(a) to 37(c), and 40(a) to 40(c). FIGS. 34(a), 37(a) and 40(a) are views of spherical aberration respectively at the first arrangement at t1=0.6 mm. FIGS. 34(b), 37(b) and 40(b) are views of spherical aberration respectively at the first arrangement of the transparent substrate at the thickness t2=1.2 mm. In this case, the spherical aberration moves to the "overcorrected"-range. Views of the sperical aberration at the second arrangement at t2=1.2 mm are respectively shown in FIGS. 34(c), 37(c) and 40(c). In this case, the spherical aberration is almost corrected. FIGS. 35, 38 and 41 show changes of the wave front aberration when the light beam source is moved so that the spherical aberration becomes minimum at respective thicknesses of the transparent substrates in cases where the thickness of the transparent substrate is changed from 0.6 mm to 1.2 mm, in Examples 15, 16 and 17.

EXAMPLE 16

$f_0=3.0107542$

| 1st position | | | | |
|---|---|---|---|---|
| T1 = −45.217 | | U1 = 50.000 | | m1 = −0.07000 |
| 2nd position | | | | |
| T2 = −24.567 | | U2 = 29.764 | | m2 = −0.13465 |
| | ri | d1i | d2i | ni |
| 1 | 1.911 | 2.800 | 2.800 | 1.49446 |
| 2 | −3.469 | 1.383 | 1.197 | |
| 3 | ∞ | 0.600 | 1.200 | 1.58000 |
| 4 | ∞ | | | |

Aspherical coefficient

1st surface $k = -6.04930 \times 10^{-1}$
$A_1 = 1.24640 \times 10^{-4}$ $P_1 = 4.0000$
$A_2 = -1.49370 \times 10^{-4}$ $P_2 = 6.0000$
$A_3 = 1.36210 \times 10^{-6}$ $P_3 = 8.0000$
$A_4 = -2.95790 \times 10^{-7}$ $P_4 = 10.0000$ 2nd surface $k = -1.57360 \times 10$
$A_1 = 5.52940 \times 10^{-3}$    $P_1 = 4.0000$
$A_2 = -5.47660 \times 10^{-4}$   $P_2 = 6.0000$
$A_3 = 2.58450 \times 10^{-5}$    $P_3 = 8.0000$
$A_4 = 1.12380 \times 10^{-6}$    $P_4 = 10.0000$ $\Delta d = T1 - T2 = -20.650$ $G = -1.1696$ $NA1 = 0.6$ $NA2_{max} = 0.596$ When $NA2 = NA2_{max} = 0.596$, $NA1 \cdot |m1| = 0.0420$ and $NA2 \cdot |m2| = 0.0805$ $|m1| \cdot f_0 \cdot NA1^4 = 0.0273$ $|m2| \cdot f_0 \cdot NA2^4 = 0.0513$ When $NA2 = 0.53$, $NA2 \cdot |m2| = 0.0718$ $|m2| \cdot f_0 \cdot NA2^4 = 0.0321$ When $NA2 = 0.45$, $NA2 \cdot |m2| = 0.0608$ $|m2| \cdot f_0 \cdot NA2^4 = 0.0167$ When $NA2 = 0.38$, $NA2 \cdot |m2| = 0.0513$ $|m2| \cdot f_0 \cdot NA2^4 = 0.0085$

EXAMPLE 17

$f_0 = 3.1052331$

1st position

| | | |
|---|---|---|
| T1 = -24.956 | U1 = 30.000 | m1 = -0.14000 |

2nd position

| | | | | |
|---|---|---|---|---|
| T2 = -17.998 | | U2 = 23.460 | | m2 = -0.20400 |
| | ri | d1i | d2i | ni |
| 1 | 2.580 | 2.600 | 2.600 | 1.72623 |
| 2 | -10.323 | 1.844 | 1.662 | |
| 3 | ∞ | 0.600 | 1.200 | 1.58000 |
| 4 | ∞ | | | |

Aspherical coefficient

1st surface $k = -7.75620 \times 10^{-1}$
$A_1 = 9.49130 \times 10^{-4}$    $P_1 = 4.0000$
$A_2 = 3.31790 \times 10^{-5}$    $P_2 = 6.0000$
$A_3 = 4.71180 \times 10^{-6}$    $P_3 = 8.0000$
$A_4 = -3.48490 \times 10^{-6}$   $P_4 = 10.0000$ 2nd surface $k = -1.63440 \times 10$
$A_1 = 7.67570 \times 10^{-3}$    $P_1 = 4.0000$
$A_2 = -1.52800 \times 10^{-3}$   $P_2 = 6.0000$
$A_3 = 8.96720 \times 10^{-5}$    $P_3 = 8.0000$
$A_4 = 1.76040 \times 10^{-6}$    $P_4 = 10.0000$ $\Delta d = T1 - T2 = -6.958$ mm $G = -1.1455$ $NA1 = 0.6$ $NA2_{max} = 0.593$ When $NA2 = NA2_{max} = 0.593$, $NA1 \cdot |m1| = 0.0840$ $NA2 \cdot |m2| = 0.1210$ Further, $|m1| \cdot f_0 \cdot NA1^4 = 0.0563$ $|m2| \cdot f_0 \cdot NA2^4 = 0.0783$ When the diaphragm diameter is adjustable and the numerical aperture at the second position NA2=0.53, $NA2 \cdot |m2| = 0.1081$ $|m2| \cdot f_0 \cdot |NA2^4 = 0.0500$ When the diameter of the diaphragm is changeable and the numerical aperture at the second position NA2=0.45

$NA2 \cdot |m2| = 0.0918$ $|m2| \cdot f_0 \cdot NA2^4 = 0.0260$

When $NA2 = 0.38$, $NA2 \cdot |m| = 0.0775$ $|m2| \cdot f_0 \cdot NA2^4 = 0.0132$ In information recording medium apparatus using the optical pick-up apparatus described above, when the optical information recording medium is read out, discrcrimination means to discriminate the thickness of the substrate of the loaded information recording medium is provided in the information recording medium apparatus, and the divergence degree of the luminous flux entering into the objective lens is set according to information by the discrimination means. This discrimination means can be composed of at least a thickness detection means and a logic circuit such as well known CPUs or the like.

The thickness detection means is entirely the same as that in embodiment 2.

Even when the information recording medium apparatus can read the information recording medium thicknesses of plural types of substrates, when the information recording medium in which the thickness or shape is similar to each other, can be loaded into the apparatus, it is required to discriminate the thickness, and also to discriminate whether the kind of information recording medium is the assumed one or not. In order to meet this requirement, it may be allowed to detect whether the kind of signals from the information recording surface of the informaiton recording medium is an assummed one or not.

For this purpose, the following is carried out in the same manner as in Embodiment 2: the luminous flux entering into the objective lens is in the condition of the second divergence degree corresponding to the substrate thickness of, for example, 1.2 mm; the information recording medium is rotated at the predetermined second rotation speed (for example, 1500 rpm) by a spindle motor; the objective lens is vertically driven by an actuator for focusing drive; and when the information signal having a predetermined frequency component can not be detected at the vicinity of the focused point of a focusing error signal, or when a predetermined information signal can not be detected after only a focusing servo-operation has been conducted or a tracking servo-operation has been conducted, the moving means is controlled by the control means composed of a CPU or the like, and the laser beam source is moved so that the first divergence degree corresponding to the substrate of, for example, 0.6 mm thickness is obtained.

When the optical pick-up apparatus in Example 12 is used, the position of the laser beam source, and the diameter of the diaphragm can be changed under the condition that focusing servo-operations and tracking servo-operations are conducted. In the case of the optical pick-up apparatus in Example 13, a period of time, during which the laser beam is interrupted, becomes longer, and servo-operations tend to be unstable. Accordingly, the laser beam source is preferably moved after the servo-operation is stopped once.

After the laser beam source has been moved, the information signal is accessed again. When the predetermined information is not obtained, the type of the information recording medium is not the assumed one, so that this information recording medium is delivered.

In cases where the divergence degree or rotation speed is changed, when the pitch of the information track of the information recording medium which is assumed to be read after change, is different, then the diaphragm means is preferably controlled so that the diameter of the simultaneously entering luminous flux is changed, and the numerical aperture is changed so that a desirable spot size is obtained.

Further, also in cases where a tracking error is detected by a 3-beam method, it is preferable to change angles of the 0-order light and ±1-order light with respect to the information track.

The refractive index of optical members made of glass, plastic, or the like, and the wavelength of laser beam sources vary due to temperature and humidity. Further, members holding those optical members also expand and contract, and thereby, intervals between optical members are changed. Accordingly, spherical aberration is generated due to variations of temperature and humidity. This aberration can be corrected when the position of the divergence degree moving means is controlled.

In order to correct variations of temperature and humidity, after at least the focusing servo operation is carried out on the information recording surface 8 of the optical informaiton recording medium, the position of the divergence degree changing means is moved so that the amplitude of the reproduced signal becomes larger, or jittering is reduced. Further, when the above-described operations are carried out during information reproduction, or during waiting under the condition that at least the focusing servo-operation is carried out, optimal information recording and reproducing can be carried out.

As described in the third and fourth Embodiments, when only the light beam source is moved, the optical information recording medium, having a different substrate thickness, can be recorded and reproduced by one information pick-up apparatus, and an information pick-up apparatus and an optical disk apparatus can be obtained which are interchangeable for a plurality of substrate thickness, and are simple and compact in the structure, and are low in production cost.

Still further, this apparatus can function with arbitrary substrate thicknesses, and variation of substrate thickness can also be easily corrected.

In this connection, although the operation distance changes a little according to changes of the divergent angle of the light entering into the objective lens, it is not necessary to consider this change of the operation distance because it is within the operation range of the focusing actuator.

Next, Examples (18 to 24) according to the third and the fourth embodiments to attain the first object of the present invention, will be described.

EXAMPLE 18

The first position

Composite focal length of the entire system

F1=3.7183650

Focal length of the objective lens single body $f_o$=3.241

Distance between the light beam source and the first surface of the coupling lens

T=−9.838

Lateral magnification of the entire system mt1=−0.140

Lateral magnification of the objective lens single body mo1=−0.1

Total length of the optical system (distance between the light beam source and the image formation point)

U=34.623

The second position

Composite focal length of the entire system

F2=3.0168480

Distance between the light beam source and the first surface of the coupling lens

T=−9.838

Lateral magnification of the entire system mt2=−0.225

Lateral magnification of the objective lens single body mo2=−0.161

Total length of the optical system (distance between the light beam source and the image formation point)

U=22.719

| i | ri | d1i | d2i | ni |
|---|----|----|-----|----|
| 1 | −5.584 | 2.00 | | 1.51455 |
| 2 | −5.315 | 17.50 | 5.18 | |
| 3 | 2.080 | 3.10 | | 1.49446 |
| 4 | −3.539 | 1.585 | 1.402 | |
| 5 | ∞ | 0.60 | 1.20 | 1.58000 |
| 6 | ∞ | | | |

Aspherical coefficient

Figure 42:
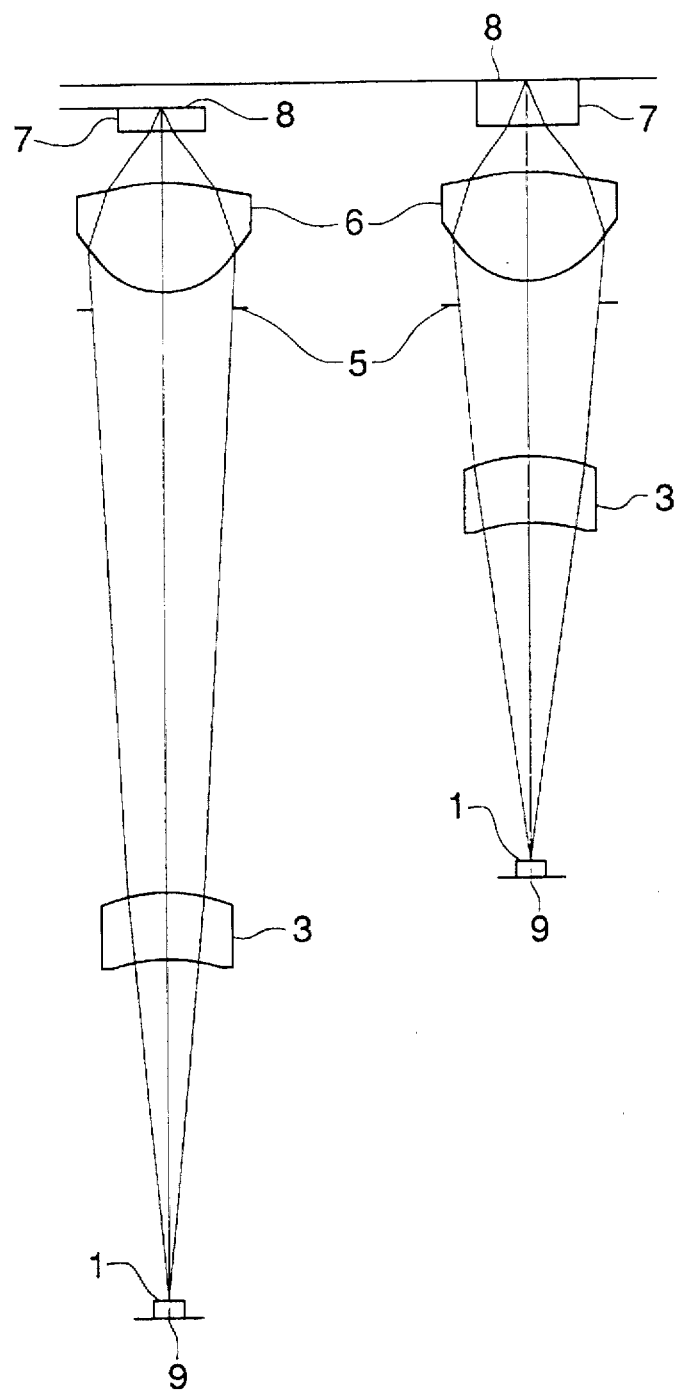
FIGS. 42(a) and 42(b) are views of the optical path when the thickness of the transparent substrates are 0.6 mm and 1.2 mm in Example 18 of the information recording and reproducing optical systems of the present invention.

3rd surface $k = -6.08630 \times 10^{-1}$
$A_1 = -4.27090 \times 10^{-4}$  $P_1 = 4.0000$
$A_2 = -1.49720 \times 10^{-4}$  $P_2 = 6.0000$
$A_3 = -1.04560 \times 10^{-6}$  $P_3 = 8.0000$
$A_4 = -4.67950 \times 10^{-7}$  $P_4 = 10.0000$ 4th surface $k = -1.36490 \times 10$
$A_1 = 3.72820 \times 10^{-3}$  $P_1 = 4.0000$
$A_2 = -2.85100 \times 10^{-4}$  $P_2 = 6.0000$
$A_3 = 1.49930 \times 10^{-5}$  $P_3 = 8.0000$
$A_4 = 1.89980 \times 10^{-9}$  $P_4 = 10.0000$ The first position and the second position in Example 18 are own in FIGS. 42(a) and 42(b). The magnification ratio mc of the coupling lens is mo1/mt1=0.714, and the coupling lens is set so to be image-side NA1 0.6. Also in the second position, the distance T between the light beam source and the coupling lens, and the magnification ratio mc of the coupling lens is the same as those in the first position. The amount of movement of the light beam source and the coupling lens is as follows.

$\Delta d = d2 - d1 = -12.32$ mm

Further, $\Delta t = t2 - t1 = 0.6$ mm then, $G = \Delta t \cdot (f_0 m 0.1 \cdot \Delta d)/(m01^2 \cdot \Delta d \cdot f_0) \cdot (n^2-1)/n^3 = -1.1453$ When the same diaphragm (the diaphragm having the same diaphragm diameter and the same position with respect to the objective lens) is used in the first position and the second position, the numerical aperture at the second position NA is expressed as follows, NA2=0.595.

Figure 43:
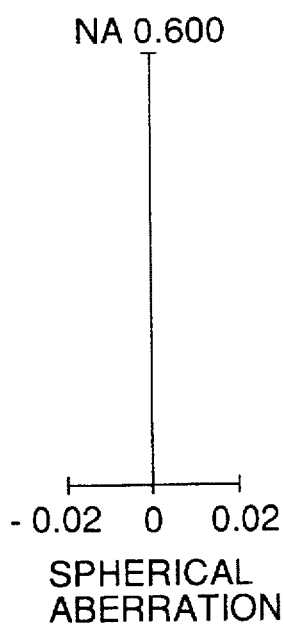
FIGS. 43(a), 43(b) and 43(c) are views of the spherical aberration in the optical system in Example 18.
Figure 43:
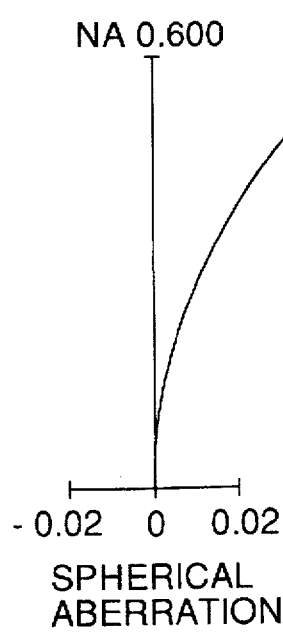
Figure 43:
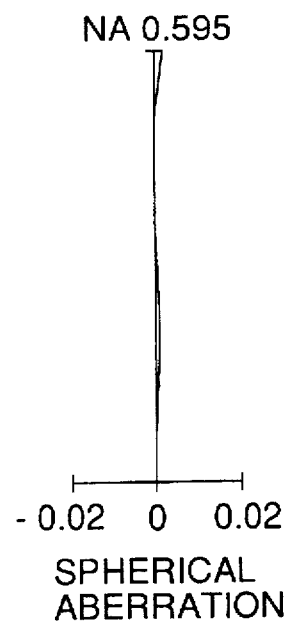

The spherical aberration is shown in FIGS. 43(a), 43(b) and 43(c).

FIG. 43(a) shows the spherical aberration at the first position at the time of t1=0.6 mm. FIG. 43(b) shows the spherical aberration at the first position when the thickness of the transparent substrate t2=1.2 mm, and the spherical aberration greatly moves to the "overcorrected" range, so that the diameter of the spot cannot be reduced. FIG. 43(c) is a view of the spherical aberration at the second position when t2=1.2 mm, and the aberration is almost corrected, so that the diameter of the spot can be reduced.

Figure 44:
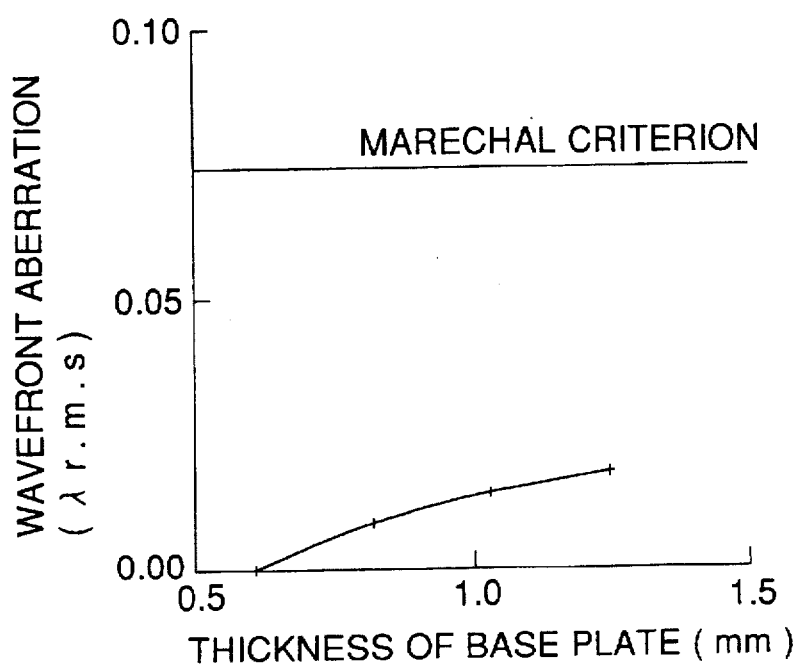
FIG. 44 is a graph showing changes of the wavefront aberration while 0.6 mm thickness of the transparent substrate is adjusted to 1.2 mm thickness of the transparent substrate in Example 18.

FIG. 44 shows a change of the wavefront aberration value when the light beam source and the coupling lens are integrally moved so that the spherical aberration becomes minimum at each thickness of the transparent substrates in the case where the thickness of the transparent substrate is changed from 0.6 mm to 1.2 mm. In this case, the numerical aperture NA is 0.60 at 0.6 mm transparent substrate thickness, and the numerical aperture NA at 1.2 mm transparent substrate thickness is 0.595. In these cases, the numerical apertures are each about NA0.6.

The wavefront aberration value is 0.015 λrms even when t=1.2 mm, and this value is satisfactorily corrected.

EXAMPLE 19

1st position

F1 = 3.9470247         T = −9.752
mt1 = −0.180  mo1 = −0.125  U = 29.782

2nd position

The lateral magnification ratio of the objective lens single body
F2 = 3.2389684         T = −9.752
mt2 = −0.265  mo2 = −0.184  U = 21.552

| i | ri | d1i | d2i | ni |
|---|----|----|-----|-----|
| 1 | −9.373 | 2.00 | | 1.51455 |
| 2 | −7.212 | 12.50 | 3.850 | |
| 3 | 2.180 | 3.10 | | 1.49446 |
| 4 | −3.775 | 1.830 | 1.650 | |
| 5 | ∞ | 0.60 | 1.20 | 1.58000 |
| 6 | ∞ | | | |

Aspherical coefficient

Figure 45:
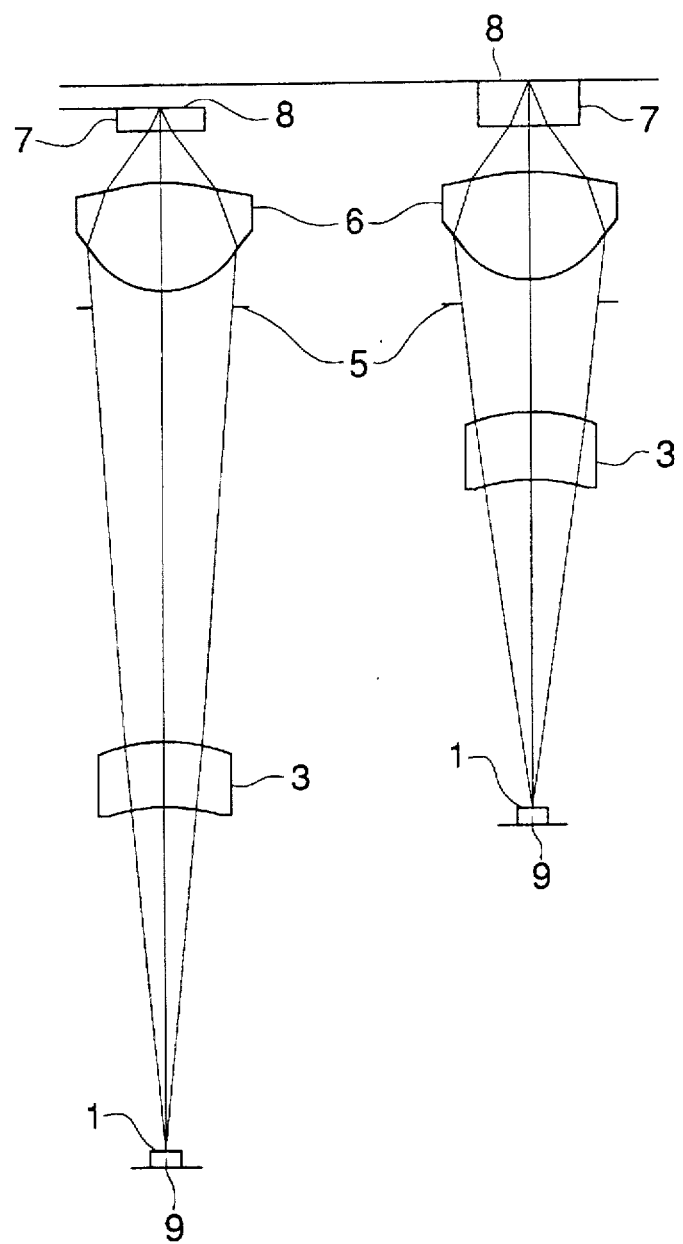
FIGS. 45(a) and 45(b) are views of the optical path when the thickness of the transparent substrates are 0.6 mm and 1.2 mm in Example 19 of the present invention.
Figure 46:
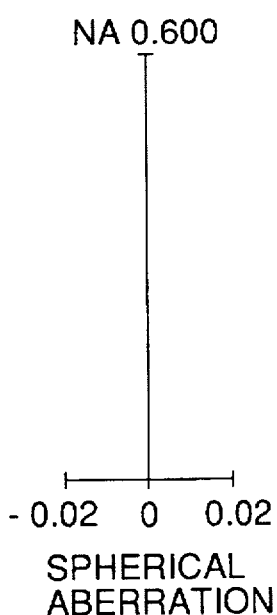
FIGS. 46(a), 46(b) and 46(c) are views of the spherical aberration in the optical system in Example 19.
Figure 46:
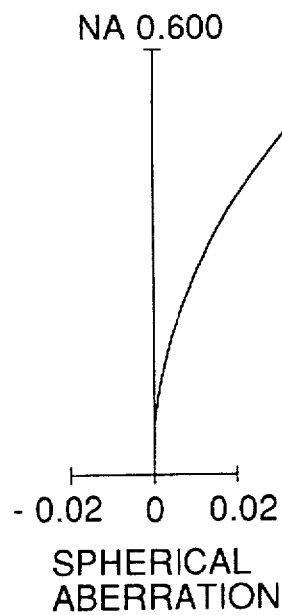
Figure 46:
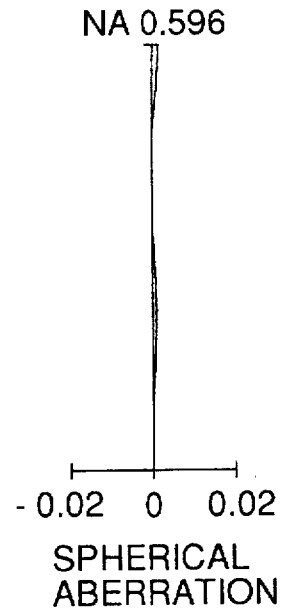
Figure 47:
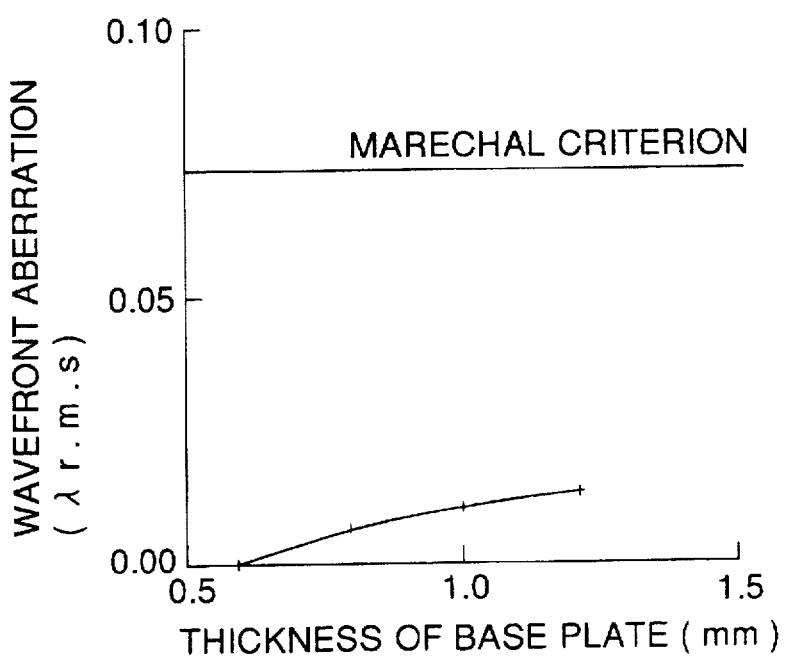
FIG. 47 is a graph showing changes of the wavefront aberration while 0.6 mm thickness of the transparent substrate is adjusted to 1.2 mm thickness of the transparent substrate in Example 19.

3rd surface $k = -5.56960 \times 10^{-1}$
$A_1 = -1.38700 \times 10^{-3}$  $P_1 = 4.0000$
$A_2 = -2.05900 \times 10^{-4}$  $P_2 = 6.0000$
$A_3 = -5.04330 \times 10^{-6}$  $P_3 = 8.0000$
$A_4 = -7.19700 \times 10^{-7}$  $P_4 = 10.0000$ 4th surface $k = -1.27410 \times 10$
$A_1 = 2.53780 \times 10^{-3}$  $P_1 = 4.0000$
$A_2 = -1.10930 \times 10^{-4}$  $P_2 = 6.0000$
$A_3 = 1.24000 \times 10^{-5}$  $P_3 = 8.0000$
$A_4 = -2.74030 \times 10^{-7}$  $P_4 = 10.0000$ The arrangement in Example 19 is shown in FIGS. 45(a) and 45(b), the spherical aberration is shown in FIGS. 46(a), 46(b) and 46(c), and a change of the wavefront aberration RMS value according to the movement is shown in FIG. 47. The aberration in FIGS. 46(a), 46(b) and 46(c) are the same as that in 43(a), 43(b) and 43(c).

$mc = 0.694 \Delta d = d2 - d1 = -8.65$ mm $G = -1.14479 NA1 = 0.6 NA2 = 0.596$

EXAMPLE 20

1st position

F1 = 5.7480506         T = −11.388
mt1 = −0.100  mo1 = −0.070  U = 44.670

2nd position

The lateral magnification ratio of the objective lens single body
F2 = 3.1419938         T = −11.388
mt2 = −0.192  mo2 = −0.134  U = 24.435

| i | ri | d1i | d2i | ni |
|---|----|----|-----|-----|
| 1 | −19.481 | 2.00 | | 1.51455 |
| 2 | −11.222 | 26.50 | 5.85 | |
| 3 | 1.911 | 2.80 | | 1.49446 |
| 4 | −3.469 | 1.382 | 1.197 | |
| 5 | ∞ | 0.60 | 1.20 | 1.58000 |
| 6 | ∞ | | | |

Aspherical coefficient

3rd surface $k = -6.04930 \times 10^{-1}$
$A_1 = 1.24640 \times 10^{-4}$  $P_1 = 4.0000$
$A_2 = -1.49370 \times 10^{-4}$  $P_2 = 6.0000$
$A_3 = 1.36210 \times 10^{-6}$  $P_3 = 8.0000$

|  |  |
|---|---|
| $A_4 = -2.95790 \times 10^{-7}$ | $P_4 = 10.0000$ |

4th surface

|  |  |
|---|---|
| $k = -1.57360 \times 10$ | |
| $A_1 = 5.52940 \times 10^{-3}$ | $P_1 = 4.0000$ |
| $A_2 = -5.47660 \times 10^{-4}$ | $P_2 = 6.0000$ |
| $A_3 = 2.58450 \times 10^{-5}$ | $P_3 = 8.0000$ |
| $A_4 = 1.12380 \times 10^{-6}$ | $P_4 = 10.0000$ |

Figure 48:
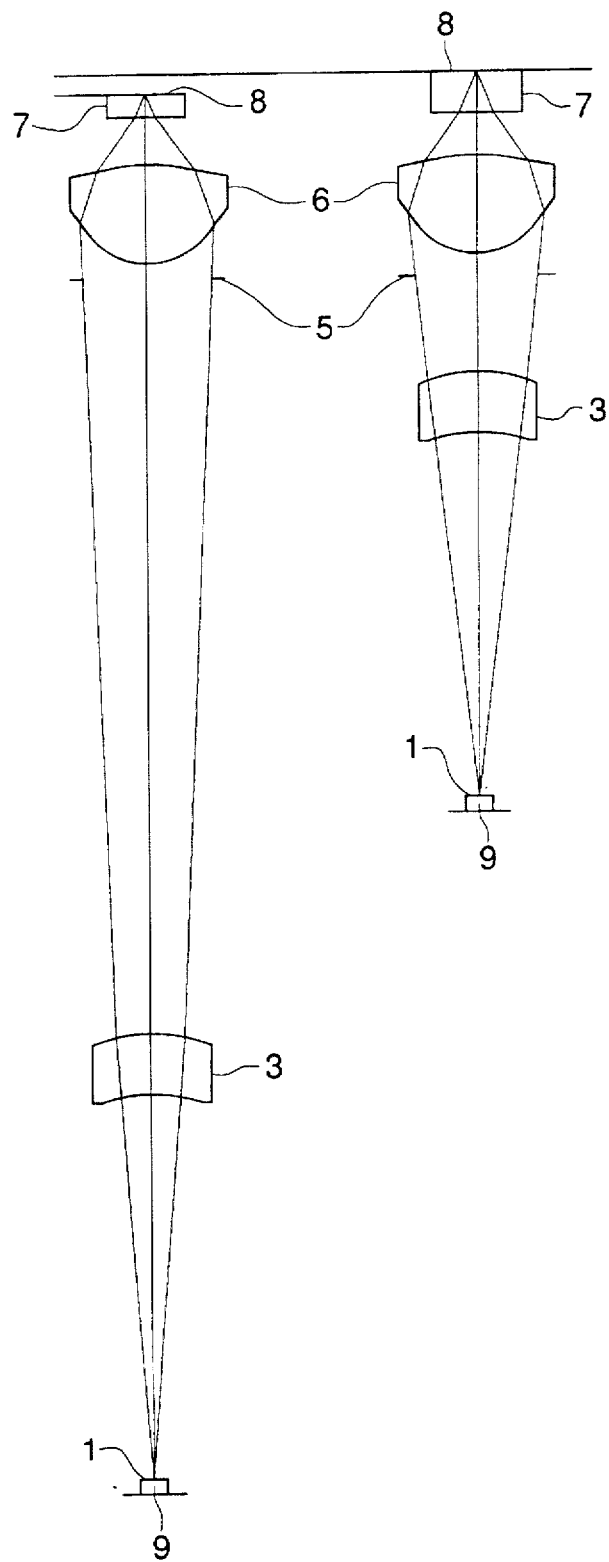
FIGS. 48(a) and 48(b) are views of the optical path when the thickness of the transparent substrates are 0.6 mm and 1.2 mm in Example 20 of the information recording and reproducing optical systems of the present invention.
Figure 49:
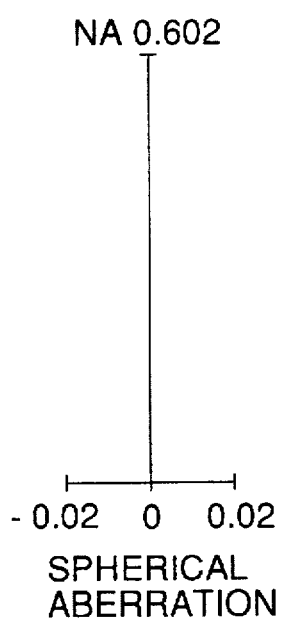
FIGS. 49(a), 49(b) and 49(c) are views of the spherical aberration in the optical system in Example 20.
Figure 49:
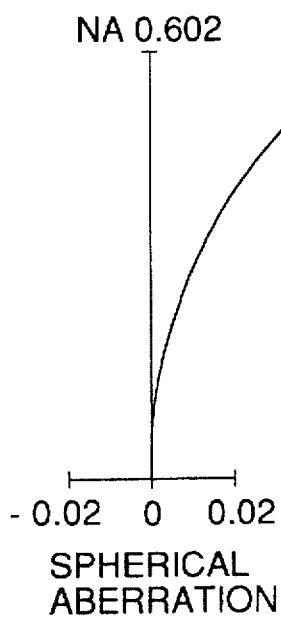
Figure 49:
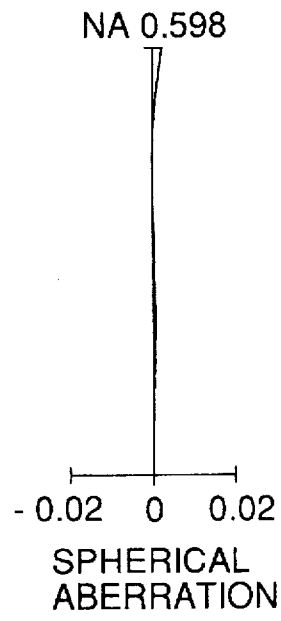
Figure 50:
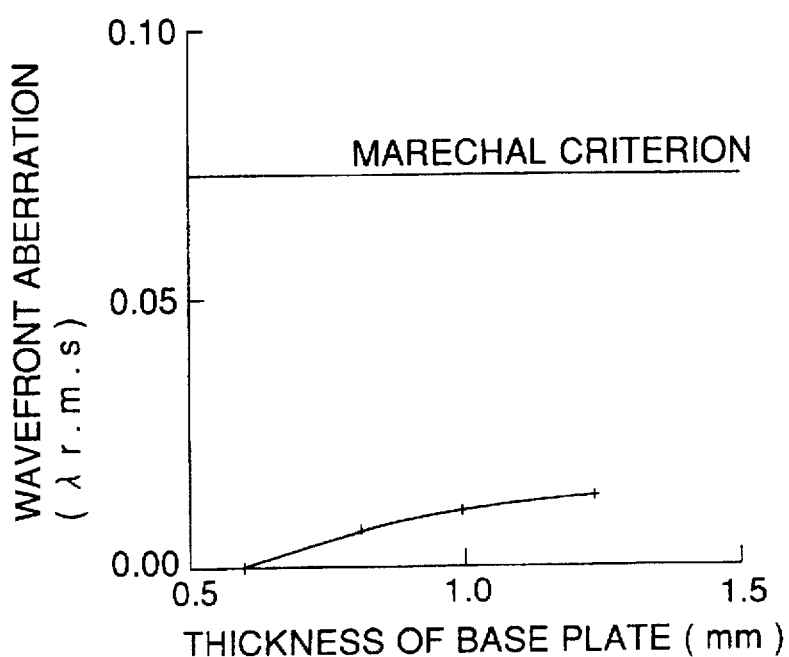
FIG. 50 is a graph showing changes of the wavefront aberration while 0.6 mm thickness of the transparent substrate is adjusted to 1.2 mm thickness of the transparent substrate in Example 20.

The arrangement in Example 20 is shown in FIGS. 48(a) and 48(b), the spherical aberration is shown in FIGS. 49(a), 49(b) and 49(c), and a change of the wavefront aberration value according to the movement is shown in FIG. 50. The aberration in FIGS. 49(a), 49(b) and 49(c) are the same as that in 43(a), 43(b) and 43(c).

$mc=0.700 \Delta d=d2 -d1=-20.65$ mm $G=-1.16964$ NA1=0.602 NA2=0.598

EXAMPLE 21

1st position

| F1 = 10.337302 |  | T = −10.365 |
|---|---|---|
| mt1 = −0.140 | mo1 = −0.070 | U = 38.145 |

2nd position

| F2 = 2.7318163 |  |  | T = −10.365 |  |
|---|---|---|---|---|
| mt2 = −0.263 | mo2 = −0.132 |  | U = 18.179 |  |
| i | ri | d1i | d2i | ni |
| 1 | −8.601 | 1.50 |  | 1.51455 |
| 2 | −5.471 | 21.50 | 1.13 |  |
| 3 | 1.911 | 2.80 |  | 1.49446 |
| 4 | −3.469 | 1.380 | 1.184 |  |
| 5 | ∞ | 0.60 | 1.20 | 1.58000 |
| 6 | ∞ |  |  |  |

Aspherical coefficient

3rd surface

|  |  |
|---|---|
| $k = -6.04930 \times 10^{-1}$ | |
| $A_1 = 1.24640 \times 10^{-4}$ | $P_1 = 4.0000$ |
| $A_2 = -1.49370 \times 10^{-4}$ | $P_2 = 6.0000$ |
| $A_3 = 1.36210 \times 10^{-6}$ | $P_3 = 8.0000$ |
| $A_4 = -2.95790 \times 10^{-7}$ | $P_4 = 10.0000$ |

4th surface

|  |  |
|---|---|
| $k = -1.57360 \times 10$ | |
| $A_1 = 5.52940 \times 10^{-3}$ | $P_1 = 4.0000$ |
| $A_2 = -5.47660 \times 10^{-4}$ | $P_2 = 6.0000$ |
| $A_3 = 2.58450 \times 10^{-5}$ | $P_3 = 8.0000$ |
| $A_4 = 1.12380 \times 10^{-6}$ | $P_4 = 10.0000$ |

Figure 51:
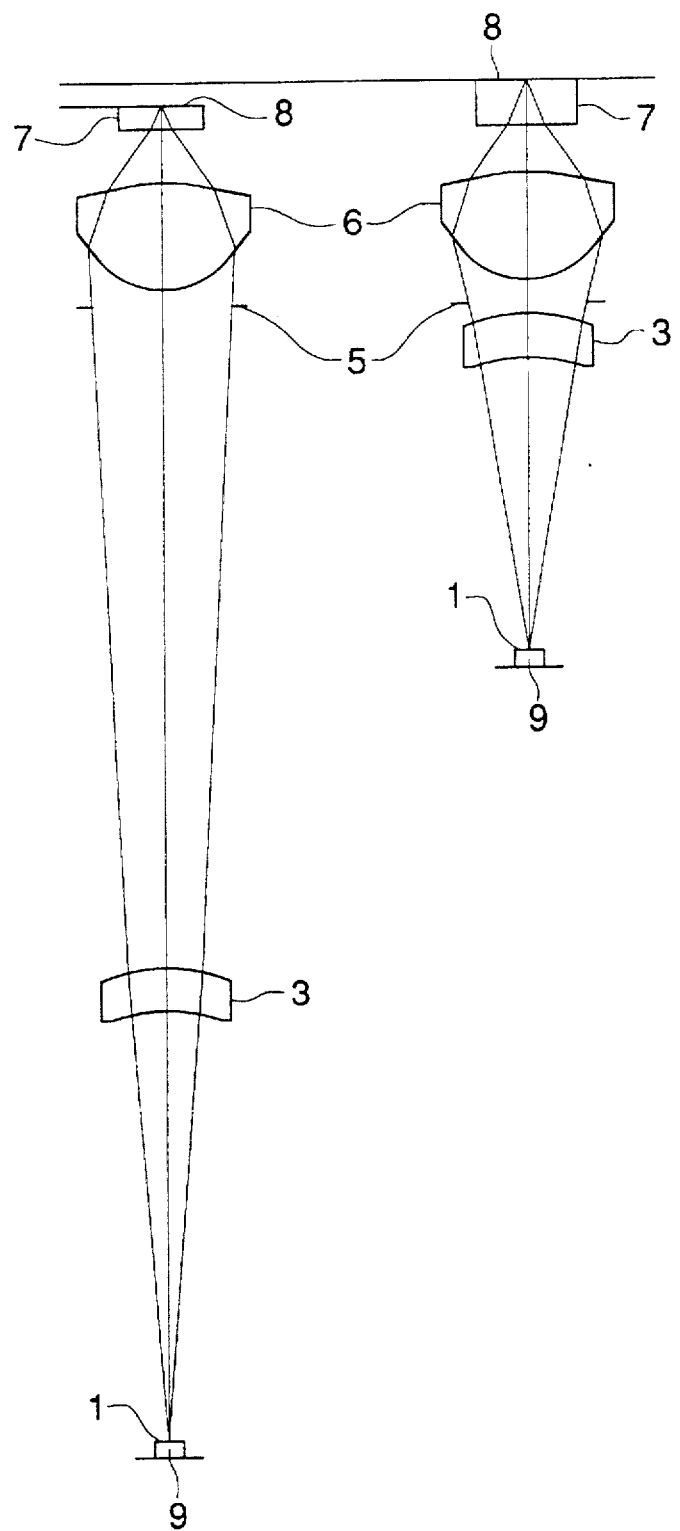
FIGS. 51(a) and 51(b) are views of the optical path when the thickness of the transparent substrates are 0.6 mm and 1.2 mm in Example 21 of the present invention.
Figures 52A, 52B, 52C:
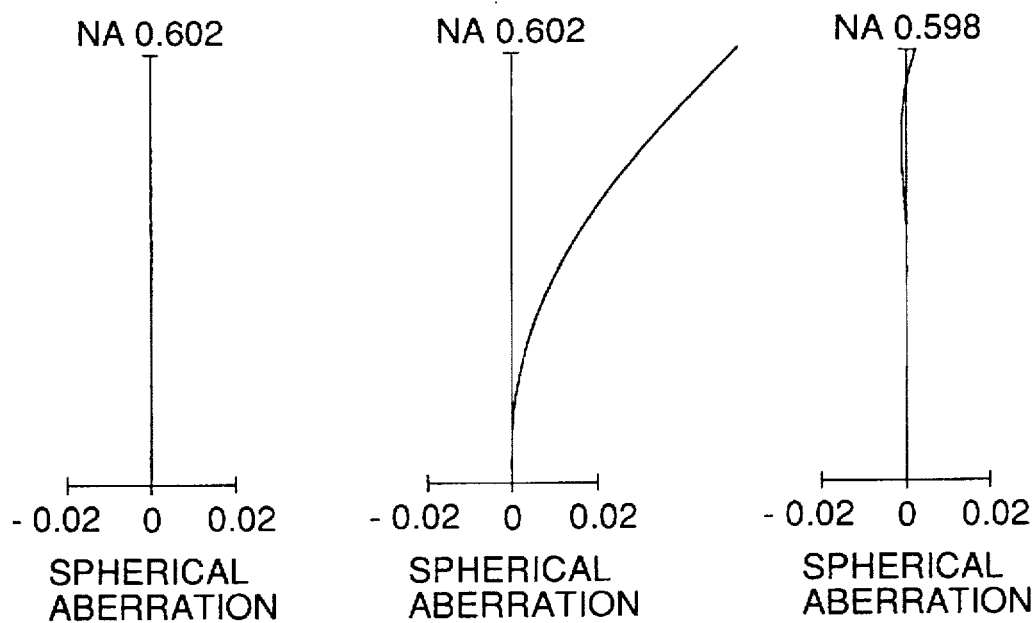
FIGS. 52(a), 52(b) and 52(c) are views showing the spherical aberration in the optical system in Example 21.
Figure 53:
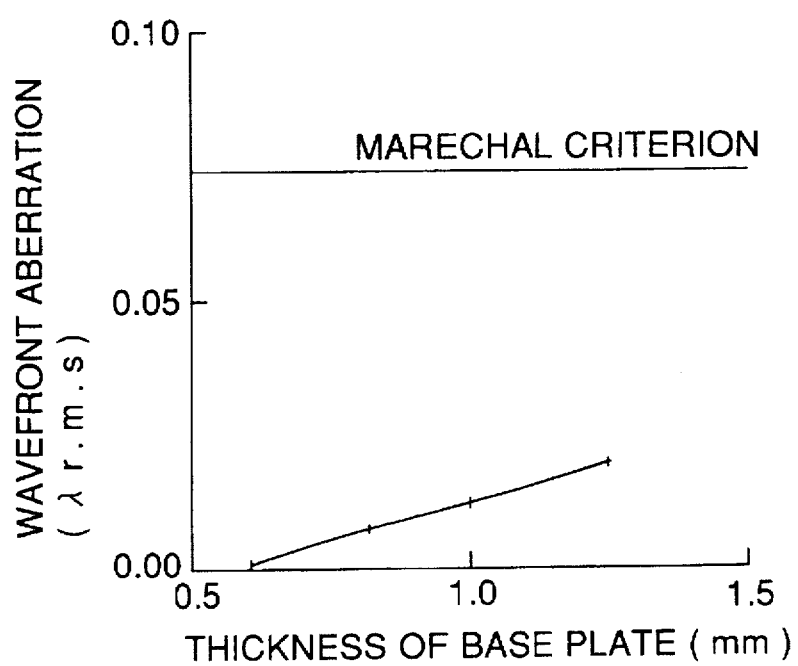
FIG. 53 is a graph showing the change of the wavefront aberration while the thickness of the transparent substrate is adjusted from 0.6 mm to 1.2 mm in Example 21.

The arrangement in Example 21 is shown in FIGS. 51(a) and 51(b), the spherical aberration is shown in FIGS. 52(a), 52(b) and 52(c), and a change of the wavefront aberration value according the movement is shown in FIG. 53. The aberration in FIGS. 52(a), 52(b) and 52(c) are the same as that in 43(a), 43(b) and 43(c).

$mc=0.500\Delta d=d2 -d1=-20.37$ mm $G=-1.20057$ NA1=0.602 NA2=0.598

EXAMPLE 22

1st position

| F1 = 3.3024261 |  | T = −11.779 |
|---|---|---|

| mt1 = −0.150 | mo1 = −0.125 | U = 31.809 |
|---|---|---|

2nd position

| F2 = 3.1287785 |  |  | T = −11.779 |  |
|---|---|---|---|---|
| mt2 = −0.221 | mo2 = −0.184 |  | U = 23.583 |  |
| i | ri | d1i | d2i | ni |
| 1 | −7.696 | 2.00 |  | 1.51455 |
| 2 | −7.626 | 12.50 | 3.855 |  |
| 3 | 2.180 | 3.10 |  | 1.49446 |
| 4 | −3.775 | 1.830 | 1.649 |  |
| 5 | ∞ | 0.60 | 1.20 | 1.58000 |
| 6 | ∞ |  |  |  |

Aspherical coefficient

3rd surface

|  |  |
|---|---|
| $k = -5.56960 \times 10^{-1}$ | |
| $A_1 = -1.38700 \times 10^{-3}$ | $P_1 = 4.0000$ |
| $A_2 = -2.05900 \times 10^{-4}$ | $P_2 = 6.0000$ |
| $A_3 = -5.04330 \times 10^{-6}$ | $P_3 = 8.0000$ |
| $A_4 = -7.19700 \times 10^{-7}$ | $P_4 = 10.0000$ |

4th surface

|  |  |
|---|---|
| $k = -1.27410 \times 10$ | |
| $A_1 = 2.53780 \times 10^{-3}$ | $P_1 = 4.0000$ |
| $A_2 = -1.10930 \times 10^{-4}$ | $P_2 = 6.0000$ |
| $A_3 = 1.24000 \times 10^{-5}$ | $P_3 = 8.0000$ |
| $A_4 = -2.74030 \times 10^{-7}$ | $P_4 = 10.0000$ |

Figure 54:
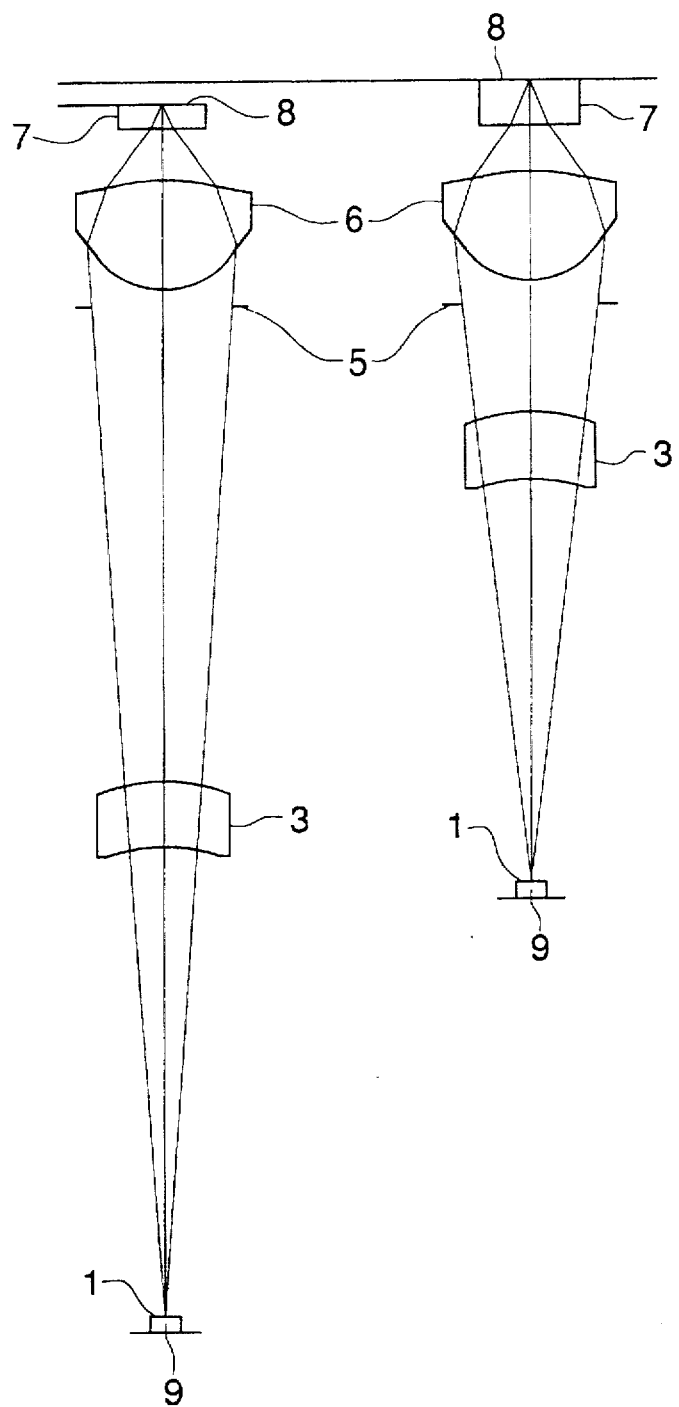
FIGS. 54(a) and 54(b) are views showing the optical path when the thickness of the transparent substrates is respectively 0.6 mm and 1.2 mm in Example 22 of the present invention.
Figure 55:
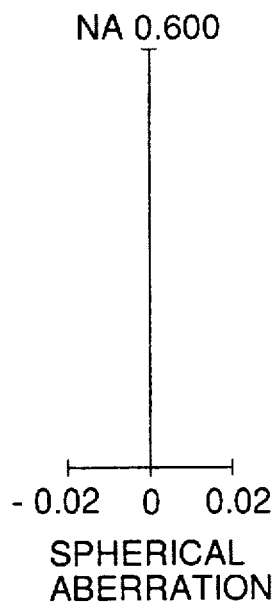
FIGS. 55(a), 55(b) and 55(c) are views showing the spherical aberration in the optical system in Example 22.
Figure 55:
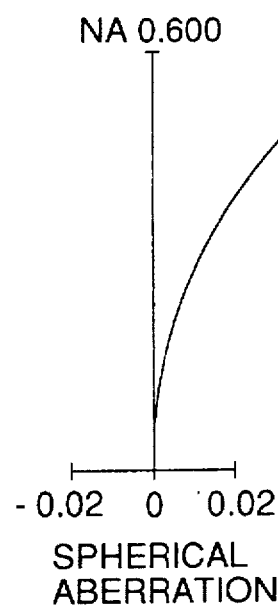
Figure 55:
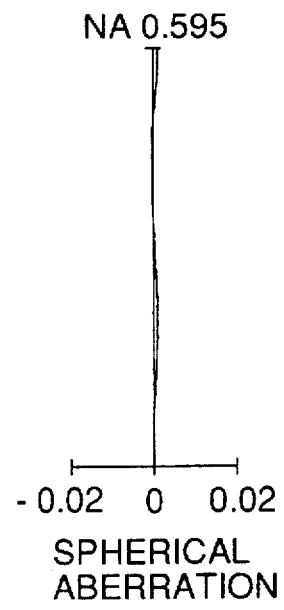
Figure 56:
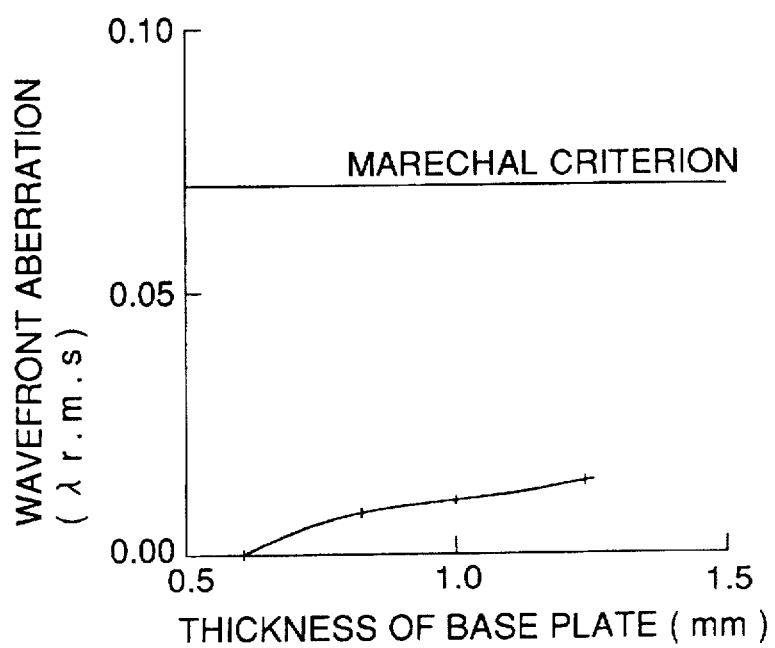
FIG. 56 is a graph showing the change of the wavefront aberration while the thickness of the transparent substrate is adjusted from 0.6 mm to 1.2 mm in Example 22.

The arrangement in Example 22 is shown in FIGS. 54(a) and 54(b), the spherical aberration is shown in FIGS. 55(a), 55(b) and 55(c), and a change of the wavefront aberration value according the movement is shown in FIG. 56. The aberration in FIGS. 55(a), 55(b) and 55(c) are the same as that in 43(a), 43(b) and 43(c).

$mc=0.833\Delta d=d2 -d1=-8.645$ mm $G=-1.14576$ NA1=0.600 NA2=0.596

EXAMPLE 23

1st position

| F1 = 7.1515624 |  | T = −8.092 |
|---|---|---|
| mt1 = −0.200 | mo1 = −0.100 | U = 30.377 |

2nd position

| F2 = 3.1178293 |  |  | T = −8.092 |  |
|---|---|---|---|---|
| mt2 = −0.320 | mo2 = −0.160 |  | U = 18.531 |  |
| i | ri | d1i | d2i | ni |
| 1 | −11.232 | 2.00 |  | 1.51455 |
| 2 | −5.828 | 15.00 | 2.74 |  |
| 3 | 2.080 | 3.10 |  | 1.49446 |
| 4 | −3.539 | 1.585 | 1.399 |  |
| 1 | ∞ | 0.60 | 1.20 | 1.58000 |
| 2 | ∞ |  |  |  |

Aspherical coefficient

3rd surface

|  |  |
|---|---|
| $k = -6.08630 \times 10^{-1}$ | |
| $A_1 = -4.27090 \times 10^{-4}$ | $P_1 = 4.0000$ |
| $A_2 = -1.49720 \times 10^{-4}$ | $P_2 = 6.0000$ |
| $A_3 = -1.04560 \times 10^{-6}$ | $P_3 = 8.0000$ |
| $A_4 = -4.67950 \times 10^{-7}$ | $P_4 = 10.0000$ |

4th surface

|  |  |
|---|---|
| $k = -1.36490 \times 10$ | |
| $A_1 = 3.72820 \times 10^{-3}$ | $P_1 = 4.0000$ |
| $A_2 = -2.85100 \times 10^{-4}$ | $P_2 = 6.0000$ |

-continued

| | |
|---|---|
| $A_3 = 1.49930 \times 10^{-5}$ | $P_3 = 8.0000$ |
| $A_4 = 1.89980 \times 10^{-9}$ | $P_4 = 10.0000$ |

Figure 57:
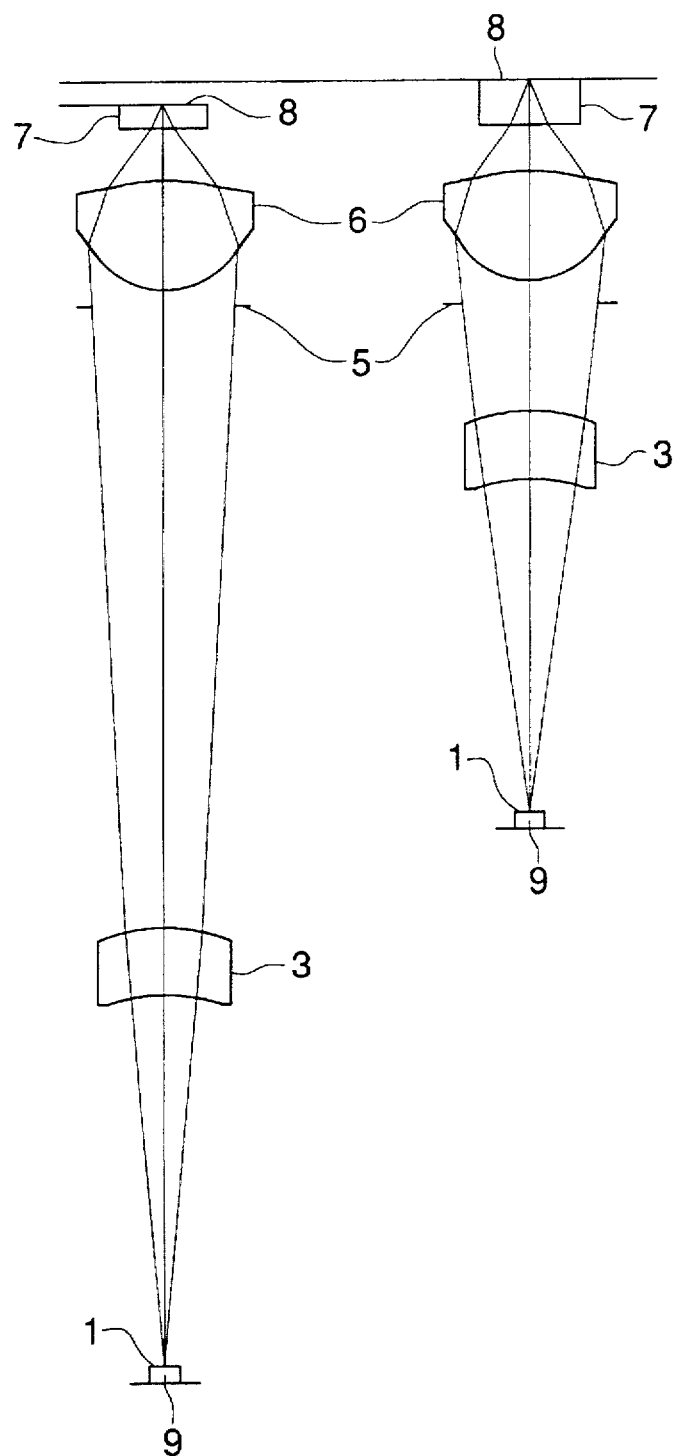
FIGS. 57(a) and 57(b) are views showing the optical path when the thickness of the transparent substrates is respectively 0.6 mm and 1.2 mm in Example 23 of the present invention.
Figures 58A, 58B, 58C:
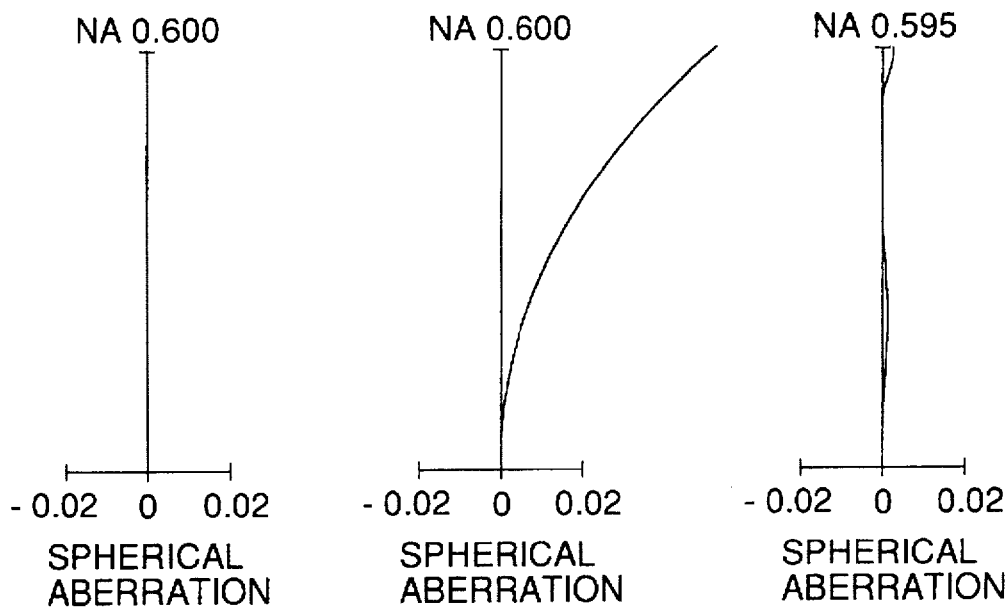
FIGS. 58(a), 58(b) and 58(c) are views showing the spherical aberration in the optical system in Example 23.
Figure 59:
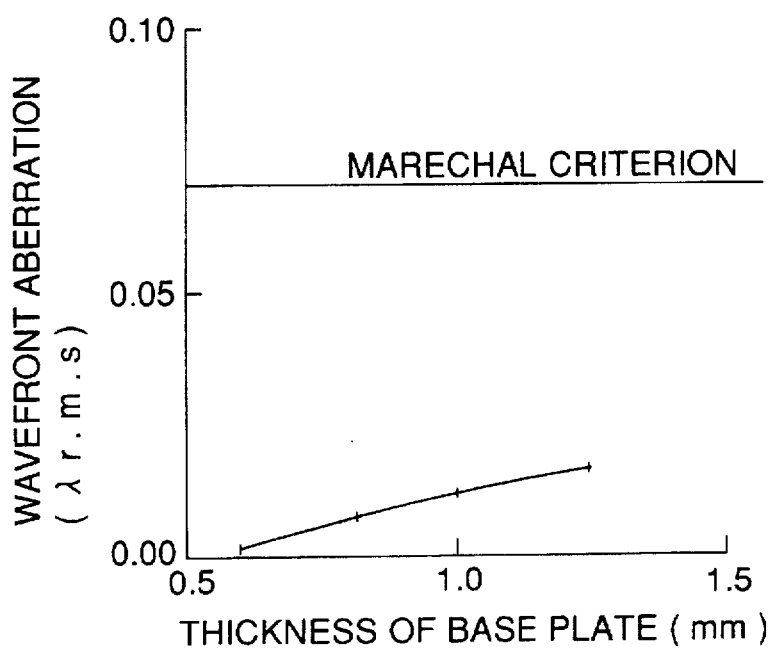
FIG. 59 is a graph showing a change of the wavefront aberration while the thickness of the transparent substrate is adjusted from 0.6 mm to 1.2 mm in Example 23.

The arrangement in Example 23 is shown in FIGS. 57(a) and 57(b), the spherical aberration is shown in FIGS. 58(a), 58(b) and 58(c), and a change of the wavefront aberration value according to the movement is shown in FIG. 59. The aberration in FIGS. 58(a), 58(b) and 58(c) are the same as that in 43(a), 43(b) and 43(c).

$mc=0.500\Delta d=d2-d1=-12.26$ mm $G=-1.15434 NA1=0.600 NA2=0.595$

EXAMPLE 24

1st position

| | | | |
|---|---|---|---|
| F1 = 3.9454953 | | | T = −6.924 |
| mt1 = −0.200 | mo1 = −0.100 | | U = 30.377 |

2nd position

| | | | |
|---|---|---|---|
| F2 = 3.1427760 | | | T = −6.924 |
| mt2 = −0.291 | mo2 = −0.204 | | U = 19.932 |
| i | ri | d1i | d2i | ni |
| 1 | −9.980 | 2.00 | | 1.51455 |
| 2 | −6.831 | 12.50 | 5.545 | |
| 3 | 2.580 | 2.60 | | 1.72623 |
| 4 | −10.323 | 1.844 | 1.663 | |
| 1 | ∞ | 0.60 | 1.20 | 1.58000 |
| 2 | ∞ | | | |

Aspherical coefficient

3rd surface

| | |
|---|---|
| $k = -7.75620 \times 10^{-1}$ | |
| $A_1 = 9.49130 \times 10^{-4}$ | $P_1 = 4.0000$ |
| $A_2 = 3.31790 \times 10^{-5}$ | $P_2 = 6.0000$ |
| $A_3 = 4.71180 \times 10^{-6}$ | $P_3 = 8.0000$ |
| $A_4 = 3.48490 \times 10^{-6}$ | $P_4 = 10.0000$ |

4th surface

| | |
|---|---|
| $k = -1.63440 \times 10$ | |
| $A_1 = 7.67570 \times 10^{-3}$ | $P_1 = 4.0000$ |
| $A_2 = -1.52800 \times 10^{-3}$ | $P_2 = 6.0000$ |
| $A_3 = 8.96720 \times 10^{-5}$ | $P_3 = 8.0000$ |
| $A_4 = 1.76040 \times 10^{-6}$ | $P_4 = 10.0000$ |

Figure 60:
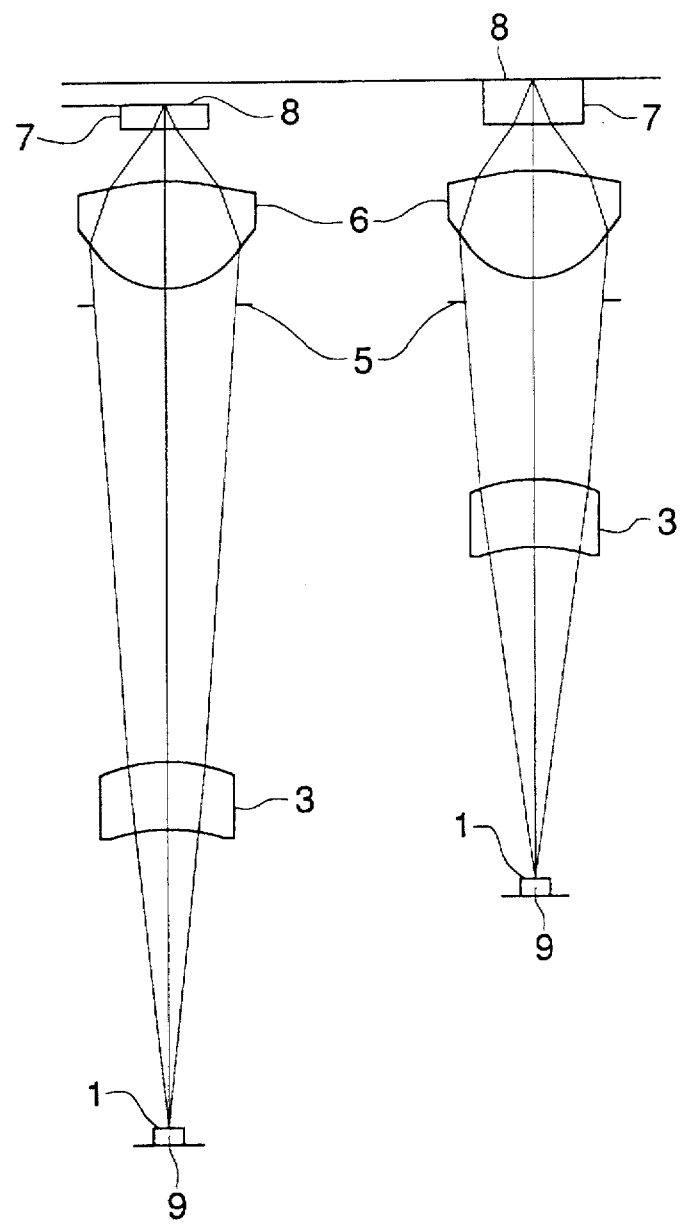
FIGS. 60(a) and 60(b) are views showing the optical path when the thickness of the transparent substrates is respectively 0.6 mm and 1.2 mm in Example 24 of the present invention.
Figure 61:
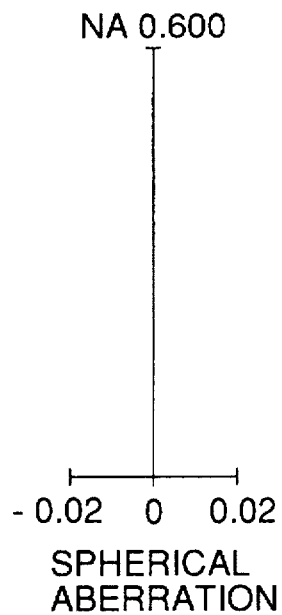
FIGS. 61(a), 61(b) and 61(c) are views showing the spherical aberration in the optical system in Example 24.
Figure 61:
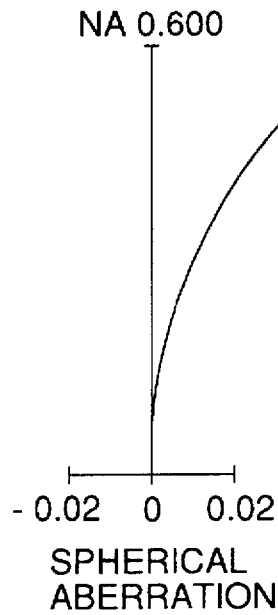
Figure 61:
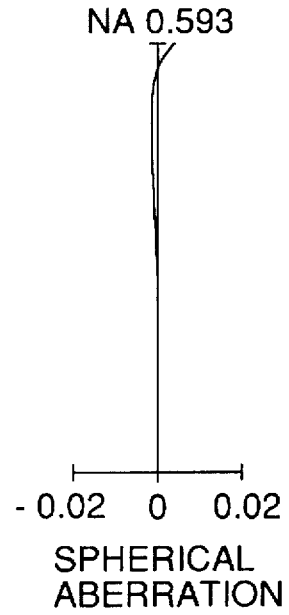
Figure 62:
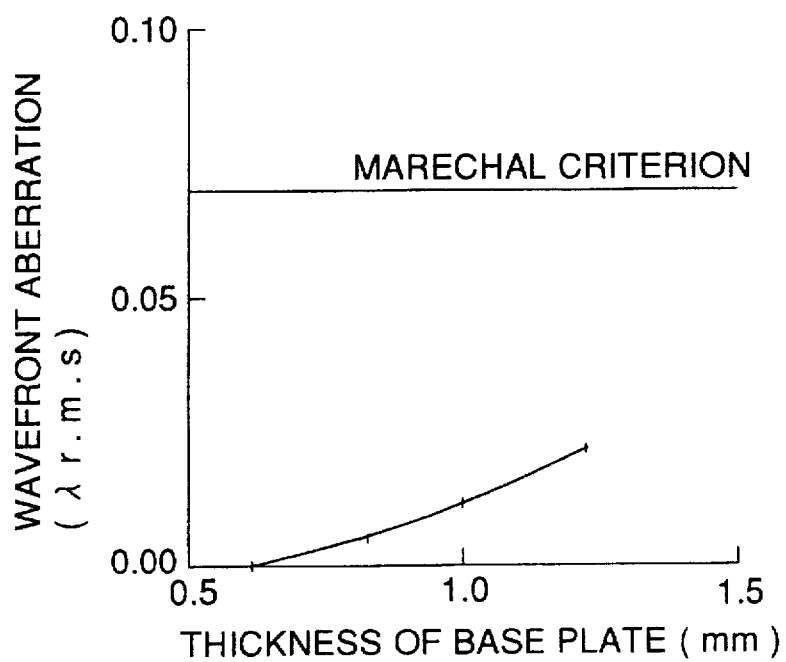
FIG. 62 is a graph showing a change of the wavefront aberration while the thickness of the transparent substrate is adjusted from 0.6 mm to 1.2 mm in Example 24.

The arrangement in Example 24 is shown in FIGS. 60(a) and 60(b), the spherical aberration is shown in FIGS. 61(a), 61(b) and 61(c), and a change of the wavefront aberration value according to the movement is shown in FIG. 62. The aberration in FIGS. 61(a), 61(b) and 61(c) are the same as that in 43(a), 43(b) and 43(c).

$mc=0.700\Delta d=d2-d1=-6.955$ mm $G=-1.14619 NA1=0.600 NA2=0.593$

3. Referring to FIGS. 64 to 82(b), Examples (25 to 36) according to embodiments to attain the second object of the present invention will be described below. Prior to explanation of examples, the shape of the information recording medium will be described below by taking the CD standard as an example, and also by referring to FIG. 63.

Figure 63:
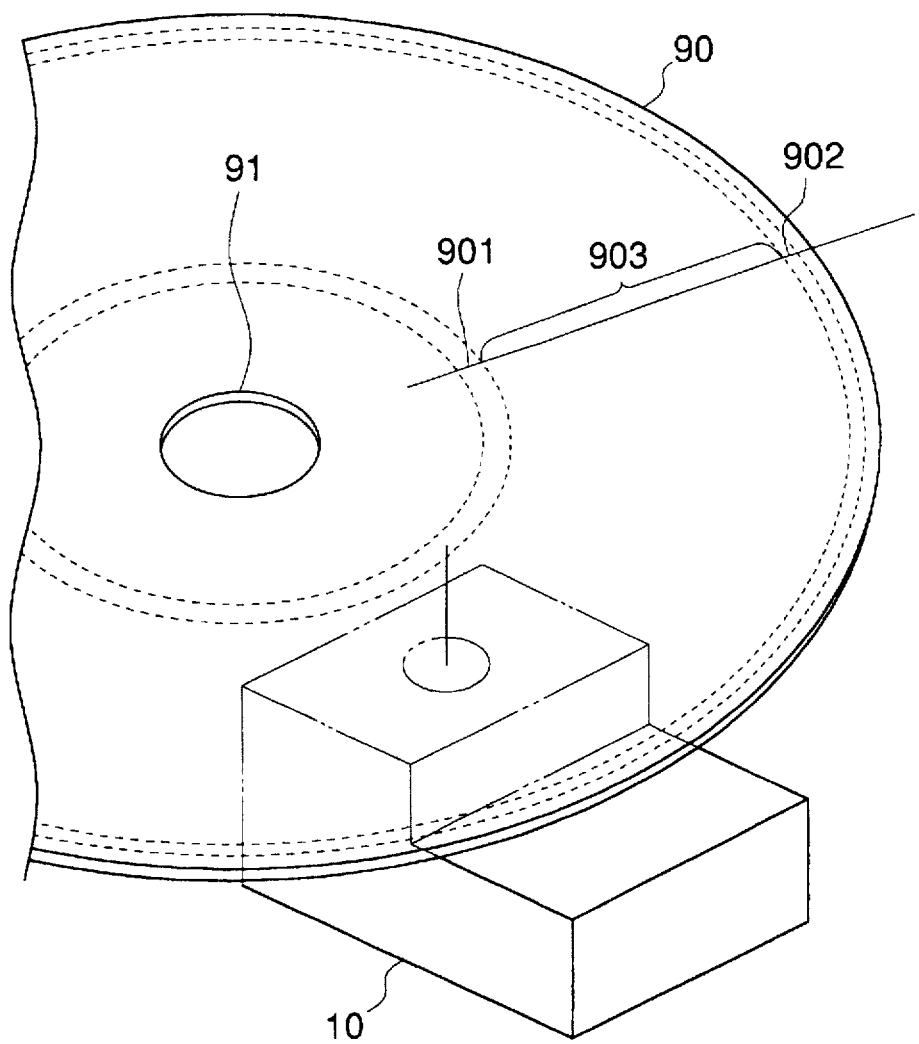
FIG. 63 is a view to explain the shape of the optical disk.

In FIG. 63, the thickness of the substrate of the optical disk (hereinafter referred to as the information recording medium) 90 is 1.2 mm, and its diameter is 120 mm. The disk has a hole of ϕ15 mm, (a center hole 91), in its center. An area of 26 to 33 mm diameter outside the hole 91 is the clamping area of a spindle motor. Regarding the information recording surface, a lead-in area 901 exists from the maximum diameter of 46 mm to the diameter of 50 mm, and a program area 903 continues from the diameter of 50 mm to the maximum diameter of 116 mm. A lead-out area 902 continues from 116 to 117 mm from the center. A table of contents (TOC) of the program area 903 is recorded in the lead-in area 901.

The optical pick-up apparatus 10 which reproduces information from the information recording medium 90, is held to be accessible in an area from a lead-in area 901 to a lead-out area 902 of the information recording medium 90 which is presumed at least to be reproduced, and is moved by a feed motor. Specifically, when high speed access is required, it is driven by a linear motor such as a voice coil motor, or the like.

When information is reproduced, initially, the optical pick-up apparatus 10 is moved to a position in which the lead-in area can be read; the objective lens is driven to carry out the focusing operation and the track-servo operation, and the TOC is read; and the optical pick-up apparatus 10 is then moved to a predetermined track according to the TOC information for program reproduction.

EXAMPLE 25

Figure 64:
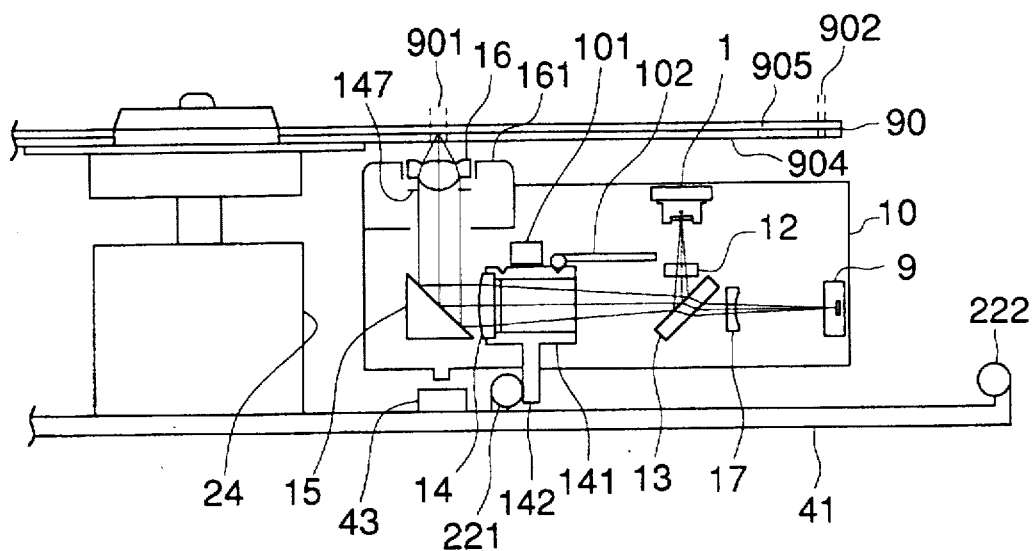
FIG. 64 is a view to explain the correction means in Example 25.

FIG. 64 shows the structure corresponding to the information recording medium 90 having a 0.6 mm thickness substrate 904.

In FIG. 64, the luminous flux emerging from the laser beam source 1 passes through the diffraction grating 12 and the beam splitter 13; it passes through the collimator lens 14 which is a luminous flux conversion lens, held by a lens frame 141, which is a correction means and moves in the direction of the optical axis, and becomes almost parallel luminous flux; and then, the optical path of the luminous flux is deflected by 90° by the mirror 15. The luminous flux is limited to a predetermined flux by the diaphragm 147 and then enters into the objective lens 16. The luminous flux, entered into the objective lens 16, is converged onto the information recording surface 905 through the substrate 904. The luminous flux modulated by the information pit and reflected from the information recording surface 905, returns to the beam splitter 13 through the objective lens 16, the mirror 15, and the collimator lens 14. Then, the luminous flux is separated from the optical path of the laser beam source 1, and enters into the light detector 9, which is a light beam receiving means, through the concave lens 17.

The light detector 9, which is a light beam receiving means, is composed of multi-divided PIN photodiodes, each element of which outputs a current proportional to the intensity of the luminous flux entered into the element. This current is fed to the detection circuit system, not shown in the drawing, and in this circuit system, an information signal, a focus error signal and a track error signal are generated. An objective lens driving means 161 structured by a magnetic circuit, coil, or the like, controls the objective lens 16 and diaphragm 147, which are integrally provided with each other, according to the focus error signal and the track error signal, and is structured so that the optical spot position is always positioned in the information track.

The optical pick-up apparatus 10 is supported by a guide shaft, not shown in the drawing, provided on the chassis 41, and is driven by a feed motor, not shown in the drawing, between a PIN position (for example, a position which is 20 mm remote from the center of the disk), at which the position of the optical axis of the objective lens 16 is located inside the lead-in area in the inner and outer peripheral direction of the information recording medium 90, and $P_{OUT}$ position (for example, a position which is 65 mm remote from the center of the information recording medium ), the position at which the optical axis of the objective lens 16 is located outside the lead-out area.

As the objective lens 16, a lens is used in which the aberration is corrected so that an excellent optical spot condition (the first optical spot condition) can be obtained corresponding to the 0.6 mm thickness substrate, when the parallel luminous flux enters into the objective lens 16. Accordingly, it is difficult to read the information recording medium of the 1.2 mm thickness substrate under this condition, because of increased aberration.

Figure 65:
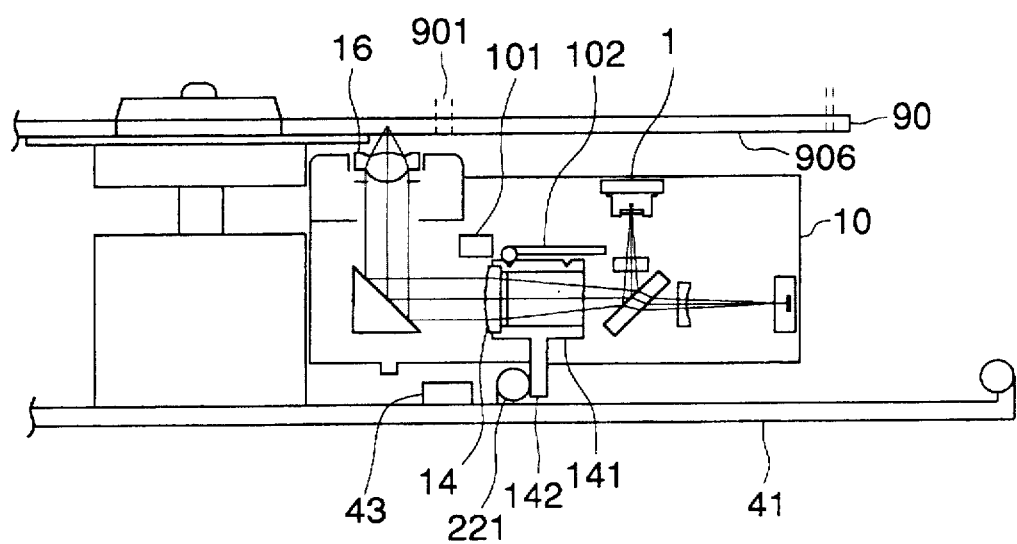
FIG. 65 is a view to explain the case where the optical pick-up is moved to $P_{IN}$ in Example 25.

In FIG. 65, when an information recording medium 90 having a 1.2 mm thickness substrate 906 is read, the optical pick-up apparatus 10 is moved by a feed motor in the inner peripheral direction of the information recording medium 90. When the position of the optical axis of the objective lens 16 is located almost inside of the lead-in area 901 (inside the innermost peripheral position in which the lead-in area can be read), an extension 142 integrally provided on the lens frame 141, contacts the first pin 221 fixed on the chassis 41. The optical pick-up apparatus main body is moved to a further remote $P_{IN}$ position, however, the lens frame 141 can not be moved at the position by interfering with the first pin 221. The lens frame 141 is moved to the position at which the frame has the first optical spot condition in the housing of the optical pick-up apparatus 10, and one end portion of the positioning spring 102 is engaged with the recessed portion provided in the lens frame 141. Then, the lens frame 141 is positioned in the optical pick-up apparatus 10 main body, and secured.

Although the spherical aberration moves to the "overcorrected"-range when the thickness of the substrate 904 is increased, the divergent light is entered into the objective lens 16 when the collimator lens 14 is moved to the laser beam source 1 side, and the "under"-spherical aberration is generated by the objective lens 16, so that the "overcorrected"-spherical aberration is canceled out. Accordingly, an excellent optical spot condition (the second optical spot condition) can be obtained through the 1.2 mm thickness substrate.

Figure 66:
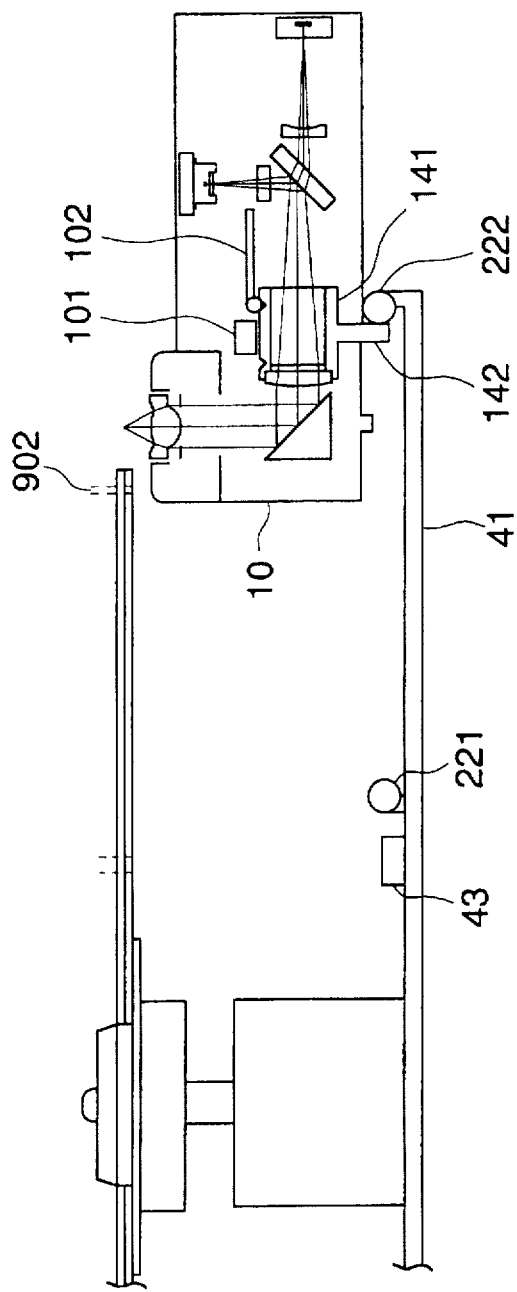
FIG. 66 is a view to explain the case where the optical pick-up is moved to $P_{OUT}$ in Example 25.

In FIG. 66, when the optical system is returned to the first optical spot condition corresponding to the 0.6 mm thickness information recording medium, the optical pick-up apparatus 10 is moved to $P_{OUT}$ position in the outer peripheral direction, in which the position of the optical axis of the objective lens 16 is forwarded over the lead-out area 902 (over the outermost peripheral position in which the lead-out area can be read), by the feed motor, not shown in the drawing. The extension 142 provided on the lens frame 141 interferes with the second pin 222 fixed on the chassis 41, and from this position, only the optical pick-up apparatus 10 main body is moved. The lens frame 141 is moved to the position in which the optical system is again on the first optical spot condition, and the end portion of the positioning spring 102 is engaged with the other recessed portion provided in the lens frame 141, so that the lens frame 141 is positioned and secured in the optical pick-up apparatus 10 main body.

In this example, the reproduction of the 0.6 mm thickness substrate information recording medium in a plurality of information recording medium types which can be read by the disk apparatus, is the first priority. Initially, loading of the information recording medium 90 is started, and the first condition and the second condition are detected by a reflection type photosensor 101, which is a correction condition detection means, depending on whether the lens frame 141 is located at a predetermined position (the position of the first optical spot condition) in the optical pick-up main body. A CPU, or the like, in the information recording medium apparatus judges whether the position of the lens frame 141 to be detected is located at the position corresponding to the first optical spot condition, or not. When the lens frame 141 is not located at this position, the optical pick-up apparatus 10 is moved outward to $P_{OUT}$, and the collimator lens is moved to the position on the first optical spot condition. Then, the optical pick-up apparatus 10 is moved inward, and the reflection type photosensor 43, which is a read-in position detection means, detects the extension provided from the lower surface of the optical pick-up main body. By this detection signal, the optical pick-up apparatus 10 is positioned so that the lead-in area 901 can be read, and the focus-search operation is carried out.

When it is judged that the thickness of the information recording medium is not 0.6 mm, but 1.2 mm, the optical pick-up apparatus is moved at once so that the optical axis of the objective lens 16 is located at the $P_{IN}$ position on the inner periphery side, and the collimator lens is moved to a position on the second optical spot condition in the optical pick-up apparatus 10 main body.

As described above, in this example, the correction means in the optical pick-up apparatus can be driven using the driving force of the feed motor of the optical pick-up apparatus 10, and it is not necessary to provide an additional driving means such as a motor, or the like, to drive the correction means in the optical pick-up apparatus, resulting in a smaller size, lighter weight, and lower cost.

EXAMPLE 26

In this example, the correction means is driven only when the optical system is moved outward so that the position of the optical axis of the objective lens is located outside the lead-out area 902. A push switch type mechanism, to control the movement of the correction means, is accommodated in the optical pick-up apparatus 10.

Figure 67:
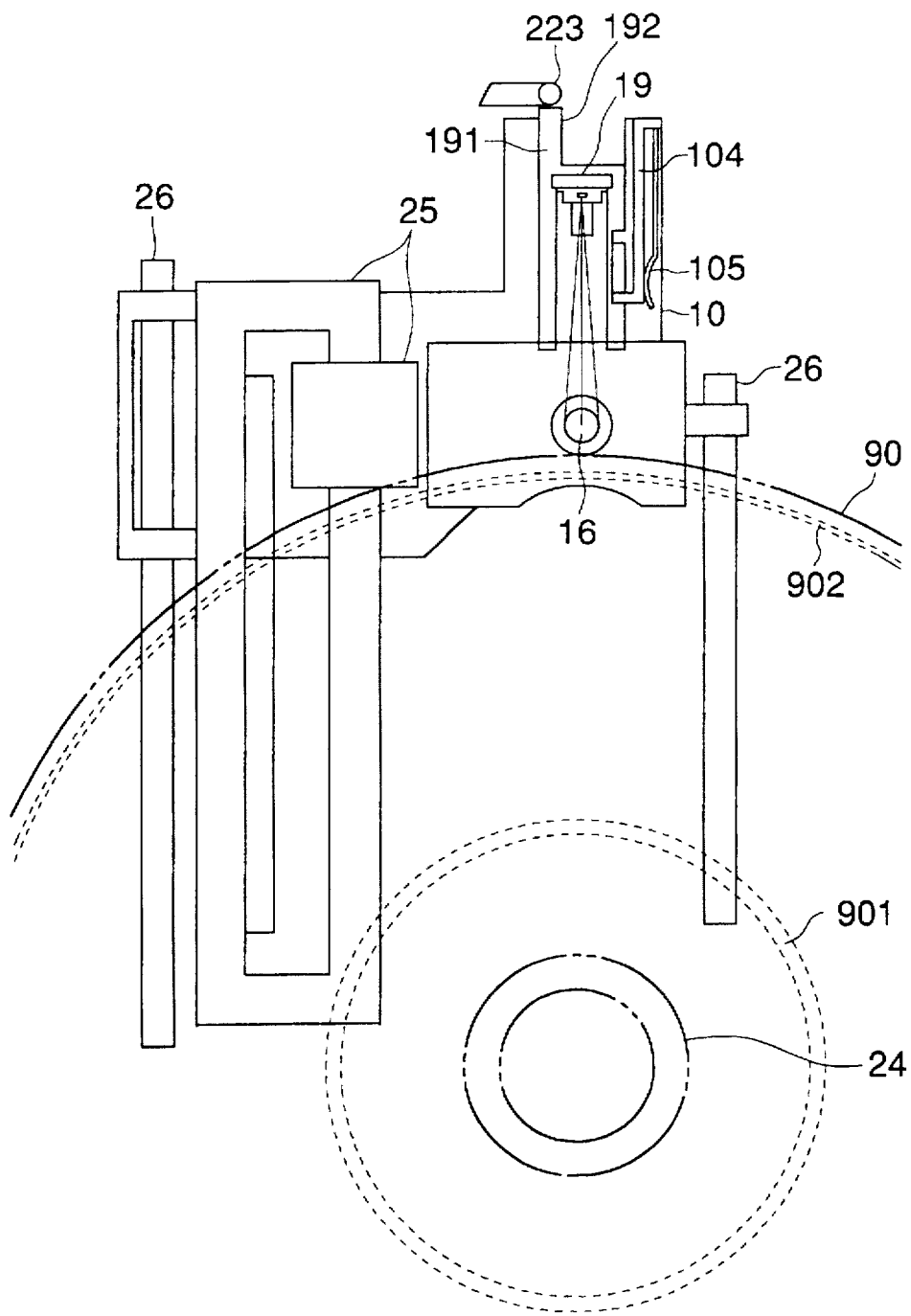
FIG. 67 is a view to explain the correction means in Example 26.

In FIG. 67, a laser unit 19 (a hologram laser unit), which is a correction means and with which the light detector, beam splitter, semiconductor laser are integrated, is held in a slide frame 191 which can slide in the emerging direction of the laser light, and is accommodated in a housing of the optical pick-up apparatus 10.

When this slide frame 191 slides, the distance between the position of the laser beam source and the objective lens 16 is changed, and the divergent degree of the luminous flux entering into the objective lens 16 is also changed. Thereby, the aberration of the optical spot can be corrected in the same way as in Example 25 described before.

The optical pick-up apparatus 10 is supported by 2 guide shafts 26, and is driven by the linear motor 25 in the direction of inner and outer periphery of the information recording medium 90.

When the optical pick-up apparatus 10 is moved to the $P_{OUT}$ position at which the optical axis of the objective lens is located outside the lead-out area 902, an extension 192 of the trailing end of the slide frame 191 interferes with an extension 223 provided on the chassis, and the slide frame 191 is pushed into the inner part of the housing. The slide frame 191 is held and positioned by a holding pin 104, and is located at a predetermined laser position on the optical spot condition corresponding to a 1.2 mm thickness substrate. When the optical pick-up apparatus 10 is moved again to the $P_{OUT}$ position at which the optical axis of the objective lens is located outside the lead-out area 902, the slide frame 191 is pushed again into the inner part of the housing, and the holding pin 104 is disengaged, so that the sliding frame 191 is located at the laser position on the optical spot condition corresponding to 0.6 mm thickness substrate.

Figure 68:
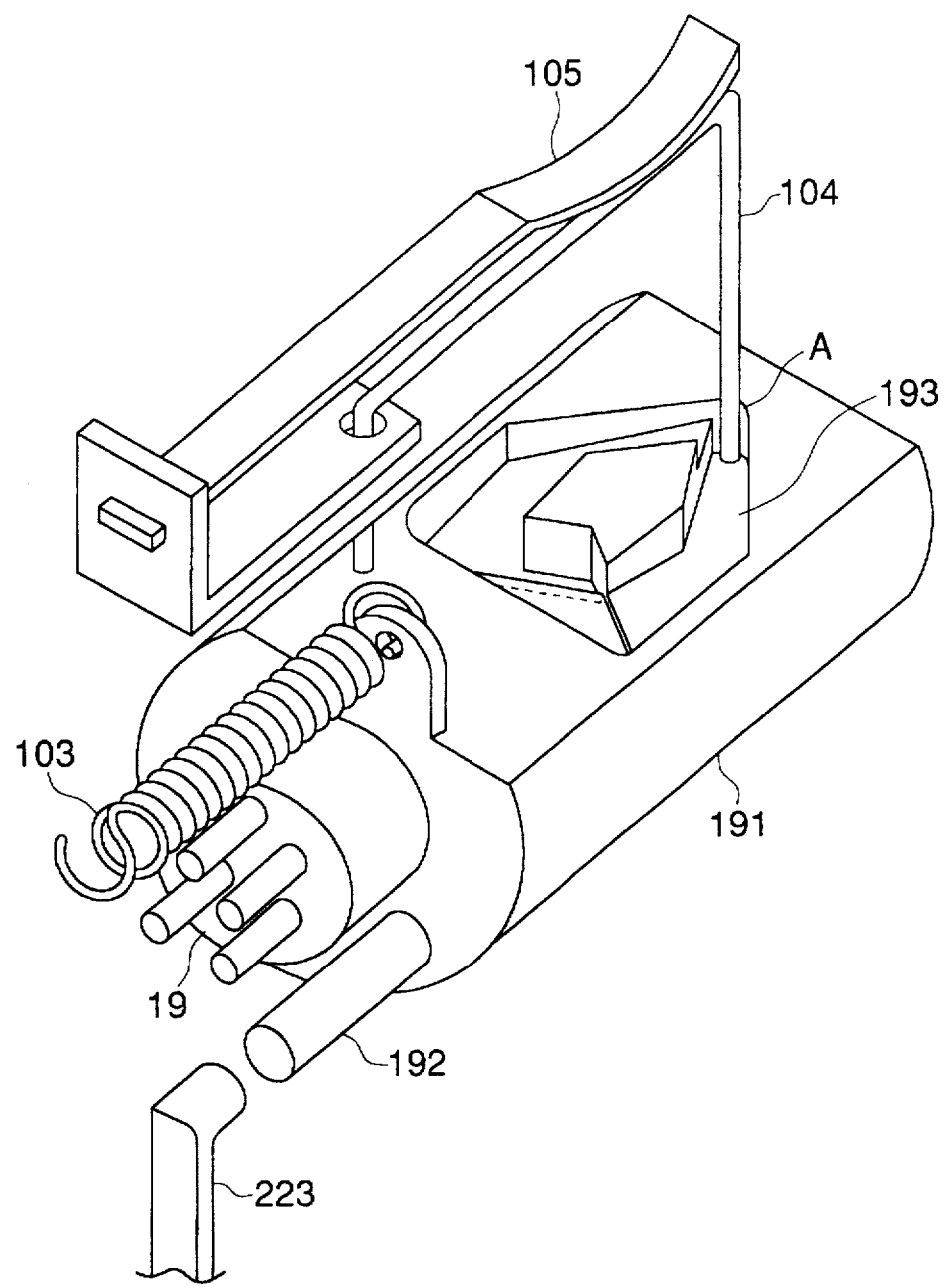
FIG. 68 is a view to explain a correction mechanism in Example 26.
Figure 69:
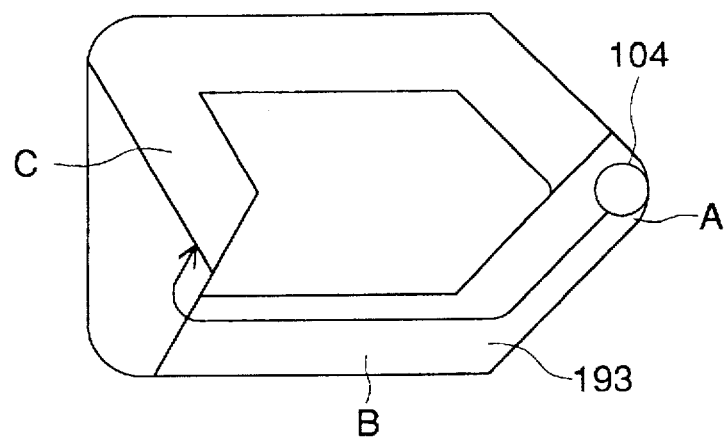
FIGS. 69(a) and 69(b) are views to explain correction mechanisms in Example 26.
Figure 69:
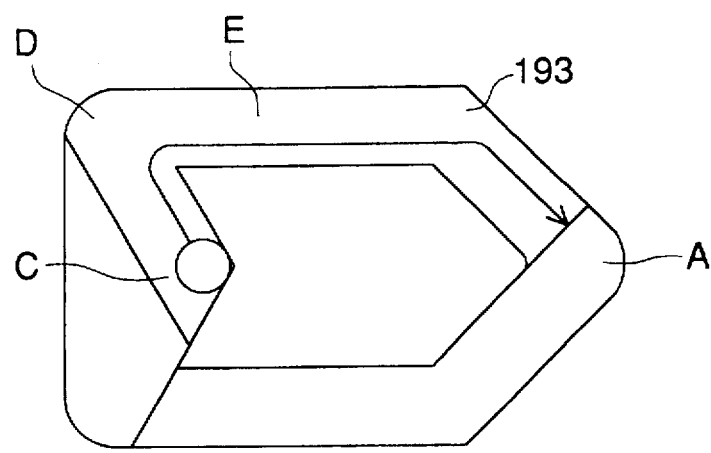

Referring to FIGS. 68, 69(a) and 69(b), this mechanism will be detailed below. In FIG. 68, one end of the holding pin 104 is pressed by the spring 105 on a pin guide 193 integrally formed with the slide frame 191. The slide frame 191 is pulled toward the lower left direction in the drawing by the spring 103, and is positioned in the housing of the optical pick-up apparatus under the condition that the tip of the holding pin is in contact with a portion A. When the optical pick-up apparatus is moved until the position of the optical axis of the objective lens is located at the $P_{OUT}$ position, since a extension 192 is integrally formed with the slide frame 191, this extension 192 is pushed by a extension 223 provided on the chassis, the tip of the holding pin 104 passes through a portion B of the pin guide 193, and falls into a portion C (refer to FIGS. 69(a) and 69(b)). The distance between the portion A and the portion B is a variable amount for mounting of the slide frame 191.

When the optical pick-up apparatus is moved again until the position of the optical axis of the objective lens is located at the $P_{OUT}$ position, under the condition that the holding pin 104 has fallen into the portion C, the extension 192 is pushed and the tip of the holding pin 104 is pushed to the portion D of the pin guide 193. The tip of the holding pin 104 can be moved only in the direction of the portion E of the pin guide 193. When the force to push the protrusion 192 is released, the slide frame 191 is pulled back by the spring 103, and is retreated until the tip of the holding pin 104 falls into the portion A of the pin guide 193. As described above, 2 correction conditions respectively corresponding to 0.6 mm thickness and 1.2 mm thickness can be reciprocally set each time when the optical pick-up apparatus 10 is moved to the $P_{OUT}$ position. As in this example, when the switching method by which the correction condition is switched outside the lead-out area 902, is adopted, a large diameter and large torque spindle motor can be used as the spindle motor 24 to rotate the information recording medium 90, resulting in obtaining of stable information.

Although the correction means is driven by the movement of the optical pick-up apparatus to the $P_{OUT}$ position in this example, it may also be structured so that the correction means is driven by the movement to the $P_{IN}$ position.

EXAMPLE 27

Three correction conditions of the optical spot are adopted in this example. The optical spot is corrected when the luminous flux conversion lens, constituting the correction means located in the optical path from the laser beam source to the objective lens is moved, and the correction means are located at 3 positions in the direction of the optical axis, so that the optical system functions with the information recording medium substrate thickness of, for example, 1.2 mm, 0.8 mm, and 0.6 mm.

Figure 70:
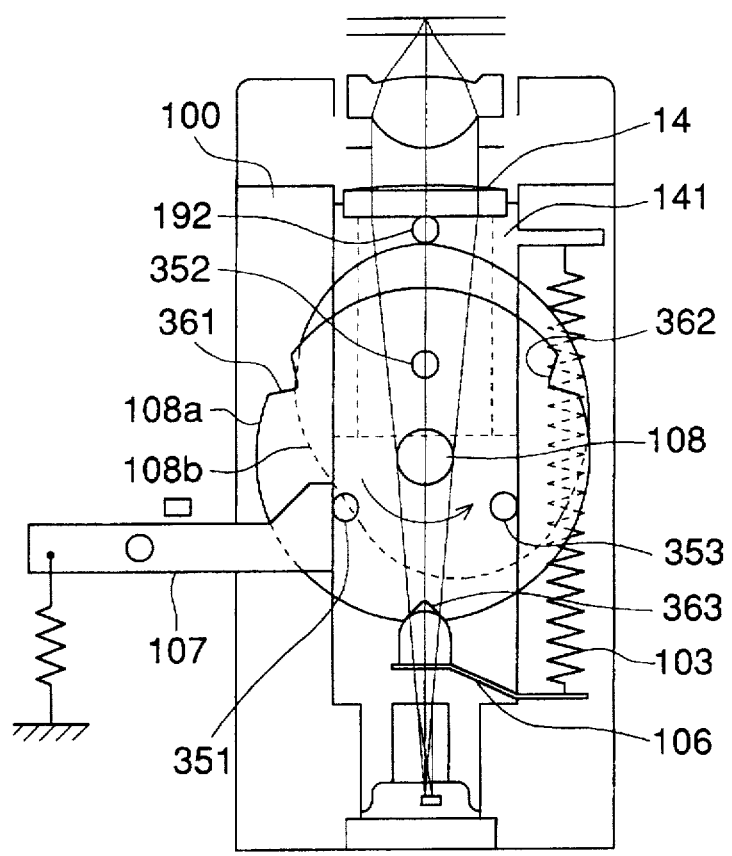
FIG. 70 is a view to explain a correction mechanism in Example 27.

In FIG. 70, the collimator lens 14, which is a luminous flux conversion lens, is held by the lens frame 141 incorporating the extension 192. The collimator lens is slidably mounted on a frame guide provided in the housing 100 of the optical pick-up apparatus 10, and is pulled downward by the spring 103 and is held at the position in which the extension 192 comes into contact with a cam plate 108b. The cam plate 108b on a rotation axis 108 integrally with a rotation plate 108a. Three pins 351, 352, 353, and three cutouts 361, 362 and 363 are provided on the rotation plate 108a, and the direction of the rotation of the rotation plate 108a is restricted and held by a holding spring 106.

When the correction condition is switched, the following operations are carried out: the optical pick-up apparatus 10 is driven to the inside of the position at which the position of the optical axis of the objective lens exceeds the lead-in area 901; a pin 351 is pressed by the extension 107 provided on the chassis; and the cam plate 108b is rotated to the position at which the cutout 361 is engaged by the holding spring 106. The lens frame 141 is lowered by the spring 103 and held by the rotation of the cam plate 108b. When this operation is repeated, the lens position is respectively set at 3 positions in the direction of the optical axis. In this connection, the extension 107 is structured as follows. The extension 107 is pivotally supported on the chassis so that it can be rotated, and when the optical pick-up apparatus 10 returns to the lead-in area, it can not interfere with the pin B.

When a method to switch the correction means inside the lead-in area 901 is adopted, the necessary amount of movement required for driving the correction means, after the discrimination of the type of information recording medium 90 in the read-in portion, is shorter, and the time required for starting the reproduction is also shorter.

EXAMPLE 28

Figure 71:
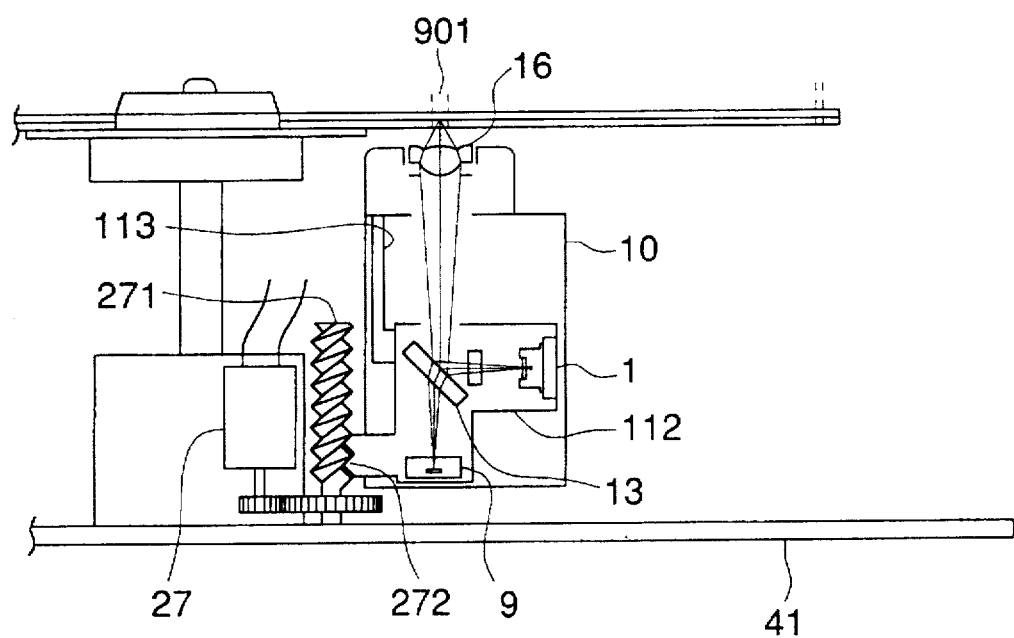
FIG. 71 is a view to explain a correction mechanism in Example 28.

In FIG. 71, the laser beam source 1, the beam splitter 13, and the light detector 9 are held in an integrally formed frame 112 which can move in the direction of the optical axis, and constitute the correction means. A portion 272 of a worm wheel is formed in the frame 112. A holding member 113 is provided in the housing of the optical pick-up apparatus 10, and holds the frame 112 in the movement direction by friction. The portion 272 of the worm wheel is engaged with a worm 271 driven by the motor 27 mounted on the chassis 41, at such a position that the optical pick-up apparatus 10 can read the lead-in area 901. When the frame 112 is moved in the direction of the optical axis of the objective lens 16, the correction of the optical spot can be carried out.

When the lead-in area 901 is read at the position of the laser beam source 1 corresponding to the optical spot condition appropriate for reading a predetermined information recording medium, and it is judged that the disk is not an acceptable predetermined disk, then, the worm 271 is rotated by the motor 27, the frame 112 is driven, and the position of the laser beam source 11 is correspondingly moved.

The movement of the position of the laser beam source 1 can be carried out at least under the condition that the focus-servo operation is ON, the frame 112 can be continuously moved and can hold components. When the frame 112 is driven by the motor during the reading process, the position of the laser beam source 1 can be set so that the quality of the information signal to be read and the track error signal becomes best.

When writing onto the information recording medium is carried out, it is preferable that the frame is driven during test-writing so that the optical spot condition, under which the optical spot condition for writing is optimum, is obtained, and the laser beam source is set at the position in which the emergent light beam power required for writing is at a minimum.

EXAMPLE 29

Figure 72:
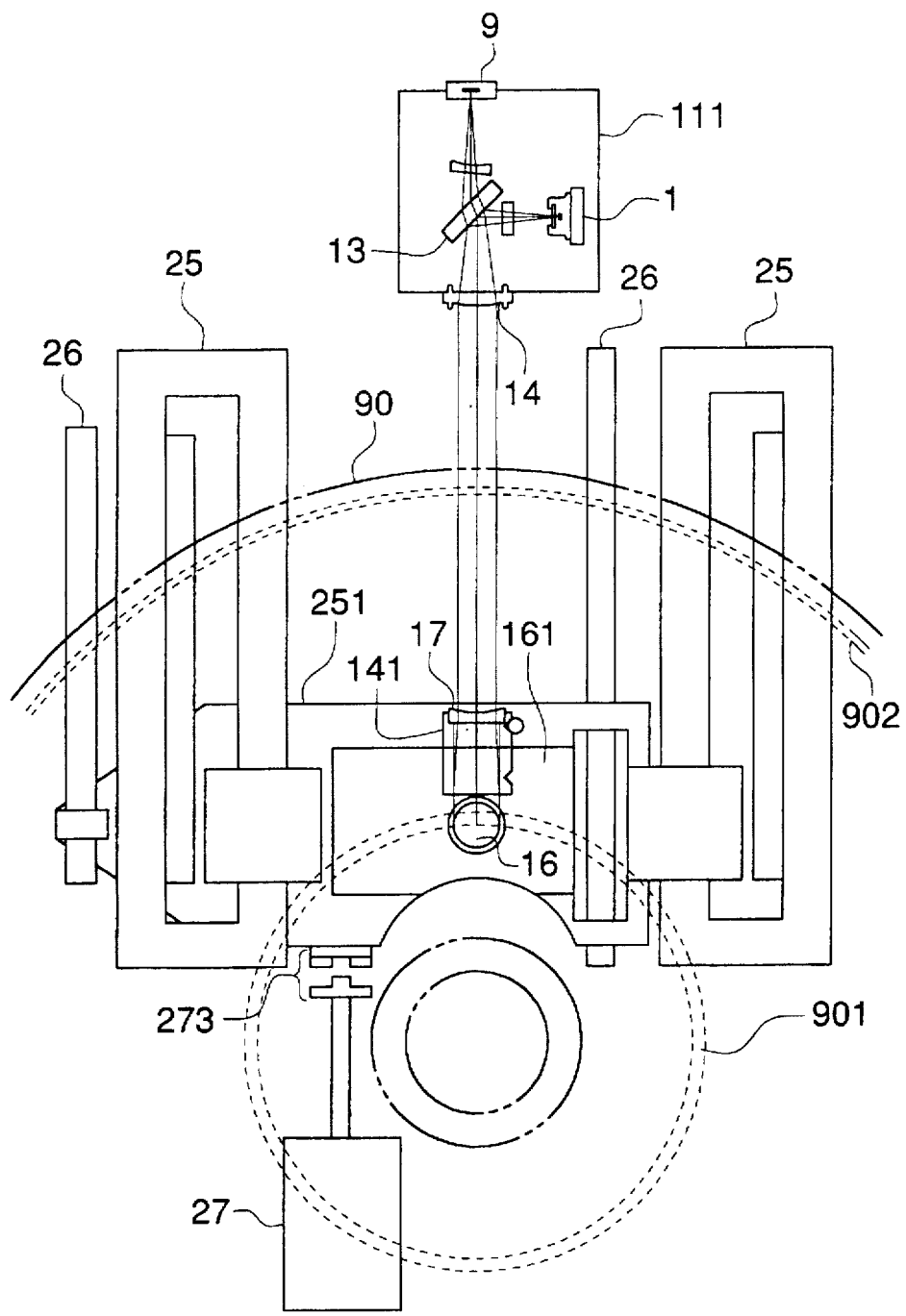
FIG. 72 is a view to explain a correction means in Example 29.

FIG. 72 shows an example of a separate optical system method in which the objective lens 16, the objective lens drive means 161, a mirror to guide the laser beam to the objective lens, and the correction lens 17 are mounted on a movable carriage 251 when the information recording medium 90 is given access in the direction of the inner and outer periphery, and the laser beam source 1, beam splitter 13, collimator lens 14, light detector 9, etc., are fixed on the chassis as a fixed optical system 111.

The carriage 251 is supported by 2 guide shafts 26, and driven by 2 linear motors at high speed. When this separate optical system is used, the weight of the movable portion is decreased, and the average access time, for example, can be reduced to less than 100 ms. The correction means to cope with the difference of the thickness of the information recording medium 90, is composed of a correction lens 17 (concave lens), and when this correction lens is moved in the direction of the optical axis, an apparent position of the light beam source of the luminous flux entering into the objective lens 16 is shifted and the aberration of the optical spot is corrected. The motor 27, which is the driving means for the correction means, is mounted on the chassis, and moves the carriage 251 to the lead-in area 901 or inside the lead-in area, and moves the correction lens 17 by the engagement of a clutch 273. The power transmission mechanism from the clutch 273 to the lens frame 141 can be composed of widely known mechanical elements such as a belt, or the like. Alternatively, as described in the Examples above, the correction means may be driven by the movement of the optical components which exceeds the lead-in area or the lead-out area of the information recording medium 90, without using the motor 27.

In the drive of the movable portions which are accessible at high speed , it is necessary to set a broader control range, and it is essential that no high-order resonance, pitching, rolling, or yawing is generated in several kHz range. When the above pitching, etc., is generated when the center of gravity, in the plane perpendicular to the direction of movement, does not coincide with the generation point of the driving force of the linear motor 25. Therefore, it is desirable that 2 linear motors 25 are used, and located so that the generation points of their driving force are symmetrical with respect to the center of gravity, and the center of gravity of the correction means is not moved in the plane perpendicular to the direction of movement even during correction.

In this example, although the condition of the optical spot is corrected by moving the correction lens 17 constituting the correction means in the direction of the optical axis, it may also be structured by insertion and removal of a concave lens into the luminous flux entering into the objective lens 16; insertion and removal of the parallel planes in the convergent luminous flux forwarding from the objective lens 16 to the information recording medium 90; and a change of the diaphragm diameter for the luminous flux forwarding the objective lens 16. At this time, it is also necessary that the correction means is arranged in the direction in which the center of gravity of the movable portion is not moved.

EXAMPLE 30

Although the correction methods in the above Examples are carried out by correction of the movement of the lens and the laser beam source in the direction of the optical axis, the correction means may also be structured as follows.

Figure 73:
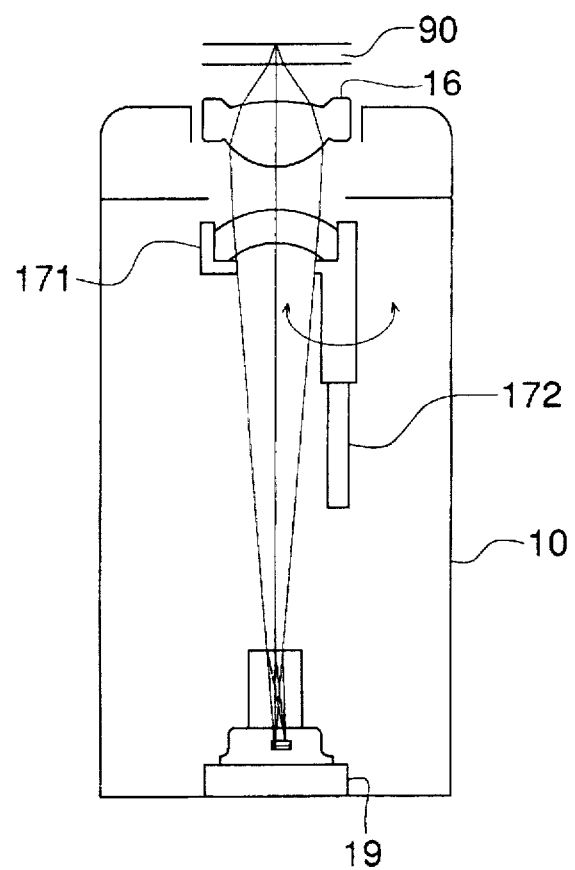
FIG. 73 is a view to explain a correction means in Example 30.

In FIG. 73, the correction lens, which is a correction means, is inserted into and removed from the optical path from the laser beam source (a hologram laser unit 19 in this example) to the objective lens 16. This correction lens is provided to correct any aberration due to the difference of the substrate thickness of the information recording medium 90. In cases where the information recording medium 90 having a thicker substrate (for example, 1.2 mm) is read by the objective lens corresponding to the thinner substrate (for example, 0.6 mm) in this example, a lens having the concave lens function is inserted into the optical path. When the information recording medium 90 having the thinner substrate (for example, 0.6 mm) is read by the objective lens corresponding to the thicker substrate (for example, 1.2 mm), a lens having the convex lens function is inserted into the optical path.

This lens is held by a rotating frame 171 which can be rotated around the rotation shaft 172, and the lens is inserted into and removed from the optical path by rotating the rotating frame 171. The rotation shaft 172 rotates perpendicular to the direction in which the optical pick-up apparatus 10 is moved by the feed motor in the direction of the inner and outer periphery of the information recording medium 90, and thereby, jolting generated when the optical pick-up is driven by the feed motor, is reduced. Thereby, the following disadvantages in which the optical axis entering into the objective lens is shifted due to this jolting; the position of the optical spot is also shifted; and specifically, the tracking becomes unstable.

EXAMPLE 31

Figure 74:
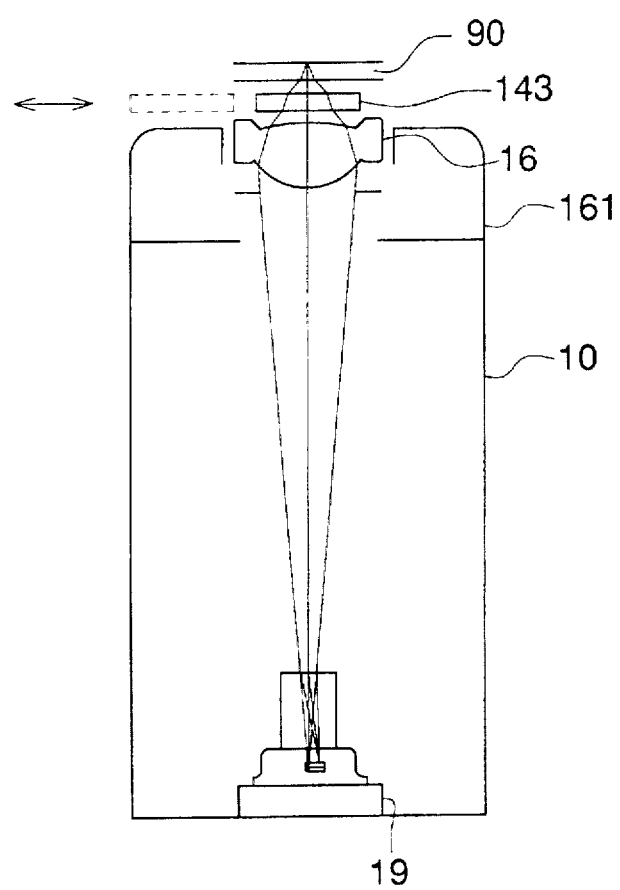
FIG. 74 is a view to explain a correction means in Example 31.
Figure 75:
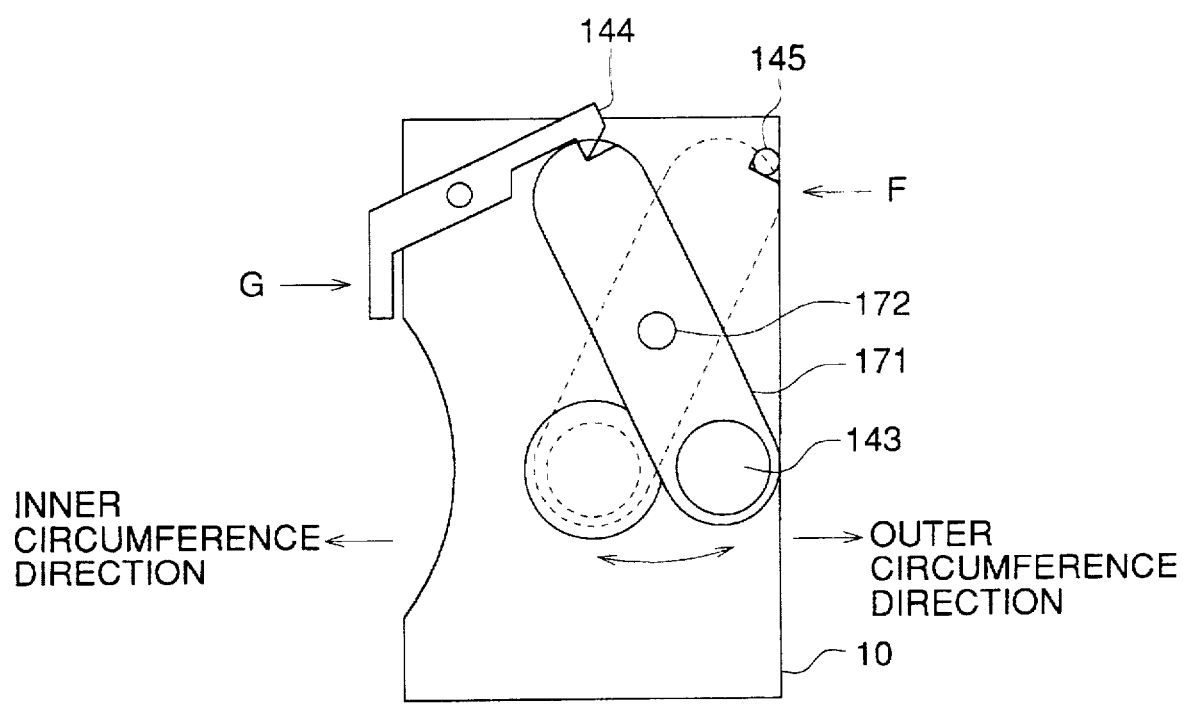
FIG. 75 is a view to explain a correction mechanism in Example 31.

In FIG. 74, the parallel planes 143, which are a correction means, are inserted into and removed from the convergent luminous flux entering from the objective lens 16 to the information recording medium 90. For the objective lens 16, a lens, the aberration of which is corrected with respect to the 1.2 mm thickness substrate, is used, for example, when the information recording medium formed of 0.6 mm thickness substrate is reproduced, a 0.6 mm thickness parallel plane 143, corresponding to the difference of the thickness, is inserted. Although the optimum thickness of the parallel plane is a little different depending on the refractive index, the refractive index of generally used parallel plane is about 1.52, and is almost the same as that of the disk substrate. Accordingly, the thickness of the plane to be inserted may be equal to only the difference of the thickness. In FIG. 75, a parallel plane insertion and removal mechanism is provided on the upper surface of the objective lens driving means 161. FIG. 75 is a drawing viewed from the information recording medium 90 side. The parallel plane 143 is held by a rotation frame 171 which can be rotated around the shaft 172, and the rotational direction of the rotation frame is restricted by a hook 144, and the rotation frame is held by the hook.

When the optical pick-up apparatus 10 is moved inside the lead-in area and the G portion is pushed by an extension on the chassis, not shown in the drawing, the hook 144 is disengaged. Then, the rotation frame 171 is rotated around the shaft 172 by the spring, not shown in the drawing, and comes into contact with the fixing pin 145. Thereby, the parallel plane 143 stops on the upper surface of the objective lens 16 (shown by a dotted line in the drawing). The optical pick-up apparatus 10 is moved outside the lead-out area in the direction of the outer periphery, and an F portion is pushed by the second extension on the chassis, not shown in the drawing, thereby, the rotation frame 17 is rotated. When the rotation frame 171 is engaged again by the hook 144, the parallel plane 143 is held at a position out of the optical path.

EXAMPLE 32

Figure 76:
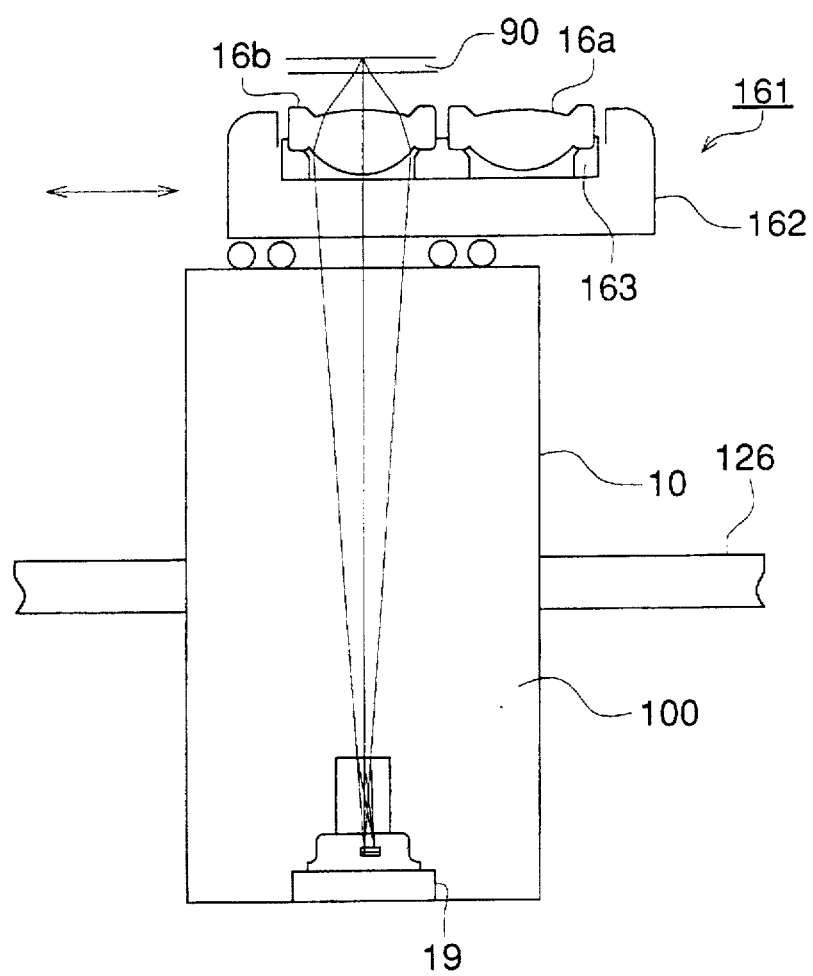
FIG. 76 is a view to explain a correction means in Example 32.

In FIG. 76, an objective lens driving means 161, by which a plurality of objective lenses constituting the correction means are integrally driven, is used, and when the objective lens driving means 161 is moved in the direction perpendicular to the optical axis of the objective lens with respect to the housing 100 of the optical pick-up apparatus 10 having the laser beam source (in this example, the hologram laser unit 19), corresponding to the type of the information recording medium 90, one of the plurality of objective lenses is selected.

The objective lens driving means 161 is composed of: a fixing portion 162 having a magnetic circuit composed of a magnet, a yoke, etc.; a movable portion 163 on which a focusing coil and a tracking coil are mounted; the first objective lens 16a and the second objective lens 16b which are adhered and fixed onto the movable portion 163; and a wire to movably support the fixing portion 162 and the movable portion 163 in the focusing direction and the tracking direction, or the like.

The aberration of the first objective lens 16a is minimized under the condition of 1.2 mm substrate thickness when the parallel luminous flux enters into the objective lens, and the aberration of the second objective lens 16b is also minimized under the condition of 0.6 mm substrate thickness.

The hologram laser unit 19 integrally provided with the laser beam source, the beam splitter, and the light detector, is fixed in the main body housing 100 of the optical pick-up apparatus 10. The housing 100 is supported on the chassis by the movable guide member 126 in the direction of the inner and outer periphery of the information recording medium 90, and is driven by the feed motor.

The objective lens driving means 161 is movably held on the housing 100 in the direction perpendicular to the optical axis of the objective lens, and can move at least within the distance between 2 objective lenses. Any moving method, such as parallel movement, or rotation, may be adopted, and actually, any method by which 2 objective lenses are respectively positioned on the optical axis of the laser, may be acceptable.

When an object to be read, at a predetermined priority, by the information recording medium apparatus is an information recording medium having 0.6 mm substrate thickness, the optical pick-up apparatus 10 is driven outside the lead-out area in the direction of the outer periphery by the feed motor concurrently with the information recording medium 90 loading; the objective lens driving means 161 is pushed by the extension provided on the chassis, and is moved with respect to the housing 100 of the optical pick-up apparatus 10; and the second objective lens 16b is positioned on the optical axis of the laser.

After that, the optical pick-up apparatus 10 is moved into the lead-in area by the feed motor, and tries to read. When the information recording medium 90 is not a predetermined 0.6 mm thickness substrate, the optical pick-up apparatus 10 is moved at once to the inner periphery inside the lead-in area by the feed motor; the objective lens driving means 161 is pushed by another extension on the chassis and is moved with respect to the housing 100 of the optical pick-up apparatus 10; and the first objective lens 16a is positioned on the optical axis of the laser. After that, the optical pick-up apparatus 10 is returned to the lead-in area by the feed motor, and tries to read again.

EXAMPLE 33

This example is structured as follows. The same objective lens drive means 161 and housing 100 of the optical pick-up apparatus 10 as these in Example 32 are used. In Example 32, the housing 100 is guided by the guide member 126 which supports the optical pick-up apparatus movably in the direction of the inner and outer periphery of the information recording medium 90 on the chassis, but this is replaced by a method in which the objective lens drive means 161 is guided by the guide member 126 in this example.

Figure 77:
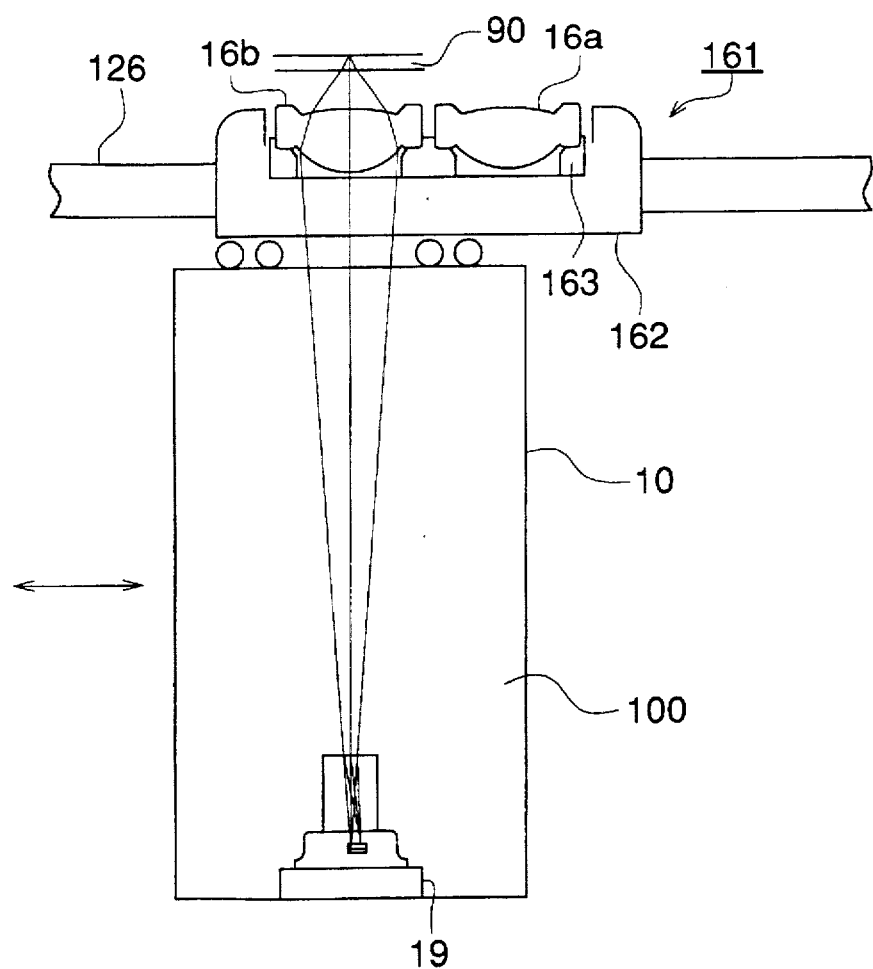
FIG. 77 is a view to explain a correction means in Example 33.

In FIG. 77, the fixing portion 162 of the objective lens driving means 161 is supported by the guide member 126 on the chassis so that it can be moved in the direction of the inner and outer periphery of the information recording medium 90, and is driven by the feed motor. The housing 100 having the hologram laser unit 19 is held below the objective lens driving means 161 so that it can move in the arrowed direction in the drawing, and can be moved horizontally at least by the distance between the 2 objective lenses. When the housing is moved, one of the 2 objective lenses is positioned on the optical axis of the laser, and the objective lens corresponding to the substrate thickness of the information recording medium 90 is selected, so that the optimum optical spot can be converged onto the information recording surface of the information recording medium

EXAMPLE 34

Figure 78:
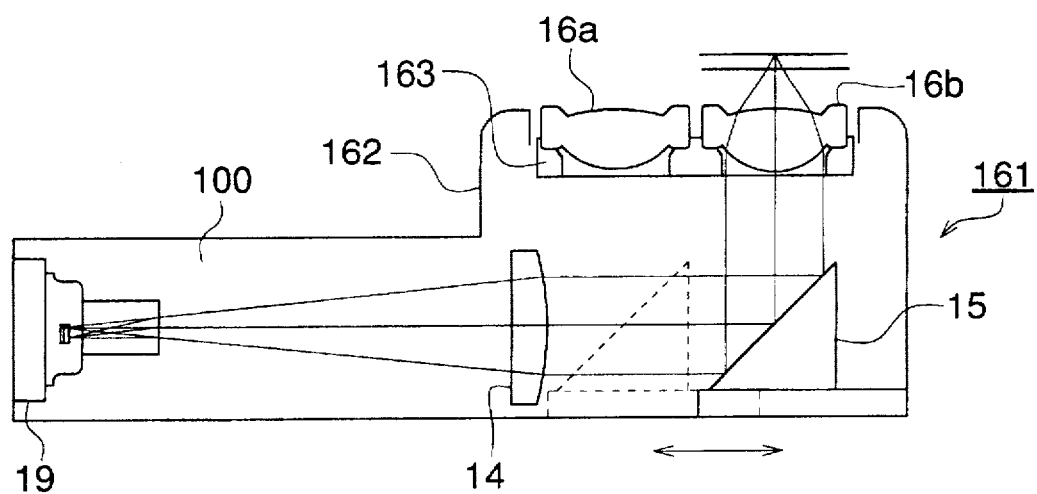
FIG. 78 is a view to explain a correction means in Example 34.

In FIG. 78, the objective lens driving means 161 for integrally driving a plurality of objective lenses, and a mirror 15 by which the optical path is bent by 90° between the objective lens driving means 161 and the laser beam source (in this example, the hologram laser unit), are used. The mirror 15, constituting the correction means, is moved in the direction of the optical axis of the laser beam corresponding to the type of the information recording medium 90, by the distance corresponding to the interval between a plurality of objective lenses.

In FIG. 78, the objective lens driving means 161 is composed of: a fixing portion 162 having a magnetic circuit composed of a magnet, a yoke, etc.; a movable portion 163 on which a focusing coil and a tracking coil are mounted; the first objective lens 16a and the second objective lens 16b which are adhered and fixed onto the movable portion 163; and a wire to movably support the fixing portion 162 and the movable portion 163 in the focusing direction and the tracking direction, or the like.

The aberration of the first objective lens 16a is minimized under the condition of 1.2 mm substrate thickness when the parallel luminous flux enters into the objective lens, and the aberration of the second objective lens 16b is also minimized under the condition of 0.6 mm substrate thickness.

In the housing 100, the laser beam source, the beamsplitter, the hologram laser unit 19, integrally provided with a light detector, the collimator lens 14, which converts the diverged luminous flux from the laser into a parallel luminous flux, and a mirror 15, which is movably supported in the advancing direction of the parallel luminous flux, and which bends the direction, in which the luminous flux advances, by 90° and directs the luminous flux to the objective lens, are accommodated. When the mirror 15 is located at the position shown by a solid line in the drawing, the luminous flux from the laser enters into the second objective lens 16b, and reads the information recording medium having a 0.6 mm thickness substrate.

When the mirror 15 is moved to the position shown by a dotted line in the drawing, the luminous flux from the laser enters into the first objective lens 16a, and is appropriate for reading out the information recording medium 90 having a 1.2 mm thickness substrate.

The alignment of the 2 objective lenses may be any of the following: radial to the information recording medium 90;

tangential; or at some angle with respect to either of the above two alignments. However, when the 2 objective lenses are aligned in the tangential direction, this alignment is preferable because there is a most surplus room inside the inner periphery of the disk. In this case, the direction of movement of the mirror 15 is perpendicular to the direction of the movement of the optical pick-up apparatus in the direction of the inner and outer periphery. Accordingly, it is easy to prevent the mirror from being jolted when the optical pick-up apparatus is driven by the feed motor.

EXAMPLE 35

The condition of the optimum optical spot is different corresponding to the difference of the information recording density (the shortest pit length, the track pitch) according to the type of information recording medium. It is preferable that the optical spot size is adjusted so that the spherical aberration becomes minimum with respect to the difference of the substrate thickness, and that the optical spot size is optimally adjusted with respect to the difference of the recording density.

Figure 79:
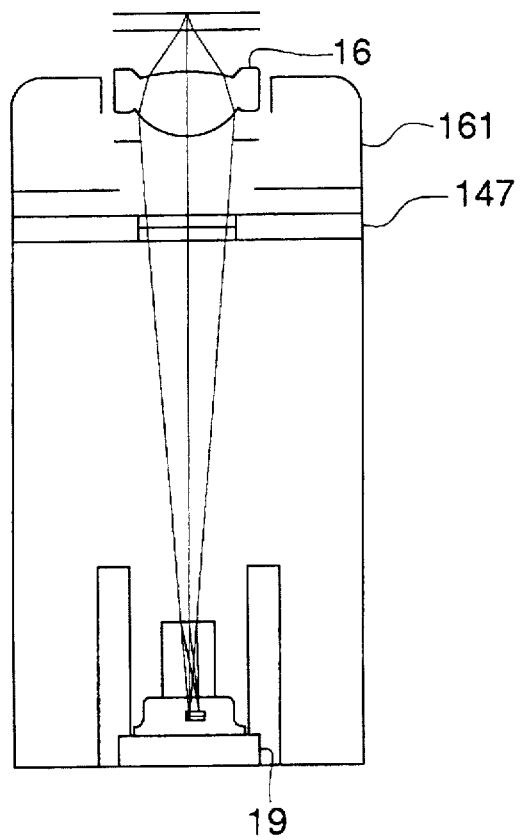
FIG. 79 is a view to explain a correction means in Example 35.
Figure 80:
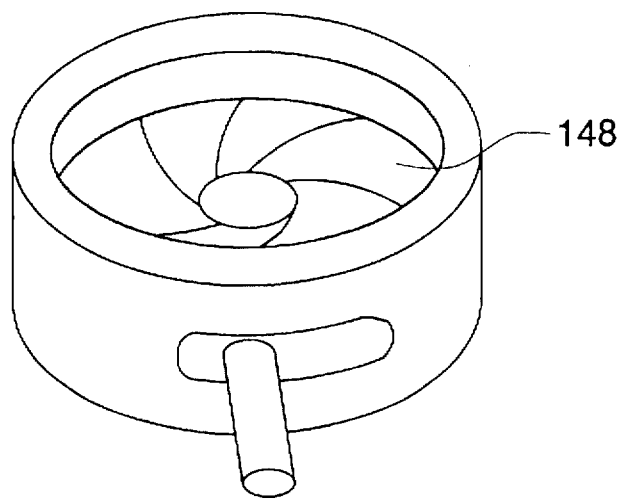
FIGS. 80(a) and 80(b) are views to explain details of the correction means in Example 35.
Figure 80:
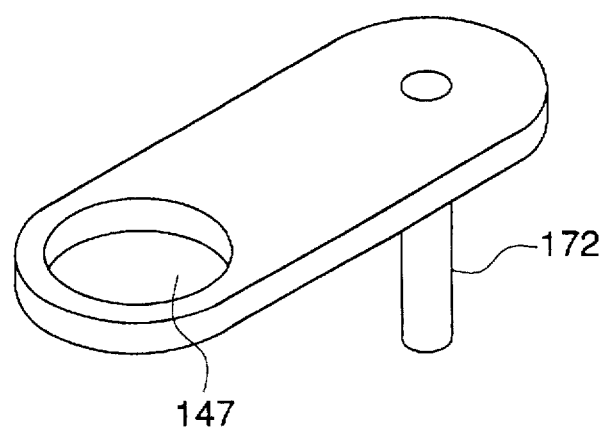
Figure 81:
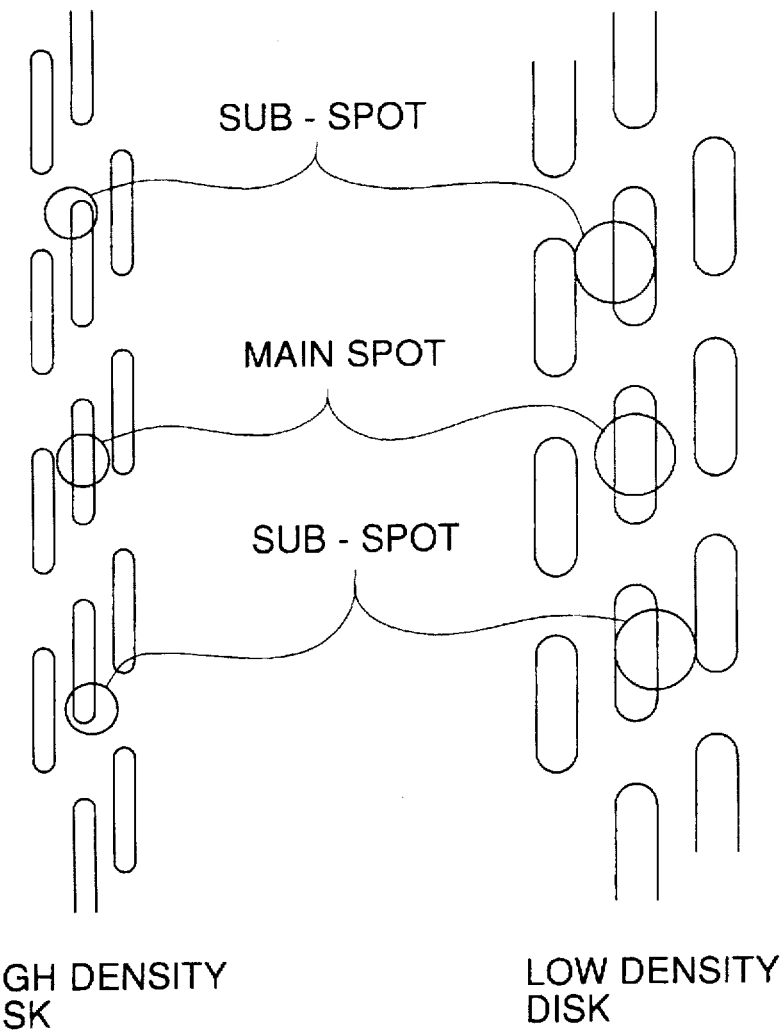
FIGS. 81(a) and 81(b) are views to explain the track error detection in Example 36.
Figure 82:
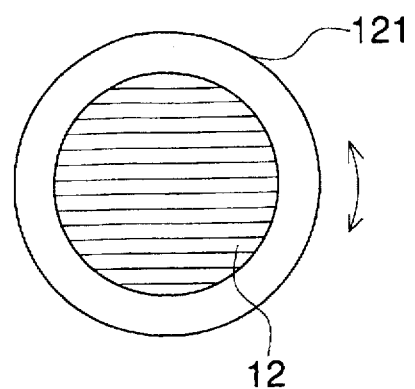
FIGS. 82(a) and 82(b) are views to explain the diffraction grating in Example 36.
Figure 82:
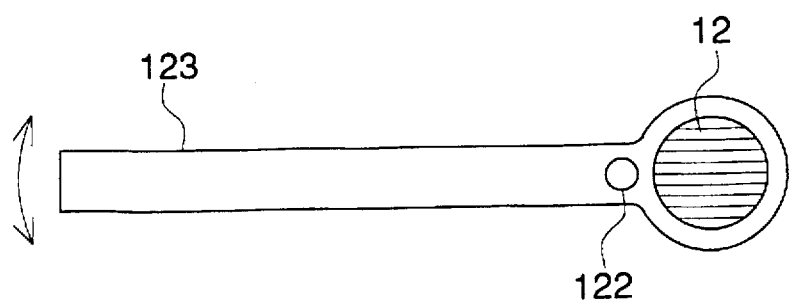

In the example shown in FIG. 79, the following correction means is provided: the spherical aberration generated corresponding to the difference of the substrate thickness of the disk is corrected by the movement of the hologram laser unit 19 in the direction of the optical axis; and the spot size is corrected by the adjustment of the diaphragm diameter of the diaphragm 147 which is provided on the optical path from the laser beam source to the objective lens 16. As a diaphragm means, the following are acceptable: an iris diaphragm 148 widely used for camera lenses, or the like, as shown in FIG. 80(a); insertion by rotation of the single diaphragm 147 around the shaft 172 as shown in FIG. 80(b), or the like. In the case of FIG. 80(b), when this diaphragm 147 is not set into the position, the luminous flux is limited by another diaphragm 147 integrally provided on the movable portion of the objective lens driving means 161.

When there are few types of information recording mediums to be read, and 2 diaphragm diameters are used for the purpose, the insertion and removal method as shown in FIG. 80(b) is simple to use. When 3 types of diaphragm diameters are necessary or fine adjustment is carried out, the iris diaphragm 148 as shown in FIG. 80(a) is simpler for use. Adjustment or insertion and removal of the diaphragm means can be attained when mechanical elements such as gears, links, etc., are used and these are interlocked with the movement of the hologram laser unit.

EXAMPLE 36

When the track error is detected by the 3-beam method, a main spot for reading is converged onto the information recording surface of the information recording medium, and 2 sub-spots are respectively converged into positions which are respectively shifted by ¼ of the track with respect to the track, and an amount of the reflected light of the 2 sub-spots is detected by the light detector.

In FIGS. 81(a) and 81(b), when the distance between the main spot and the 2 sub-spots are respectively 20 mm, and the track pitch is 0.84 mm, an angle formed between the direction of alignment of 3 spots and the track, is optimally 0.60° (FIG. 81(a)). In an information recording medium having different track pitches, for example, for an information recording medium having 1.6 mm track pitch, the optimum angle is 1.15° (FIG. 81(b)). When this angle is not appropriate, the amplitude of the track error signal is decreased, and the track follow-up property is lowered.

In this example, the azimuth of 3-spots converged onto the information recording medium is corrected with respect to the track of the information recording medium, and a diffraction grating, the angle of which is adjustable, is provided in the optical path from the laser beam source to the beam splitter, and the azimuth of the lattice of the diffraction grating, which is the correction means, is corrected.

In FIGS. 82(a) and 82(b), the following methods are adopted as the rotation method of the diffraction grating 12. The diffractive grating 12 is held in the cylindrical holder 121, and the holder 121 is rotated in the housing of the optical pick-up (FIG. 82(a)); or the diffraction grating 12 is held by one end of the lever 123 which rotates around the rotation shaft 122, and the entire lever is rotated 82(b). When the rotation of the diffraction grating 12 is interlocked with the correction means of the difference of the thickness of the disk or the diaphragm means, an information recording medium apparatus is realized, in which both an SD disk and a CD disk, having respectively different substrate thickness and track pitch information recording density, can be satisfactorily reproduced.

According to the present invention, the drive of the correction means provided for the optical pick-up apparatus which reads the information recording medium, having a different substrate thickness or a different track pitch information recording density, can be carried out using the driving force of the feed motor, without providing any further motor, solenoid, or the like, so that the overall size of the optical pick-up is reduced, and its weight and cost can be correspondingly reduced.

Further, when the correction means is driven using the motor provided on the chassis in the lead-in area, the size and weight can be reduced. Furthermore, when the direction of movement or support of the correction means is different from the direction for access of the optical pick-up apparatus, jolting can be prevented, so that the focusing and tracking control can be securely carried out. Specifically, in the structure for high speed access, the center of gravity of the carriage is not changed even when the correction condition is changed by the correction means, resulting in the prevention of resonance.

Thus, as described above, an information recording medium apparatus in which plural types of information recording mediums can be reproduced by one apparatus, can be realized.

What is claimed is:

1. An optical pick-up apparatus for reading information from a plurality of optical information recording mediums having different transparent substrate thicknesses, comprising:

a laser beam source;

an objective lens for converging a luminous flux from the laser beam source onto an information recording surface of an optical information recording medium through the transparent substrate of the optical information recording medium; and moving means for moving a divergence degree changing means in a direction of an optical axis of the luminous flux from the laser beam source corresponding to a thickness of the transparent substrate of the optical information recording medium, wherein the divergence degree changing means changes a divergence degree of the luminous flux from the laser beam source, which enters the objective lens, by movement by the moving means.

2. The optical pick-up apparatus according to claim 1, wherein the moving means moves the divergence degree changing means between a first position at an objective lens-side and a second position at a laser beam source-side.

3. The optical pick-up apparatus according to claim 2, wherein the moving means moves the divergence degree changing means by rotation around an axis perpendicular to the optical axis.

4. The optical pick-up apparatus according to claim 2, wherein the moving means move the divergence degree changing means along the optical axis.

5. The optical pick-up apparatus according to claim 2, wherein the moving means moves the divergence degree changing means by pivotal movement about an axis perpendicular to the optical axis.

6. The optical pick-up apparatus according to claim 2, wherein the luminous flux, entering the objective lens, is substantially parallel light when the divergence degree changing means is positioned at the first position.

7. The optical pick-up apparatus according to claim 2, wherein the moving means moves the divergence degree changing means to the first position when the transparent substrate of the optical information recording medium has a first thickness, and moves the divergent degree changing means to the second position when the transparent substrate of the optical information recording medium has a second thickness thicker than the first thickness.

8. The optical pick-up apparatus according to claim 1, further comprising:
    a light receiving means for receiving luminous flux reflected by the optical information recording medium and passed through the objective lens; and
    a beam splitter for guiding the reflected luminous flux passed through the objective lens to the light receiving means.

9. The optical pick-up apparatus according to claim 8, wherein the laser beam source, the light receiving means, and the beam splitter are integrally and movable structured.

10. The optical pick-up apparatus according to claim 1, further comprising:
    a diffraction grating arranged between the objective lens and the laser beam source; and
    angle adjustment means for adjusting a rotation angle of the diffraction grating according to a pitch of an information track on the optical information recording medium.

11. The optical pick-up apparatus according to claim 2, further comprising:
    means for determining the numerical aperture of the luminous flux incident on the optical information recording medium; and
    a control means for controlling a means for determining the numerical aperture according to a pitch of the information track of the optical information recording medium, and for changing the numerical aperture.

12. The optical pick-up apparatus according to claim 11, wherein the control means controls the means for determining the numerical aperture so that an effective numerical aperture at the laser beam-side in the first position is substantially equal to that in the second position.

13. The optical pick-up apparatus according to claim 11, wherein the means for determining the numerical aperture is a diaphragm.

14. The optical pick-up apparatus according to claim 1, wherein the objective lens is a positive single lens having a convex first surface facing the laser beam source and a second surface, the first and second surfaces being aspherical.

15. The optical pick-up apparatus according to claim 7, wherein the apparatus satisfies the following conditional expressions:

$$0.5 < \frac{\Delta d}{\left(\frac{n^2-1}{n^3}\right)\Delta t} \times \sqrt{\frac{f_0}{fT}} \times \left(\frac{f_0}{f_c}\right)^2 < 0.8$$

where, $\Delta d = d_1 - d_2$ $\Delta t = t_2 - t_1$ $d_1$ represents a distance (mm) from the laser beam source to a position where a surface, closest to the laser beam source, of the divergence degree changing means crosses the optical axis, when the divergence degree changing means is located at the first position, $d_2$ represents a distance (mm) from the laser beam source to a position where the surface, closest to the laser beam source, of the divergence degree changing means crosses the optical axis, when the divergence degree changing means is located at the second position, $t_1$ represents the first thickness (mm) of the transparent substrate of the optical information recording medium, $t_2$ represent the second thickness (mm) of the transparent substrate of the optical information recording medium, n represents a refractive index of the transparent substrate of the optical information recording medium at a wavelength of the laser beam source, $f_0$ represents a focal length of the objective lens (mm), $f_c$ represents a focal length of the divergence degree changing means (mm), and fT represents an optical system focal length when the divergence degree changing means is located at the first position (mm).

16. Th optical pick-up apparatus according to claim 15, wherein the luminous flux entering the objective lens is substantially parallel light when the divergence degree changing means is positioned at the first position.

17. The optical pick-up apparatus according to claim 15, wherein the objective lens is a positive single lens, having a convex first surface facing the laser beam source and a second surface, said first and second surfaces being aspherical.

18. An information recording medium apparatus for reading information from a plurality of optical information recording mediums having a transparent substrate of different thicknesses, comprising:
    a laser beam source;
    a beam splitter;
    an objective lens for converging luminous flux from the laser beam source onto an information recording surface of the optical information recording medium through the transparent substrate of the optical information recording medium;
    light receiving means for receiving luminous flux reflected by a surface of the optical information recording medium and passed through the objective lens and the beam splitter;
    discrimination means for discriminating a thickness of the transparent substrate of the optical information recording medium; and
    moving means for moving a divergence degree changing means in a direction of an optical axis of the luminous flux from the laser beam source according to a discrimination result of the discriminating means, wherein movement of the divergence degree changing means changes a divergence degree of the luminous flux from the laser beam source entering the objective lens.

19. The information recording medium apparatus according to claim 18, wherein the moving means moves the divergence degree changing means between a first position at an objective lens-side and a second position at a laser beam source-side.

20. The information recording medium apparatus according to claim 19, wherein the luminous flux entering the objective lens are substantially parallel light beams, when the divergence degree changing means is positioned at the first position.

21. The information recording medium apparatus according to claim 19, wherein the moving means moves the divergence degree changing means to the first position when the transparent substrate of the information recording medium has a first thickness and to the second position when the transparent substrate of the optical information recording medium has a second thickness thicker than that of the first thickness.

22. The information recording medium apparatus according to claim 19, further comprising:

means for determining a numerical aperture of the luminous flux incident on the optical information recording medium; and control means for controlling a means for determining the numerical aperture according to a pitch of an information track on the optical information recording medium and for changing the numerical aperture.

23. The information recording medium apparatus according to claim 22, wherein the control means controls the means for determining the numerical aperture so that an effective numerical aperture at the laser beam-side in the first position is substantially equal to that in the second position.

24. The information recording medium apparatus according to claim 18, further comprising:

a diffraction grating arranged between the objective lens and the laser beam source; and angle adjustment means for adjusting a rotation angle of the diffraction grating according to a pitch of an information track on the optical information recording medium.

25. The information recording medium apparatus according to claim 24, wherein a position of the diffraction grating is controlled so that 0-order light, passing through the diffraction grating, is positioned on the information track of the optical information recording medium.

26. The information recording medium apparatus according to claim 18, wherein the discrimination means discriminates the thickness of the transparent substrate by operation buttons of the reading apparatus.

27. The information recording medium apparatus according to claim 18, wherein the discrimination means discriminates the thickness of the transparent substrate based on signals from the light receiving means.

28. The information recording medium apparatus according to claim 27, wherein the discrimination means discriminates the thickness of the transparent substrate by a frequency component of the signals and a rotation speed of the optical information recording medium.

29. The information recording medium apparatus according to claim 18, further comprising:

an actuator coupled to move the objective lens for focusing and tracking.

30. The information recording medium apparatus according to claim 18, wherein a control means controls movement of the moving means so as to compensate for aberrational changes of a beam spot focused on the optical information recording medium due to temperature variations.

31. The information recording medium apparatus according to claim 18, wherein the objective lens is a positive single lens having a convex first surface facing the laser beam source and a second surface, the first and second surfaces being aspherical.

32. The information recording medium apparatus according to claim 19, wherein the following conditional expressions are satisfied:

$$0.5 < \frac{\Delta d}{\left(\frac{n^2-1}{n^3}\right)\Delta t} \times \sqrt{\frac{f_0}{fT}} \times \left(\frac{f_0}{f_c}\right)^2 < 0.8$$

where, $\Delta d = d_1 - d_2$ $\Delta t = t_2 - t_1$ $d_1$ represents a distance from the laser beam source to the first position (mm), $d_2$ represents a distance from the laser beam source to the second position (mm), $t_1$ represents a first thickness of the transparent substrate of the optical information recording medium (mm), $t_2$ represents a second thickness of the transparent substrate of the optical information recording medium (mm), n represents a refractive index of the transparent substrate of the optical information medium at a wavelength of the laser beam source, $f_0$ represents a focal length of the objective lens (mm), $f_c$ represents a focal length of the divergence degree changing means (mm), and fT represents an optical system focal length when the divergence degree changing means is positioned at the first position (mm).

33. The information recording medium apparatus according to claim 32, wherein the luminous flux entering the objective lens are substantially parallel light beams when the divergence degree changing means is positioned at the first position.

34. The information recording medium apparatus according to claim 32, wherein the objective lens is a positive single lens having a convex first surface facing the laser beam source and a second surface, the first and second surfaces being aspherical.

* * * * *